(12) United States Patent
Cristol

(10) Patent No.: US 7,711,596 B2
(45) Date of Patent: May 4, 2010

(54) BUSINESS METHOD FOR INTEGRATING AND ALIGNING PRODUCT DEVELOPMENT AND BRAND STRATEGY

(76) Inventor: Steven M. Cristol, 3664 50th Ave. NE., Seattle, WA (US) 98105

(*) Notice: Subject to any disclaimer, the term of this patent is extended or adjusted under 35 U.S.C. 154(b) by 127 days.

(21) Appl. No.: 11/058,107

(22) Filed: Feb. 14, 2005

(65) Prior Publication Data

US 2005/0256844 A1 Nov. 17, 2005

Related U.S. Application Data

(60) Provisional application No. 60/544,781, filed on Feb. 14, 2004, provisional application No. 60/585,171, filed on Jul. 2, 2004.

(51) Int. Cl.
*G06Q 90/00* (2006.01)
(52) U.S. Cl. .......................... 705/10; 705/7
(58) Field of Classification Search ............... 705/10
See application file for complete search history.

(56) References Cited

U.S. PATENT DOCUMENTS

| | | | |
|---|---|---|---|
| 5,999,908 A * | 12/1999 | Abelow | 705/1 |
| 6,321,205 B1 | 11/2001 | Eder | |
| 6,745,184 B1 | 6/2004 | Choi et al. | |
| 7,188,069 B2 | 3/2007 | Hagelin | |
| 2002/0147516 A1* | 10/2002 | Jones | 700/97 |
| 2002/0147627 A1* | 10/2002 | Roosevelt et al. | 705/10 |
| 2002/0161664 A1* | 10/2002 | Shaya et al. | 705/26 |
| 2002/0184111 A1* | 12/2002 | Swanson | 705/26 |
| 2003/0069822 A1* | 4/2003 | Ito et al. | 705/36 |
| 2003/0163471 A1* | 8/2003 | Shah | 707/10 |
| 2004/0068431 A1* | 4/2004 | Smith et al. | 705/10 |
| 2004/0093296 A1 | 5/2004 | Phelan et al. | |

OTHER PUBLICATIONS

PRNewswire, Telecommunications Product Development Benchmarking Study Launched by Pittiglio Rabin Todd & McGrath, PRNewswire, May 2, 1996, Dialog file 813.*
Hultink et al, Industrial new product launch strategies and product development performance, Journal of Product Innovation Management, 1997, V14, N4 (Jul.), pp. 243-257, Dialog file 7.*

* cited by examiner

*Primary Examiner*—Andre Boyce
(74) *Attorney, Agent, or Firm*—Black Lowe & Graham PLLC

(57) ABSTRACT

A business method that improves brand identity by effectively allocating product development resources and prioritizing projects based on a systematic approach of defining assumptions that drive brand development and assessing a product development portfolio thereon.

5 Claims, 47 Drawing Sheets

| Client | Product(s)/Service(s) Category: | |
|---|---|---|
| Drivers of Brand Choice (sorted by Driver ID) | | |
| Driver Name | Driver Description | Factor-Level Association |
| A. Financially stable vendor | | TRUST |
| B. innovative | | TRUST |
| C. scalable | | CONTROL |
| D. global company | | TRUST |
| E. helps me make the business case | | VALUE |
| F. strong track record | | TRUST |
| G. delivers on commitments | | TRUST |
| H. has endorsements from companies I respect | | TRUST |
| I. Customizable | To my infrastructure, organization, industry | CONTROL |
| J. easy to use | | SIMPLICITY |
| K. easy to deploy | | SIMPLICITY |
| L. saves money | | VALUE |
| M. integrated solution | Combines multiple point solutions seamlessly | SIMPLICITY |
| N. effectively prioritizes tasks | | CONTROL |
| O. best product benchmarks | | TRUST |
| P. provides consistent user experience | | SIMPLICITY |
| Q. saves time | | VALUE |
| R. easy to maintain | | SIMPLICITY |
| S. accessible support 24x7x365 | | SIMPLICITY |
| T. a comprehensive-enough solution | | CONTROL |
| U. trustworthy data | Credible + current + global + accurate | TRUST |
| V. optional hosted service | | CONTROL |
| W. low Total Cost of Ownership | Software/hardware, migration costs, resource efficiency | VALUE |
| X. flexible | Configuration + administration + reporting | CONTROL |
| Y. enables regulatory compliance | | CONTROL |
| Z. interoperable | Works with existing infrastructure + other vendors' applications | SIMPLICITY |
| AA. Demonstrable ROI | | VALUE |
| BB. High-quality reporting | | CONTROL |
| | | |
| | | |
| | | |

*Fig. 7*

| Strategic Harmony    Consensus Builder | | Cristol & Associates Engagement # _____ | |
|---|---|---|---|
| Client Company Name: | | Voter's Name: | |
| PRIORITIZING DRIVERS OF BRAND CHOICE<br>Internal Multivoting — Network IT Manager | | | |
| Note: Please see instructions on cover page. Complete both Sheet 1 (manager) and Sheet 2 (C-level). | | | |
| Attributes below are listed in random order. | For Network IT Manager | | |
| | Importance Rating | Comments(Optional) | |
| Q1. In choosing enterprise security solutions, how important is it that the vendor <u>company</u>: | *(enter number between 1 and 10 for each attribute)* | | |
| a. is financially stable / will be in business in five years | | | |
| b. is innovative | | | |
| c. is dependable / delivers on commitments | | | |
| d. is a global company | | | |
| e. helps me make the business case for its solutions | | | |
| f. has a strong track record | | | |
| g. has talented, sophisticated people | | | |
| h. has endorsements / testimonials from companies I respect | | | |
| Q2.<br>    In choosing enterprise security solutions, how important is it that the <u>product/solution</u>: | | | |
| aa. Provides early warnings | | | |
| bb. Is scalable | | | |
| cc. Is customizable (to my infrastructure, organization, industry, and risk priorities | | | |
| \ Sheet 1 / Sheet 2 | | | |

*Fig. 8*

Drivers of Brand Choice are Multi-Dimensional

| Example (enterprise software): SIMPLICITY | |
|---|---|
| Simplicity Dimensions: | Correlation Coefficient (Correlation with Brand Choice) |
| • Easy to deploy | .56 |
| • Interoperable | .41 |
| • Easy to use | .32 |
| • Easy to maintain | .25 |
| • Integrated solution | .23 |
| • Easily accessible support | .17 |
| • Runs from a single console | .12 |
| • Easy to purchase/license | .09 |
| | |

CRISTOL & ASSOCIATES

*Fig. 9*

| Strategic Harmony    Consensus Builder | | |
|---|---|---|
| PRIORITIZING DRIVERS OF BRAND CHOICE | | |
| Internal Multivoting | | |
| | | |
| Network IT Manager | | |
| | | |
| ATTRIBUTES | FACTOR | Respondent 1 |
| Q1. In choosing enterprise security solutions, how important is it that the vendor <u>company</u>: | Primary linkage | |
| | | |
| a. is financially stable/will be in business in five years | Trust | 5 |
| b. is innovative | Trust | 5 |
| c. is dependable/ delivers on commitments | Trust | 8 |
| d. is a global company | Trust | 4 |
| e. helps me make the business care for its solutions | Trust | 9 |
| f. has a strong track record | Trust | 8 |
| g. has talented, sophisticated people | Trust | 6 |
| h. has endorsements/testimonials from companies I respect | Trust | 8 |
| | | |
| | | |
| Q2. in choosing enterprise security solutions, how important is it that the <u>product/solution</u>: | | |
| | | |
| aa. Provides early warnings | Control | 7 |
| bb. Is scalable | Control | 10 |
| cc. Is customizable (is my infrastructure, organization, industry, and risk perimeters) | Control | 10 |
| dd. Is easy to use | Simplicity | 7 |
| ee. Is easy to deploy | Simplicity | 9 |
| ff. is easy to maintain | Simplicity | 9 |
| | | |
| ◀ ▶ ▶│ \ Network IT Manager / CIO - CISO / Net IT – C-Level Comparison / Attrib Rank by Voter C │ ◀ | | |

*Fig. 10A*

| | Respondent 2 | Respondent 3 | Respondent 4 | Respondent 5 | Respondent 6 | Respondent 7 |
|---|---|---|---|---|---|---|
| | | | | | | |
| | | | | | | |
| | | | | | | |
| | | | | | | |
| | 7 | No Rating | 8 | 5 | 6 | 6 |
| | 10 | 9 | 9 | 6 | 7 | 9 |
| | 8 | 8 | 9 | 10 | 10 | 10 |
| | 6 | 4 | 7 | 9 | 4 | 4 |
| | 4 | 9 | 1 | 8 | 6 | 9 |
| | 8 | 5 | 6 | 7 | 9 | 8 |
| | 8 | 6 | 8 | 6 | 7 | 7 |
| | 9 | 10 | 9 | 8 | 8 | 3 |
| | | | | | | |
| | | | | | | |
| | | | | | | |
| | | | | | | |
| | 9 | 4 | 8 | 5 | 8 | 4 |
| | 7 | 8 | 9 | 10 | 9 | 9 |
| | 9 | 7 | 8 | 9 | 10 | 4 |
| | 9 | 5 | 9 | 7 | 7 | 5 |
| | 9 | 9 | 9 | 8 | 9 | 9 |
| | 9 | 9 | 10 | 8 | 9 | 5 |

◀ ▶ ▶| \ Network IT Manager ╱ CIO - CISO ╱ Net IT – C-Level Comparison ╱ Attrib Rank by Voter C | ◀

*Fig. 10B*

| Respondent 8 | AVERAGE RATING | Top 3 Box" Incidence | AGGREGATE RANK |
|---|---|---|---|
| | (10-point scale) | | Relation importance ranking among 36-attributes Based on top-3-box incidence |
| 6 | 5.89 | 16.7% | 32 |
| 8 | 7.21 | 57.9% | 13 |
| 8 | 8.74 | 84.2% | 2 |
| 6 | 5.42 | 10.5% | 36 |
| 7 | 6.37 | 42.1% | 23 |
| 8 | 7.37 | 57.9% | 12 |
| 7 | 7.05 | 36.8% | 24 |
| 7 | 7.26 | 52.6% | 17 |
| | | | |
| | | | |
| | | | |
| | | | |
| | | | |
| 8 | 7.21 | 57.9% | 13 |
| 7 | 8.37 | 68.4% | 5 |
| 7 | 7.42 | 52.6% | 16 |
| 8 | 7.05 | 36.8% | 24 |
| 7 | 8.11 | 78.9% | 3 |
| 8 | 7.05 | 78.9% | 4 |

◀ ▶ ▶| \ Network IT Manager ╱ CIO - CISO ╱ Net IT – C-Level Comparison ╱ Attrib Rank by Voter C ◀

*Fig. 10C*

| | | |
|---|---|---|
| GG. Is an integrated solution (enables multiple point solutions holistically) | Simplicity | 7 |
| HH. Effectively prioritizes threats (actionable info: what's important/ what to do | Control | 8 |
| II. Has best product benchmarks | Trust | 7 |
| JJ. Runs from a single console/provides consistent user experience | Simplicity | 7 |
| KK. Saves time (for me and for my organization) | Value/ROI | 9 |
| LL. Saves money (for my company) | Value/ROI | 7 |
| MM. Has accessible support 24x7x365 | Trust/Simplicity | 10 |
| NN. Is a comprehensive-enough solution | Control | 6 |
| OO. Has a trustworthy data (credible + current + global, and solid methodology) | Trust | 7 |
| PP. Prevents breaches, including blended and internal threats | Control | 9 |
| QQ. Has low TCO (software/hardware, migration carts, resource efficiency) | Value/ROI | 5 |
| RR. Is flexible (configuration + administration + reporting) | Control | 7 |
| SS. Facilitates effective management of passwords/identities | Control | 9 |
| TT. Is interoperable (integrates with existing infrastructure + other products | Simplicity | 7 |
| UU. Is backed by a competent, easy-to-work-with support organization | Simplicity | 9 |
| VV. Effectively filters false positives | Control | 10 |
| WW. Responds rapidly in optimum sequence | Control | 7 |
| XX. Provider high-quality reporting | Control | 7 |
| YY. Yields demonstrable ROI | Value/ROI | 6 |
| ZZ. Correlator events across disparate solutions | Control | 8 |
| ZY. Enables compliance with regulatory/audit requirements | Control | 10 |
| ZX. Was same data repository as other products | Simplicity | 7 |
| Added by individual respondents: | | |
| i. Has information security professionals, exports and thought leaders | | |
| i. Incapacitors security principles & best practices in solutions | | |
| ◀ ▶ ▶| \ Network IT Manager ╱ CIO - CISO ╱ Net IT – C-Level Comparison ╱ Attrib Rank by Voter C | ◀ | |

*Fig. 10D*

| 6 | 4 | 10 | 6 | 4 | 4 |
|---|---|---|---|---|---|
| 9 | 7 | 8 | 9 | 7 | 5 |
| 4 | 7 | 8 | 5 | 7 | 7 |
| 5 | 5 | 9 | 6 | 5 | 8 |
| 8 | 7 | 10 | 7 | 3 | 5 |
| 7 | 4 | 9 | 7 | 2 | 8 |
| 5 | 6 | 10 | 9 | 8 | 7 |
| 9 | 6 | 6 | 5 | 8 | 5 |
| 10 | 8 | 8 | 10 | 5 | 9 |
| 10 | 8 | 9 | 10 | 10 | 7 |
| 6 | 7 | 10 | 7 | 4 | 9 |
| 6 | 8 | 9 | 6 | 6 | 10 |
| 6 | 7 | 9 | 5 | 7 | 9 |
| 7 | 8 | 9 | 9 | 8 | 9 |
| 9 | 6 | 8 | 6 | 7 | 8 |
| 8 | 10 | 8 | 5 | 9 | 7 |
| 7 | 6 | 8 | 6 | 6 | 6 |
| 7 | 10 | 8 | 9 | 7 | 8 |
| 6 | 10 | 7 | 5 | 3 | 8 |
| 7 | 7 | 8 | 6 | 4 | 7 |
| 7 | 5 | 8 | 6 | 6 | 5 |
| 5 | 6 | 7 | 4 | 6 | 7 |

◄ ► ▎►▎ \ Network IT Manager ╱ CIO - CISO ╱ Net IT – C-Level Comparison ╱ Attrib Rank by Voter C ▎◄

*Fig. 10E*

| | | | |
|---|---|---|---|
| 6 | 5.89 | 21.1% | 31 |
| 8 | 7.95 | 63.2% | 8 |
| 8 | 7.00 | 66.7% | 7 |
| 7 | 6.79 | 36.8% | 27 |
| 6 | 6.89 | 42.1% | 22 |
| 6 | 5.74 | 15.8% | 33 |
| 8 | 7.89 | 63.2% | 9 |
| 6 | 6.95 | 42.1% | 20 |
| 7 | 8.05 | 68.4% | 6 |
| 6 | 8.95 | 84.2% | 1 |
| 6 | 6.53 | 26.3% | 29 |
| 7 | 7.32 | 42.1% | 19 |
| 7 | 6.95 | 42.1% | 20 |
| 7 | 7.89 | 63.2% | 9 |
| 7 | 7.79 | 63.2% | 11 |
| 7 | 7.58 | 47.4% | 18 |
| 7 | 6.53 | 26.3% | 29 |
| 8 | 7.63 | 52.6% | 15 |
| 6 | 5.53 | 15.8% | 34 |
| 8 | 6.84 | 36.8% | 26 |
| 6 | 6.53 | 31.8% | 28 |
| 7 | 5.42 | 15.8% | 35 |
| | | | |
| | | | |
| | | | |

◀ ▶ ▶| \ Network IT Manager ╱ CIO - CISO ╱ Net IT – C-Level Comparison ╱ Attrib Rank by Voter C | ◀

*Fig. 10F*

| Strategic Harmony Consensus Builder | | |
|---|---|---|
| PRIORITIZING DRIVERS OF BRAND CHOICE | | |
| Internal Multivoting | | |
| Network IT/ C-LEVEL RATINGS BY VOTER SUB-GROUPS | | |
| | | NETWORK IT |
| ATTRIBUTES | FACTOR | SALES/MKTG GROUP |
| Q1. In choosing enterprise security solutions, how important is it that the vendor <u>company</u>: | Primary linkage | |
| | | |
| a. is financially stable/will be in business in five years | Trust | 5.29 |
| b. is innovative | Trust | 5.75 |
| c. is dependable/ delivers on commitments | Trust | 7.38 |
| d. is a global company | Trust | 4.63 |
| e. helps me make the business care for its solutions | Trust | 6.38 |
| f. has a strong track record | Trust | 6.38 |
| g. has talented, sophisticated people | Trust | 6.13 |
| h. has endorsements/testimonials from companies I respect | Trust | 6.63 |
| | | |
| | | |
| Q2. in choosing enterprise security solutions, how important is it that the <u>product/solution</u>: | | |
| | | |
| aa. Provides early warnings | Control | 6.00 |
| bb. Is scalable | Control | 7.75 |
| cc. Is customizable (is my infrastructure, organization, industry, and risk perimeters) | Control | 6.00 |
| dd. Is easy to use | Simplicity | 5.50 |
| ee. Is easy to deploy | Simplicity | 6.88 |
| ff. is easy to maintain | Simplicity | 6.63 |
| | | |
| ◄ ► ►l \ CIO - CISO / Net IT – C-Level Comparison / Attrib Rank by Voter Org / | | ◄ |

*Fig. 11A*

| | |
|---|---|
| | |
| | |
| NETWORK IT MGR RATINGS ||
| PRODUCT MGT GROUP | TECHNICAL GROUP |
| | |
| | |
| 6.00 | 6.75 |
| 6.50 | 8.75 |
| 8.83 | 9.50 |
| 4.50 | 7.25 |
| 6.00 | 4.50 |
| 7.83 | 7.25 |
| 7.17 | 7.25 |
| 7.00 | 6.50 |
| | |
| | |
| | |
| | |
| | |
| 7.67 | 7.75 |
| 8.00 | 8.50 |
| 8.00 | 7.75 |
| 7.83 | 7.50 |
| 8.67 | 7.75 |
| 8.67 | 7.25 |

◄ ► ►│ \ CIO - CISO ╱ Net IT – C-Level Comparison ╱ Attrib Rank by Voter Org ╱       ◄

*Fig. 11B*

| | C - LEVEL RATINGS | | |
|---|---|---|---|
| | SALES/MKTG GROUP | PRODUCT MGT GROUP | TECHNICAL GROUP |
| | | | |
| | | | |
| | 8.75 | 8.67 | 8.00 |
| | 5.50 | 5.00 | 6.00 |
| | 8.38 | 8.83 | 3.40 |
| | 7.38 | 6.83 | 6.80 |
| | 8.63 | 6.67 | 3.60 |
| | 8.38 | 7.67 | 7.80 |
| | 6.00 | 5.67 | 7.40 |
| | 8.13 | 7.83 | 6.60 |
| | | | |
| | | | |
| | | | |
| | 6.88 | 7.00 | 6.20 |
| | 8.50 | 7.83 | 3.40 |
| | 6.88 | 7.67 | 7.40 |
| | 5.63 | 6.83 | 7.20 |
| | 6.75 | 7.83 | 7.80 |
| | 7.00 | 7.83 | 8.00 |

CIO - CISO / Net IT – C-Level Comparison / Attrib Rank by Voter Org /

*Fig 11C*

| | | |
|---|---|---|
| GG. Is an integrated solution (enables multiple point solutions holistically) | Simplicity | 4.75 |
| HH. Effectively prioritizes threats (actionable info: what's important/ what to do | Control | 6.50 |
| II. Has best product benchmarks | Trust | 6.14 |
| JJ. Runs from a single console/provides consistent user experience | Simplicity | 3.38 |
| KK. Saves time (for me and for my organization) | Value/ROI | 5.88 |
| LL. Saves money (for my company) | Value/ROI | 5.50 |
| MM. Has accessible support 24x7x365 | Trust/Simplicity | 7.25 |
| NN. Is a comprehensive-enough solution | Control | 5.50 |
| OO. Has a trustworthy data (credible + current + global, and solid methodology) | Trust | 7.50 |
| PP. Prevents breaches, including blended and internal threats | Control | 7.50 |
| QQ. Has low TCO (software/hardware, migration carts, resource efficiency) | Value/ROI | 6.00 |
| RR. Is flexible (configuration + administration + reporting) | Control | 6.63 |
| SS. Facilitates effective management of passwords/identities | Control | 6.38 |
| TT. Is interoperable (integrates with existing infrastructure + other products | Simplicity | 7.13 |
| UU. Is backed by a competent, easy-to-work-with support organization | Simplicity | 7.00 |
| VV. Effectively filters false positives | Control | 6.00 |
| WW. Responds rapidly in optimum sequence | Control | 6.00 |
| XX. Provider high-quality reporting | Control | 7.25 |
| YY. Yields demonstrable ROI | Value/ROI | 5.00 |
| ZZ. Correlator events across disparate solutions | Control | 5.13 |
| ZY. Enables compliance with regulatory/audit requirements | Control | 5.50 |
| ZX. Was same data repository as other products | Simplicity | 5.13 |
| ◀ ▶ ▶| \ CIO - CISO ∕ Net IT – C-Level Comparison ∕ Attrib Rank by Voter Org ∕ | ◀ | |

*Fig. 11D*

|   |   |
|---|---|
|   |   |
|   |   |
|   |   |
|   |   |
| 5.33 | 8.00 |
| 8.17 | 8.75 |
| 6.17 | 7.75 |
| 5.67 | 8.00 |
| 6.67 | 7.75 |
| 5.00 | 6.25 |
| 7.50 | 8.25 |
| 7.67 | 7.50 |
| 7.67 | 8.00 |
| 9.50 | 9.75 |
| 5.33 | 7.75 |
| 7.17 | 7.00 |
| 6.83 | 6.50 |
| 8.00 | 7.50 |
| 8.00 | 7.75 |
| 8.33 | 7.25 |
| 6.33 | 6.25 |
| 6.83 | 7.00 |
| 5.00 | 4.75 |
| 5.50 | 8.25 |
| 6.89 | 7.00 |
| 4.50 | 5.50 |

CIO - CISO / Net IT – C-Level Comparison / Attrib Rank by Voter Org /

*Fig. 11E*

|   |   |   |
|---|---|---|
|   |   |   |
|   |   |   |
|   |   |   |
|   |   |   |
|   |   |   |
|   |   |   |
| 6.38 | 6.00 | 9.50 |
| 7.88 | 7.33 | 7.60 |
| 6.75 | 5.50 | 6.40 |
| 6.75 | 4.83 | 7.60 |
| 8.25 | 8.00 | 9.00 |
| 8.63 | 3.00 | 9.50 |
| 3.13 | 8.00 | 8.20 |
| 6.50 | 7.17 | 6.25 |
| 6.25 | 6.83 | 6.25 |
| 8.63 | 3.33 | 8.80 |
| 6.75 | 8.50 | 8.60 |
| 5.88 | 7.00 | 7.80 |
| 6.63 | 5.67 | 6.25 |
| 6.75 | 8.50 | 8.75 |
| 5.88 | 7.67 | 9.00 |
| 6.63 | 7.17 | 6.80 |
| 8.75 | 6.00 | 6.00 |
| 9.00 | 7.50 | 6.80 |
| 7.38 | 8.33 | 8.20 |
| 8.88 | 6.00 | 6.00 |
| 5.88 | 8.17 | 9.20 |

◀ ▶ ▶| \ CIO - CISO ⟋ Net IT – C-Level Comparison ⟋ Attrib Rank by Voter Org ⟋   ◀

*Fig. 11F*

| PACING GUIDE — STRATEGIC HARMONY  PROOF POINTS SESSION ||
|---|---|
| (Based on specific start and end times in client-approved workshop agenda) ||
| Assessment Module Start/End Times (from agenda):<br>   9:15AM / 12:15 PM = 14 minutes per driver ||
| Item Start Time | DRIVER |
|  |  |
| 9:15 | (10-Minute Module Intro) |
| 9:25 | Scalable |
| 9:39 | Low total cost of ownership |
| 9:53 | Easy to deploy |
| 10:07 | Easy to use |
| 10:21 | (TEAM BREAK) |
| 10:35 | Interoperable |
| 10:49 | Integrated solution |
| 11:03 | Easy to maintain |
| 11:17 | Satisfied, well-known customers |
| 11:31 | Easily accessible tech support |
| 11:45 | Delivers promised product benchmarks |
| 11:59 | High-quality reporting |
| 12:13 | (2-Minute Wrap-Up) |
|  |  |
|  | Contingency drivers if running ahead of schedule:<br>1. Global data sources<br>2. Easy to license |

*Fig. 12*

| PACING GUIDE — STRATEGIC HARMONY   PORTFOLIO SESSION ||
|---|---|
| (Based on specific start and end times in client-approved workshop agenda) ||
| Assessment Module Start/End Times (from agenda): 1:00PM / 4:00PM = 20 minutes per initiative on strategic alignment, 5 minutes on development burden ||
| Item Start Time | DEVELOPMENT INITIATIVE |
|  |  |
| 1:00 | (10-Minute Module Intro) |
| 1:10 | A. Auto-configuration |
| 1:30 | B. Executive dashboard |
| 1:50 | C. Integration with customer |
| 2:10 | D. Full internationalization |
| 2:30 | (TEAM BREAK) |
| 2:45 | E. Live chat tech support |
| 3:05 | F. Real-time access to BMG database |
| 3:25 | (5-Minute Burden Intro) |
| 3:30 | Initiative A burden |
| 3:35 | Initiative B burden |
| 3:40 | Initiative C burden |
| 3:45 | Initiative D burden |
| 3:50 | Initiative E burden |
| 3:55 | Initiative F burden |
| 4:00 | (Move to Session Wrap-Up Module) |
|  |  |

*Fig. 13*

Session #1: Proof Points Audit Easel Templates

Pad 1-A engagement #, pad # date, location    Pad 1-B

| CONTROL: INTEROPERABLE PRODUCT FEATURES | Brand to Beat (and why): _____ SERVICES(S)   OTHER |
|---|---|
| 1-A | 1-B |

Separate page for each driver, no other contents on these pads (both pads: leave blank cover sheet and one overflow page between all driver pages)

*Fig. 14*

Session #2: Product Development Portfolio Assessment – Easel Templates

Pad 2-A          Pad 2-B                        Pad 2-C          — Project ID

| DEVELOPMENT PROJECTS | DRIVERS OF BRAND CHOICE | A RATING | RATIONALE |
|---|---|---|---|
| A. CONSOLE INTEGRATION | 1. INTEROPERABLE...... | 1. | |
| | 2. EASY TO DEPLOY...... | 2. | |
| | 3. EASY TO USE.......... | 3. | |
| B. REGIONAL REPORTING | 4. EASY TO MAINTAIN... | 4. | |
| | 5. CUSTOMIZABLE........ | 5. | |
| C. ETC ... | 6. ETC......................... | 6. | |
| D. | 7. | 7. | |
| E. | 8. | 8. | |
| F. | 9. | 9. | |
| | 10. | 10. | |
| 2-A | 2-B | 2-C | |

SEQUENCE: blank cover > projects (for wall) projects (duplicate, servesas cover sheet for exercise)> separate page for each project (left in original position like slide build (see next slide for example).

(All other spontaneous sheets can come from this pad, which only uses one sheet)

*Fig. 15*

WHITEBOARD 1-C
Proof Points Session

| PRODUCT SCOPE | COMPETITORS | DRIVERS OF BRAND CHOICE | PROOF POINT CATEGORIES |
|---|---|---|---|
| (List current products included in exercise) | (List consensus competitors) | (Use as reference for tracking progress and distinguishing related attributes) | Products/Solutions<br>Features/Functions<br>Support<br>Services<br>Attitude<br>Reputation<br>Endorsements<br>Partners<br>ROV Business Case<br>Riding |

NOTE: IF NO WHITEBOARD OR INADEQUATE ON-PREMISE PREP TIME, MAKE LOOSE LEAF CHART FOR EACH COLUMN (use pad 2-B)

WHITEBOARD 2-D
Portfolio Session

| DEVELOPMENT PROJECTS | DRIVERS OF BRAND CHOICE | BRAND(S) TO BEAT | COMPETITIVE IMPACT |
|---|---|---|---|
| | | (Pick up from morning session pads during lunch break) | (Capture if changes brand to beat, impact on slip/parking) |

NOTE: IF NOT PRINTABLE WHITEBOARD, MUST USE LOOSE LEAF EASEL PAD SHEETS OR COPY DOWN COMPETITIVE IMPACT RESULTS FOR ANALYSIS

*Fig. 16*

Strategic Harmony  Proof Points Inventory

CONTROL PROOF POINTS: REASONS TO BELIEVE BRAND OFFERS EXCELLENT/SUPERIOR CONTROL

| DRIVER DIMENSIONS of Control | PROOF POINTS for CONTROL | | | |
|---|---|---|---|---|
| | SOLUTIONS/ PRODUCTS | FEATURES | SERVICE(S) | OTHER |
| CONTROL DIMENSION 1<br>Brand(s) to Beat: ____<br>Why? ____ | | | | |
| CONTROL DIMENSION 2<br>Brand(s) to Beat: ____<br>Why? ____ | | | | |
| CONTROL DIMENSION 3<br>Brand(s) to Beat: ____<br>Why? ____ | | | | |
| CONTROL DIMENSION 4<br>Brand(s) to Beat: ____<br>Why? ____ | | | | |

*Fig. 17*

Strategic Harmony   Proof Points
Inventory
(CONTROL) PROOF POINTS: REASONS TO BELIEVE BRAND OFFERS
EXCELLENT/SUPERIOR (CONTROL)

|  | PROOF POINTS for (CONTROL) | | | |
|---|---|---|---|---|
| DRIVER DIMENSIONS of (Control) | SOLUTIONS/ PRODUCTS | FEATURES | SERVICE(S) | OTHER |
| CONTROL DIMENSION 1<br>Brand(s) to Beat:____<br>Why?____ | | | | |
| CONTROL DIMENSION 2<br>Brand(s) to Beat:____<br>Why?____ | | | | |

*Fig. 18*

Proof Points Inventory

| Proof Points Inventory for AlphaCo, Inc. | |
|---|---|
| Output from Cristol & Associates team workshop, Session #1, December 14, 2004 | |
| | |
| SIMPLICITY PROOF POINTS | |
| Reasons to Believe AlphaCo is Excellent/Superior at Delivering Simplicity | |
| | |
| | PROOF POINTS for SIMPLICITY |
| DRIVERS OF BRAND CHOICE: <br> Key Dimensions of SIMPLICITY | AlphaCo <br> SOLUTIONS/PRODUCTS |
| | |
| INTEROPERABLE | TMS 1000 |
| | |
| | |
| | |
| | |
| | |
| | |
| | |
| | Look Out |
| | |
| INTEGRATED SOLUTION | TMS 1000 |
| | |
| | |
| | |
| | |
| | |
| | BreachPatrol |
| | |
| | |
| EASY TO MAINTIAN | TMS |
| | |

*Fig. 19A*

Proof Points Inventory

| Proof Points Inventory for AlphaCo, Inc. |||
|---|---|---|
| Output from Cristol & Associates team workshop, Session #1, December 14, 2004 |||
| | | |
| SIMPLICITY PROOF POINTS |||
| Reasons to Believe AlphaCo is Excellent/Superior at Delivering Simplicity |||
| | | |
| PROOF POINTS for SIMPLICITY(continued) |||
| AlphaCo FEATURES | AlphaCo SERVICE(S) | OTHER |
| - Best interrogation of technology (multiple platforms) | - Consulting services team specializing in deployment issues | - Fidelity case stu |
| - Only modular software development lot allowing customers to build their own module to support homegrown apps | - Linux customization services | |
| - Command Line interface enables automation of TMS to embed in customer's enviroment | | |
| - TMS can initiate network assessment through Lookout integration module | | ion Week erope |
| - Only solution with AV module | - Integration | |
| - Live Update integrates with TMS | - Best informatic | |
| - Incident management via RISA creates "TMS Collector" | Produces | |
| | | |
| - Can dump into TMS | | |
| - Can execute scan from within TMS | | |
| - Lowest-touch solution in the category | - Part of MSS is based on maintenance | - 18 consecutive d updates |
| - Easiest-to-update modules | | |
| - Easiest-to-update agents | | (relates to both a |

*Example: fictitious enterprise software company*

*Fig. 19B*

Baseline: Current Competitive Situation

| SIMPLICITY | • Easy to deploy<br>• Interoperable<br>• Easy to use | SUPERIOR<br>SUPERIOR<br>PARITY |
|---|---|---|
| CONTROL | • Timeliness of execution<br>• Effectively prioritize tasks<br>• Customizable | SUPERIOR<br>PARITY<br>INFERIOR |
| TRUST | • Strong track record<br>• Trustworthy data | SUPERIOR<br>PARITY |
| VALUE | • Low total cost of ownership<br>• Demonstrable ROI | INFERIOR<br>PARITY |

CRISTOL & ASSOCIATES

*Fig. 20*

| PRODUCT DEVELOPMENT or IT INITIATIVES: ALIGNMENT WITH DRIVERS OF BRAND CHOICE | | | | |
|---|---|---|---|---|
| | KEY DRIVERS OF BRAND CHOICE | | | |
| DEVELOPMENT INITIATIVES | Timeliness | Effectively Prioritizes | Customizable | Easy to Deploy |
| INITIATIVE A | HIGH | HIGH | LOW | LOW |
| | Doubles information throughput | More data = better accuracy | | |
| INITIATIVE B | HIGH | HIGH | LOW | HIGH |
| | Better prioritization speed execution | Integrates with help desk for more effective prioritizator | | Autorrates key aspects of configuration |
| INITIATIVE C | LOW | HIGH | HIGH | LOW |
| | | User definitions increase confidence | Special interest filters implicit in user groups | |
| INITIATIVE D | LOW | MODERATE | HIGH | HIGH |
| | | Less clutter aids prioritizing | Ease of use means customer is more likely to customize | Can ship with customization |
| INITIATIVE E | LOW | HIGH | MODERATE | LOW |
| | | More data integrated into prioritizing functions | More things can be customized | |
| INITIATIVE F | MODERATE | HIGH | HIGH | LOW |
| | Noticeable increase in retrieval speed | Dramatically improves regional diagnostics and reporting | Enhances role-based views capability | |
| INITIATIVE G | LOW | | LOW | |
| | | | | |
| | | CONTROL | | SIMPLICITY |

*Fig. 21A*

| | KEY DRIVERS OF BRAND CHOICE | | | | |
|---|---|---|---|---|---|
| | Easy to Use | Interoperable | Integrated Solutions | Trustworthy Data | Low TCS |
| | | LOW | HIGH | HIGH | HIGH |
| | | | Integrates with existing console | More data sources = more reliable | Integration sa and increases efftiveness |
| | HIGH | HIGH | HIGH | LOW | HIGH |
| | Fluid workflow, streamlined | Linux compatibility | Technology agnostic | | Integration and increas efftiveness |
| | LOW | | LOW | HIGH | HIGH |
| | | | | Customer perception due to source | Reduces D staff tim |
| | HIGH | NEGATIVE | LOW | | HIGH |
| | Much simpler display without unused modes | New features make total solution less WLAN-compatible | | | Ease of use tra to more effect higher percei |
| | HIGH | LOW | HIGH | MODERATE | MODER |
| | Fewer clicks for most critical functions | | Centralized dashboard improves coordination of applications | More data integrated = more comprehensive | Enables cho without vend |
| | MODERATE | LOW | LOW | HIGH | HIGH |
| | Reduces wait time for authentication | | | Increases senso count for high confidence levels | Automated reporting IT staff |
| | LOW | LOW | HIGH | LOW | LOW |
| | | | The more products, the higher the impact on perceived integration | | |
| | SIMPLICITY | | | TRUST | VALU |

*Fig. 21B*

| COMPETITIVE IMPACT ASSESSMENT (High-Level Summary): Brand X Current Competitive Position and Likely Impact of Development Initiatives | | | | | |
|---|---|---|---|---|---|
| | KEY DRIVERS OF BRAND CHOICE | | | | |
| | Enables Compliance | Prevent Breaches | Effectively Prioritizes Risks | Easy to Deploy | Easy to Use |
| CURRENT PRODUCT | PARITY | SUPERIOR | PARITY | INFERIOR | PARITY |
| | *XYZ may be superior overall, but Acme2 and Acme have | *Except with VA-oriented swtamass (parity with | On balance, parity with Acme2, Acme and Acme4 | Parity with Acme | On balance, parity with Acme and OA; potential significance |
| WITH INITIATIVE A ONLY | SUPERIOR | SUPERIOR | PARITY | PARITY | PARITY |
| | *Only breaks parity in combination with Initiative B, but done | | *Breaks parity w. Acme4 but not others | | |
| WITH INITIATIVE B ONLY | SUPERIOR | SUPERIOR | PARITY | SUPERIOR | SUPERIOR |
| | *Only breaks parity in combination with Initiative B, but done | | Breaks parity w. Acme2 and Acme4, leaving only Acme | Breaks parity w. Acme | |
| WITH INITIATIVE C ONLY | PARITY | SUPERIOR | SUPERIOR | INFERIOR | SUPERIOR |
| | Achieves superiority w. Acme while helping to maintain | Breaks parity with Foundstone for VA-oriented | | | Breaks parity with both OA and Acme; may help insulate |
| WITH INITIATIVE D ONLY | PARITY | SUPERIOR | SUPERIOR | INFERIOR | PARITY |
| | More impact on Foundations than on bigger competitors | | Policy context breaks parity | Breaks parity w. Acme since their VA is not interoperable | Breaks parity w. Acme (their VA is not integrated). |
| WITH INITIATIVE E ONLY | SUPERIOR | SUPERIOR | PARITY | INFERIOR | PARITY |
| | More impact on Foundations than on bigger competitors | | Policy context breaks parity | Breaks parity w. Acme since their VA is not interoperable | Breaks parity w. Acme (their VA is not integrated). |
| WITH INITIATIVE F ONLY | PARITY | SUPERIOR | PARITY | PARITY | SUPERIOR |
| | More impact on Foundations than on bigger competitors | | Policy context breaks parity | Breaks parity w. Acme since their VA is not interoperable | Breaks parity w. Acme (their VA is not integrated). |
| WITH INITIATIVE G ONLY | PARITY | SUPERIOR | SUPERIOR | INFERIOR | PARITY |
| | *Only breaks parity in combination with Initiative B, but does | | Breaks parity w. Acme4 but not others | | |
| WITH ALL INITIATIVES | SUPERIOR | SUPERIOR | SUPERIOR | SUPERIOR | SUPERIOR |
| | CONTROL | | | SIMPLICITY | |

*Fig. 23A*

COMPRESSED DASHBOARD VIEW: COMPETITIVE IMPACT OF PRODUCT DEVELOPMENT PORTFOLIO

KEY DRIVERS OF BRAND CHOICE

| Interoperable | Integrated Solution | Strong Track Record | Trustworthy Data | Low TCO |
|---|---|---|---|---|
| SUPERIOR | PARITY | PARITY | PARITY | INFERIOR |
|  |  | On balance, parity with Acme2; XYZ superior on | On balance, parity with Acme2; XYZ superior on | On balance, parity with OA only because OA essentially |
| SUPERIOR | PARITY | SUPERIOR | SUPERIOR | PARITY |
|  |  | Breaks parity w. Acme2 | Breaks parity w. Acme2 | Breaks parity w. OA |
| SUPERIOR | PARITY | SUPERIOR | SUPERIOR | PARITY |
|  |  | (No incremental impact beyond A | (No incremental impact beyond A | Extends superiority over Acme |
| SUPERIOR | PARITY | PARITY | PARITY | INFERIOR |
| (May actually increase maintenance, but not in proportion to) |  | Breaks parity w. Acme2 | Breaks parity w. Acme2 | Breaks parity w. OA |
|  | PARITY | SUPERIOR | SUPERIOR | PARITY |
|  |  | Breaks parity w. Acme2 | Breaks parity w. Acme2 | *Strengthens XYZ, but not enough to break parity |
| SUPERIOR | PARITY | SUPERIOR | SUPERIOR | PARITY |
|  |  | Breaks parity w. Acme2 | Breaks parity w. Acme2 | *Strengthens XYZ, but not enough to break parity |
| SUPERIOR | PARITY | PARITY | PARITY | SUPERIOR |
|  |  | Breaks parity w. Acme2 | Breaks parity w. Acme2 | *Strengthens XYZ, but not enough to break parity |
| SUPERIOR | PARITY | PARITY | PARITY | INFERIOR |
|  |  | Breaks parity w. Acme2 | Breaks parity w. Acme2 | Breaks parity w. OA |
| SUPERIOR | PARITY | SUPERIOR | SUPERIOR | SUPERIOR |

| SIMPLICITY | | TRUST | | VALUE |
|---|---|---|---|---|
| Interoperable | Integrated Solution | Strong Track Record | Trustworthy Data | Low TCO |

*Fig. 23B*

| COMPRESSED DASHBOARD VIEW: COMPETITIVE IMPACT OF PRODUCT DEVELOPMENT PORTFOLIOS | | | | | |
|---|---|---|---|---|---|
| | CONTROL | | | SIMPLICITY | |
| | Enables Compliance | Prevent Breaches | Effectively Prioritizes Risks | Easy to Deploy | Easy to Use |
| CURRENT PRODUCT | PARITY | SUPERIOR | PARITY | INFERIOR | PARITY |
| WITH INITIATIVE A ONLY | SUPERIOR | SUPERIOR | PARITY | PARITY | PARITY |
| WITH INITIATIVE B ONLY | SUPERIOR | SUPERIOR | PARITY | SUPERIOR | SUPERIOR |
| WITH INITIATIVE C ONLY | PARITY | SUPERIOR | SUPERIOR | INFERIOR | SUPERIOR |
| WITH INITIATIVE D ONLY | PARITY | SUPERIOR | SUPERIOR | INFERIOR | PARITY |
| WITH INITIATIVE E ONLY | SUPERIOR | SUPERIOR | PARITY | INFERIOR | PARITY |
| WITH INITIATIVE F ONLY | PARITY | SUPERIOR | PARITY | PARITY | SUPERIOR |
| WITH INITIATIVE G ONLY | PARITY | SUPERIOR | SUPERIOR | INFERIOR | PARITY |
| WITH ALL INITIATIVES | SUPERIOR | SUPERIOR | SUPERIOR | SUPERIOR | SUPERIOR |
| | CONTROL | | | SIMPLICITY | |
| | Enables Compliance | Prevent Breaches | Effectively Prioritizes Risks | Easy to Deploy | Easy to Use |

*Fig. 26A*

| COMPRESSED DASHBOARD VIEW: COMPETITIVE IMPACT OF PRODUCT DEVELOPMENT PORTFOLIO ||||||
|---|---|---|---|---|---|
| SIMPLICITY || TRUST || VALUE |
| Interoperable | Integrated Solution | Strong Track Record | Trustworthy Data | Low TCO |
| PARITY | SUPERIOR | PARITY | INFERIOR | PARITY |
| SUPERIOR | SUPERIOR | PARITY | PARITY | PARITY |
| SUPERIOR | SUPERIOR | PARITY | SUPERIOR | SUPERIOR |
| PARITY | SUPERIOR | SUPERIOR | INFERIOR | SUPERIOR |
| PARITY | SUPERIOR | SUPERIOR | INFERIOR | PARITY |
| SUPERIOR | SUPERIOR | PARITY | INFERIOR | PARITY |
| PARITY | SUPERIOR | PARITY | PARITY | SUPERIOR |
| PARITY | SUPERIOR | SUPERIOR | INFERIOR | PARITY |
| SUPERIOR | SUPERIOR | SUPERIOR | SUPERIOR | SUPERIOR |
| SIMPLICITY || TRUST || VALUE |
| Interoperable | Integrated Solution | Strong Track Record | Trustworthy Data | Low TCO |

*Fig. 26B*

| DEVELOPMENT BURDEN (High-Level Summary): Resource Requirements and Task Complexity of Product Development Initiatives | | |
|---|---|---|
| | DEVELOPMENT BURDEN | |
| PRODUCT DEVELOPMENT INITIATIVES | Resource Requirements | Task Complexity |
| INITIATIVE A | VERY HIGH | MODERATE |
| INITIATIVE B | MODERATE | LOW |
| INITIATIVE C | LOW | MODERATE |
| INITIATIVE D | MODERATE | MODERATE |
| INITIATIVE E | HIGH | MODERATE |
| INITIATIVE F | VERY HIGH | HIGH |
| INITIATIVE G | LOW | LOW |

▶▎ ▎▶▎ \ Alignment Summary ╱ Competitive Assessment ╱ Development Burden ╱ RECAP ╱  ◀▎

*Fig. 27*

**Development Priorities
Based on Overall Strategic Importance**

Ranking from greatest to least strategic importance
(combining competitive impact + alignment with brand drivers):

|  | AGGREGATE IMPORTANCE INDEX | ALIGNMENT INDEX | COMPETITIVE INDEX |
|---|---|---|---|
| 1. Initiative B | 100 | 100 | 100 |
| 2. Initiative D | 81 | 94 | 68 |
| 3. Initiative A | 76 | 87 | 65 |
| 4. Initiative E | 73 | 61 | 85 |
| 5. Initiative C | 69 | 76 | 62 |
| 6. Initiative F | 66 | 81 | 51 |
| 7. Initiative G | 47 | 49 | 45 |

*All initiatives indexed to highest-performing initiative.
CRISTOL & ASSOCIATES

*Fig. 29*

Strategic Harmony™ Priority Guide:
Summary Rationales for Overall Strategic Importance of Each Product
Development or Information Technology Initiative

| | |
|---|---|
| 1. Initiative B | ▪ #1 in alignment, #1 in competitive impact<br>▪ High to moderate impact on 7 of 10 attributes (High on 5)<br>▪ Breaks 3 parity gridlocks + improves 2 others, and mitigates an inferiority gap<br>▪ Dramatic impact on Simplicity profile |
| 2. Initiative D | ▪ #2 in both alignment and competitive impact<br>▪ High to moderate impact on 7 of 10 attributes (High on 4)<br>▪ Erases inferiority gap on 'Easy to Use', strengthens position on all 5 parity attributes |
| 3. Initiative A | ▪ High to moderate impact on 5 of 10 attributes (High on 2)<br>▪ Breaks 2 parity gridlocks, mitigates inferiority on 'Easy to Use'<br>▪ Helps enable delivery of Initiative G |
| 4. Initiative E | ▪ Mode rate impact on 5 of 10 attributes (High on none)<br>▪ Breaks 2 parity gridlocks, but only among customers with product defect issues<br>▪ Only initiative that breaks parity gridlock on "Enables Compliance" |
| 5. Initiative C | ▪ High to moderate impact on 4 of 10 attributes, but only for customers in Segment 2<br>▪ Eliminates inferiority gap on 'Easy to Use,' but only among customers in Segment2<br>▪ Breaks no parity gridlocks |
| 6. Initiative F | ▪ High to moderate impact on 3 of 10 attributes, but only for customers in Segment 1<br>▪ Breaks no parity gridlocks<br>▪ Ranked last in competitive impact |
| 7. Initiative G | ▪ High to moderate impact on 2 of 10 attributes<br>▪ Breaks 1 parity gridlock<br>▪ Likely negatively impact support burden and Simplicity attributes |

Groupings: I (Initiatives B, D); II (Initiatives A, E); III (Initiatives C, F, G)

CRISTOL & ASSOCIATES

*Fig. 30*

BUSINESS METHOD FOR INTEGRATING AND ALIGNING PRODUCT DEVELOPMENT AND BRAND STRATEGY

PRIORITY CLAIM

This application claims priority to U.S. Provisional Application Ser. No. 60/544,781 filed Feb. 14, 2004, entitled "METHOD FOR INTEGRATED ALIGNMENT OF PRODUCT DEVELOPMENT STRATEGY AND BRAND STRATEGY IN MARKETING MANAGEMENT," and U.S. Provisional Application Ser. No. 60/585,171 filed Jul. 2, 2004. Each and all of the foregoing applications are incorporated by reference as if fully set forth herein.

FIELD OF THE INVENTION

The preferred embodiment of the invention relates to improving a business brand identity.

BACKGROUND OF THE INVENTION

Brand equity is a significant contributor to the financial value of most successful firms. Brand equity represents the value inherent in the ability of a firm's brands to command premium prices for goods and services. The premium prices that customers are willing to pay for branded goods and services as compared to identical non-branded goods and services can account for more than half the value of a firm. In other words, intangible brand equity often is worth more than a firm's tangible assets. Growing brand equity requires strong brand identity. Strong brand identity requires extensive coordination between various teams within a firm such as marketing, product development, and research and development. It is obvious that each of different teams often have different levels of discipline, levels of sophistication, and sets of assumptions based on overlapping yet divergent views of the marketplace. However, many successful companies are unable to coordinate the various teams to maximize their brand identity. To date, this is because integrating and aligning teams has required major organizational, management, and process changes that are expensive and time consuming. The preferred embodiment of the invention addresses this problem and many more.

SUMMARY OF THE INVENTION

The preferred embodiment is directed to a business method that improves brand identity by effectively allocating product development resources and prioritizing projects based on a systematic approach of defining assumptions that drive brand development and assessing a product development portfolio thereon. In one embodiment, the invention is principally employed by consultants or consulting firms to advise their client companies. However, the invention may also be employed directly by client companies without the use of consultants. The invention reprioritizes initiatives within a product development portfolio based on its potential competitive impact, its likely contribution to brand equity, its risk and required resources. Reprioritization is accomplished by performing and integrating assessments of the client company's situation. These can include 1) a baseline assessment of the current competitive situation for a client company's brand and current product or service portfolio; 2) an evaluation of the degree to which each planned product development initiative will help the brand identity most; 3) an assessment of each initiative's relative contribution to brand equity and its level of alignment with key drivers of brand choice; 4) an assessment of each initiative's likely competitive impact on brand identity as compared to competitor brands; and 5) an assessment of the relative human and financial burden of each planned initiative. The assessments are then integrated to produce decision intelligence for strategically reprioritizing initiatives within the product development portfolio, identifying gaps in the portfolio, and reallocating development resources accordingly. The client company's current situation will determine which implementing approach of the invention is most appropriate: 1) the full method or 2) the streamlined method. The full method is most appropriate when the company's brand strategy is either underdeveloped or in need of updating. It includes a process for developing a "Brand Strategy Architecture" that encompasses multiple elements required as inputs to the product development portfolio assessment. The streamlined method is most appropriate when the client company already has the serviceable equivalent of a "Brand Strategy Architecture" or the drivers of brand choice have been adequately identified and prioritized. Alternatively, any method in between the streamlined and full method may be utilized or a combination of methods may be utilized. The decision on which method to utilize can be based on an assessment of the client company's current level of sophistication on brand strategy or the availability of recent brand choice research that adequately identifies and prioritizes drivers of brand choice.

BRIEF DESCRIPTION OF THE DRAWINGS

FIG. 7 is another example of the Strategic Harmony™ software display in the first embodiment.

FIG. 8 is an illustration from the first embodiment that shows the Application Consensus Builder tool.

FIG. 9 is an illustration from the first embodiment that shows the correlation coefficients.

FIGS. 10A-F depict portions of an illustration from the first embodiment that shows how the output of the Consensus Builder tool displays in Microsoft Excel;

FIGS. 11A-F depict portions of another illustration from the first embodiment that shows the output of the Consensus Builder tool.

FIG. 12 is an example from the first embodiment of the "Proof Points Pacing Guide" that Application workshop facilitators use to set workshop pacing targets.

FIG. 13 is an example from the first embodiment of the "Portfolio Pacing Guide" that Application workshop facilitators use to set workshop pacing targets.

FIG. 14 is a depiction from the first embodiment of the templates used for capturing Proof Points Workshop output.

FIG. 15 is a depiction from the first embodiment of the templates used for capturing Product Development Portfolio Workshop output.

FIG. 16 is a depiction from the first embodiment of the templates used for whiteboards in facilitating required team discussions during Proof Points and Product Development Portfolio Workshops.

FIG. 17 is an illustration from the first embodiment of the Proof Points Inventory template designed for output to Microsoft Excel workbooks.

FIG. 18 is an illustration from the first embodiment that shows the four locations of the factor name field that changes with each sheet of the Proof Points Inventory workbook.

FIGS. 19A-B depicts portion of an example from the first embodiment of a completed Proof Points Inventory.

FIG. 20 is an example from the first embodiment of a "competitive situation dashboard."

FIGS. 21A-B depicts portion of an example from the first embodiment of how results display from an Alignment Assessment of a product development portfolio.

FIGS. 23A-B depicts portion of an example from the first embodiment of how results display from a Competitive Impact Assessment of a product development portfolio.

FIGS. 26A-B depict portions of an example from the first embodiment of a "compressed dashboard view" of the Competitive Impact Assessment that eliminates rating rationales text.

FIG. 27 is an example from the first embodiment of how results display from a Burden Manageability Assessment.

FIG. 29 is an example from the first embodiment of Overall Strategic Importance rankings and indices that shows each importance index's Alignment and Competitive components.

FIG. 30 is an example from the first embodiment of the side-by-side display of rankings and indices for Overall Strategic Importance and Burden Manageability for comparison and input to balancing trade-offs between likely impact in the marketplace and resource requirements.

DETAILED DESCRIPTION OF THE PREFERRED EMBODIMENT

Figure 1A:
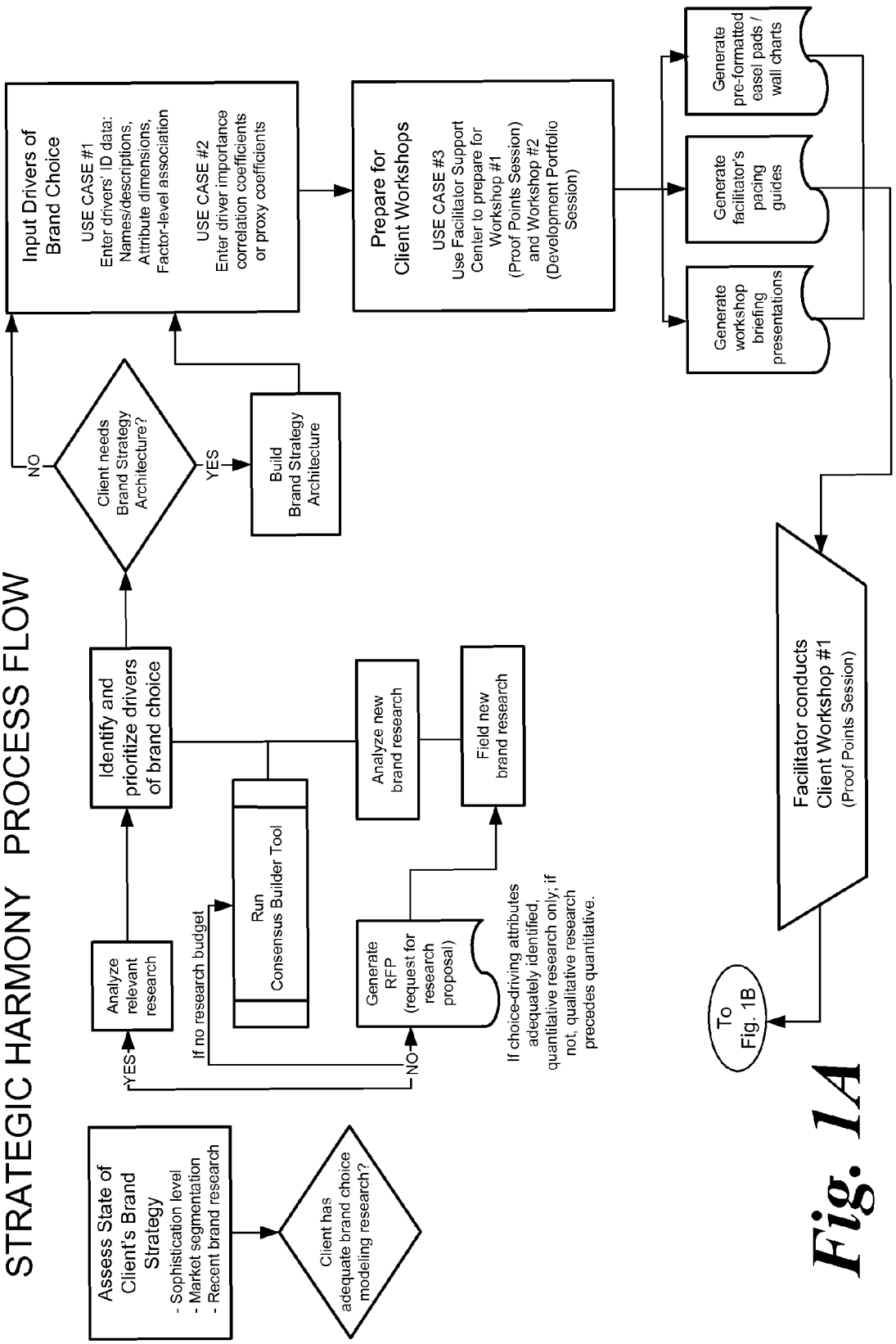
FIGS. 1A-B depict a flowchart from the first embodiment showing where the nine basic use cases in the Strategic Harmony™ ("Application") software specification fit in the context of the overall business method process flow.

The Application software is the means to implement the preferred embodiment of the claimed business method. The Application software specification explains the preferred embodiment of the claimed business method. Accordingly, the software specification herein details the preferred embodiment of the invention.

1.1 Software Development Project Description. The software to be developed is to support the administration of Application—a proprietary business method developed principally for use by management consulting or marketing consulting firms. The objective of this software development project is to provide a prototype application that supports a consulting team's administration of Application, including collecting and entering specified inputs, analyzing inputs, generating and manipulating outputs, and building client presentations of results and recommendations. (A tool for calculating project ROI is envisioned; so is a tool for generating a Customer Research Request for Proposal for client company primary research designed specifically to produce data that feeds the Application model—but neither is required for the initial prototype.) From a software perspective, it is important to note that Application is not a project management application for actual product development projects. Enterprise software applications for managing approved development projects, and their assigned resources, already exist. These may be used more productively after Application helps a company decide how to reprioritize and/or redefine its development portfolio and allocate resources within it. But there is no requirement at this time to integrate the software prescribed in this use case with existing project management or portfolio management applications.

1.2 Terms and Definitions. The term "product development initiative" is used throughout this document in lieu of "product development project" to eliminate confusion, so that the word "project" can refer exclusively to the software development project described herein—and not to projects in the companies whose strategies are being assessed. Also, the phrase "client company" is used to indicate a business client of a consulting firm using this software, as distinguished from a "client" that refers to a client computer in a client-server computing environment. As a precursor to feature specifications and use cases described in this document, this section defines Application assessments, assessment metrics and outputs, and seven supporting tools. (The tools will not require full functionality in the software prototype; the degree to which each will function will be discussed with the software developer after review of this document.)

Portfolio Assessments—The four assessments previously referenced provide context for terms and definitions essential to the software application. Before defining those terms, following is a brief description of the four assessments: 1. Assessment of current product(s)' alignment with customer perceptions of the "ideal" brand; 2. Assessment of planned product development initiatives' likely strategic impact on brand equity; 3. Assessment of planned product development initiatives' likely competitive impact; and 4. Assessment of the relative development burden of each product development initiative.

Assessment Metrics and Outputs—Application assessment outputs are a combination of qualitative judgments made by experienced consultants—transcending the software application itself—and quantitative outputs generated by the software application's use of best practices templates, specified strategic filters, and prescribed underlying mathematics to assess and prioritize various inputs. Quantitative output is used primarily to prioritize specific variables within selected sets of attributes, projects, or resource burdens. As such, the quantitative outputs calculated by the software are expressed as the following nine metrics (definitions of each follow). These manifest as indices and/or rankings representing the relative importance of variables assessed within each metric: 1. Category Adoption Drivers Importance Index; 2. Brand Choice Drivers Importance Index; 3. Alignment of Product Development Initiative with Category Adoption Drivers; 4. Alignment of Product Development Initiative with Brand Choice Drivers; 5. Competitive Impact of Product Development Initiative; 6. Overall Strategic Importance of Product Development Initiatives; 7. Resource Requirements of Product Development Initiative; 8. Complexity of Product Development Initiative; 9. Overall Priority Based on Integrated Assessments (and Application Composite Priority Score). The following are definitions of each output listed above.

Category Adoption Drivers Importance Index. Category adoption drivers are the considerations in the minds of a client company's customers that drive their decision to adopt or not adopt a product or service category that they have not yet purchased. In other words, what factors make a product or service category attractive enough to merit customers' serious purchase consideration—before they ever get to the stage of evaluating specific brands? For example, in the category of color laser printers for businesses, category adoption drivers may include the need to save money over the long haul by reducing outsourcing of color printing jobs or the desire to make a small business look more professional by cost-efficient use of color in documents intended for their customers. Understanding the relative importance of what is usually a multitude of such drivers is a key to both effective product development and marketing communications, and particularly important in emerging, less mature categories. The Category Adoption Drivers Importance Index expresses this relative importance for each driver, from a customer perspective.

Figure 32:
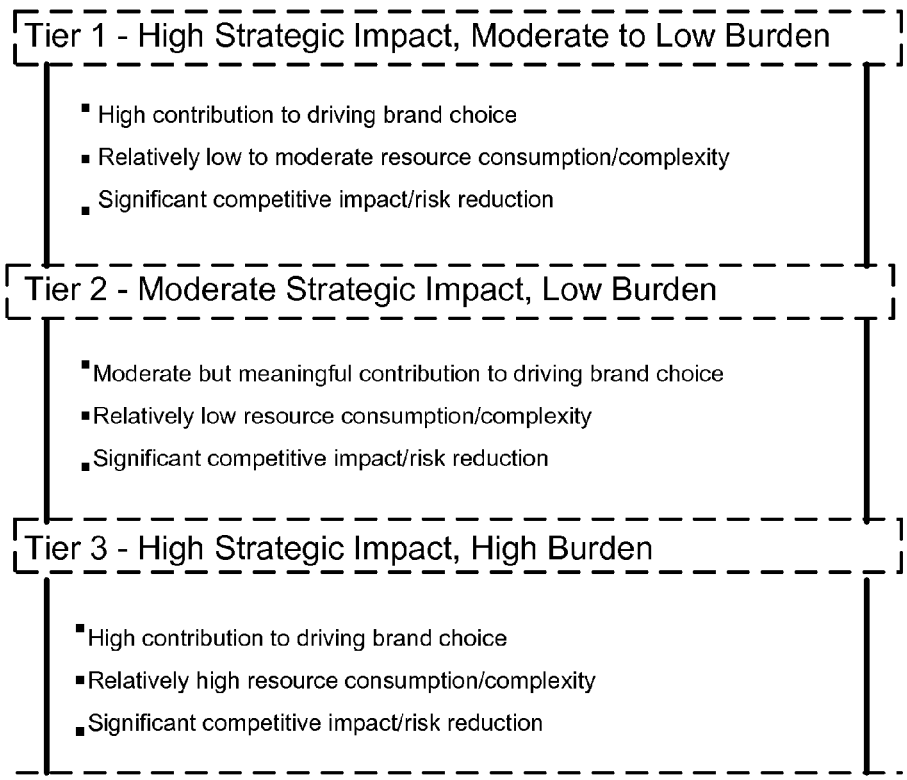
FIG. 32 depicts an illustration of a Tiered Approach to Categorizing Development Priorities Via Integrated Assessments.

FIG. 32 depicts an example of a tiered approach to categorizing development priorities via integrated assessments. The tiered approach depicted includes Tier 1, Tier 2, and Tier 3. Tier 1 is categorized as being a tier having high Strategic Impact and moderate to Low Burden. Tier 1 is defined by a high contribution to driving brand choice, a relatively low to moderate resource consumption/complexity, and a significant competitive impact and/or risk reduction. Tier 2 is categorized as being a tier having moderate strategic impact and low burden. Tier 2 is defined by a moderate but meaningful contribution to driving brand choice, a relatively low resource consumption and/or complexity, and a significant competitive impact and risk reduction. Tier 3 is categorized as being a tier having high strategic impact and high burden. Tier 3 is defined by a high contribution to driving brand choice, a relatively high resource consumption and/or complexity, and a significant competitive impact and/or risk reduction.

Brand Choice Drivers Importance Index. Brand choice drivers are the considerations in the minds of a client company's customers that determine (once they decide to adopt a category or repurchase within a category already adopted) how they differentiate between Brand X and Brand Y. These choice-driving attributes define the characteristics of the "ideal brand" as perceived by the customer. In the business color laser printer example, such attributes cluster under high-level factors such as performance, reliability, simplicity, and value. Each of those abstract, high-level factors has multiple dimensions that are more concrete; for example, simplicity may comprise specific attributes, or choice drivers, such as easy to purchase, easy to install, easy to use, easy to upgrade, and easy-to-manage supplies. A customer's perceptions of each brand on brand choice drivers, then, will determine whether HP, Lexmark, Canon, or some other brand of color printer is actually purchased. In any product or service category, there may be as many as 20 to 35 discrete attributes that play a significant role in brand choice dynamics. As with category adoption drivers, understanding the relative importance of brand choice drivers is a key to both effective product development and marketing communications—and of utmost strategic importance in more mature, established categories where category adoption is in the past and competing brands are now fighting it out for market share. The Brand Choice Drivers Importance Index expresses this relative importance for each driver, from a customer perspective.

Alignment of Product Development Initiative with Category Adoption Drivers. Having established an importance hierarchy for category adoption drivers, each of the client company's planned product development initiatives can be assessed in terms of how well aligned it is with those considerations that are driving the customer toward category adoption. This assessment is ideally provided by client company primary research, but in the absence of such research may be supplied by consensus among internal company experts on customer needs and market conditions. Regardless of input source, each development initiative will be determined to have one of five levels of impact on how the client company's brand will be perceived as providing the customer benefits implied in each specific adoption driver. These five possible impact levels ("Alignment Ratings") are expressed subjectively as: high impact, moderate impact, low impact, no impact, or negative impact. In the software, different quantitative values will be assigned to each of those five levels and an Alignment Index will be calculated.

Alignment of Product Development Initiative with Brand Choice Drivers. Having established an importance hierarchy for brand choice drivers, each of the client company's planned product development initiatives can be assessed in terms of how well aligned it is with characteristics of the "ideal brand." This assessment is also ideally provided by client company primary research, but in the absence of such research may be supplied by consensus among internal company experts on the degree to which a particular development initiative would likely impact customer perceptions of their brand. Regardless of input source, each development initiative will be determined to have one of the same five levels of impact ("Alignment Ratings") described above on how positively the client company's brand will be perceived on each brand attribute that drives brand choice. In the software, different quantitative values will be assigned to each of those five levels and an Alignment Index will be calculated for each product development initiative.

Competitive Impact of Product Development Initiative. Based on results of the assessment of the client company's current product(s), each development initiative is assessed for potential competitive impact at eight possible levels describing the degree to which it helps the client's company's competitive situation where help is most needed. Some development initiatives, even though responding to customer needs for a certain feature or product, may strengthen brand perceptions only where the brand is already strong and perceived to be superior on a particular brand choice driver. But other initiatives may close critical gaps vs. a strong competitor or even "leapfrog" the client company's brand over that competitor to enable a legitimate claim of superiority on a particular brand choice driver where the current product is relatively weak. The latter case has more competitive impact than the former, and would therefore be rated at a much higher impact level and is, accordingly, assigned a higher quantitative value. In the software, these quantitative values will be used to produce a Competitive Impact Index for each product development initiative.

Overall Strategic Importance of Product Development Initiative. Overall strategic importance of each initiative, relative to other initiatives in the product development portfolio, is a composite of the three measures immediately above (or two, in more mature categories where category adoption drivers are less relevant)—combining for each initiative its competitive impact ranking with its ranking on alignment with drivers of brand choice (and/or drivers of category adoption if relevant). Together, without regard for development burden, these provide a composite ranking of the overall strategic importance of each development initiative relative to the other initiatives either planned or under serious consideration in the development portfolio. Aggregately, these rankings also provide an assessment of the total portfolio on both alignment and competitive impact as a group of initiatives, possibly pointing the client company to the need for adding or replacing initiatives to strategically strengthen the portfolio overall. By combining the Alignment Index and Competitive Impact Index (both described above), the software will produce an Overall Strategic Importance Index for each product development initiative. Resource Requirements of Product Development Initiative. Each product development initiative carries a projected resource requirement of people and money. In the enterprise software business, for example, the resource requirement may be as straightforward as X number of internal developer weeks or as complex as some combination of outsourcing and technology acquisition. Client company internal consensus within the product development organization will determine whether the resource requirement of any one development initiative, relative to the other planned initiatives, is very high, high, moderate, or low. A relative quantitative value is assigned accordingly. This resource measure, along with the relative complexity (defined below), provides a picture of overall resource burden of one initiative vs. another—a burden that can be revisited for resource allocation purposes in light of each initiative's overall strategic contribution as assessed by the alignment and competitive impact measures above. Complexity of Product Development Initiative. Some product development initiatives require a lot of human and financial resources, but are actually relatively straightforward in terms of knowing how to do them and managing risks. Other initiatives—even some with relatively lower human resource requirements—may be sufficiently complex that the client company has not yet "cracked the code" on how to get it done, so the risks and uncertainties are greater. Perhaps invention, further research, or technology acquisition/licensing are required. So complexity augments resource requirements as another component of overall development burden. As with the resource requirements assessment, client company internal consensus within the product development organization will determine whether the complexity of any one development initiative, relative to the other planned initiatives, is very high, high, moderate, or low. A relative quantitative value is assigned accordingly. Application software will weight resources: complexity by a ratio that the consultant users prescribe based on client company circumstances. A product of that ratio will be a ranking of the overall relative development burden of each development initiative, incorporating both resource requirements and complexity in generating a Burden Manageability Index. Overall Priority Based on Integrated Assessments. To balance the strategic filters applied in each of the Application assessment modules, the alignment assessment, competitive assessment, and development burden assessment must all be integrated to produce an overall recommendation of relative priority among the initiatives in the product development portfolio. Although this is in part a subjective process driven by experienced consultants who are users of the software, it is based substantially on underlying mathematics that the software will automate to produce a master Application Priority Guide that the consultant may modify as subjectivity dictates. Further, an optional Application Composite Priority Score ("CPS") takes the overall strategic priority (alignment plus competitive impact) of each initiative and modifies it by counterbalancing the development burden to produce one composite score for each product development initiative, reflecting full integration of all three types of product development portfolio assessments. CPS is the highest-level Application metric in that it reflects the results of all assessments in a single comparative score for each initiative in a portfolio. Support Tools—Three software tools will support the consultant in collecting required inputs to feed Application assessments: (1) a Consensus Builder tool, (2) a Proof Points Inventory tool, and (3) a Facilitator Support toolset. A fourth tool, the Interactive Methodology Flowchart, helps the consultant find his or her way through the overall input, assessment, and analysis phases of Application administration. Additional tools envisioned for the finished application—but not required in prototype software—include an ROI analysis tool, a customer research Request For Proposal tool, and a reference library containing best practices information and training tutorials. (These are not discussed immediately below but are described in more detail in relevant Section 2 uses cases.) Consensus Builder Tool. In some client company circumstances where there is no existing quantitative research that provides the coefficients required to determine the first two indices listed above, "proxy" coefficients can be substituted. Proxy coefficients are determined by use of a tool called the Consensus Builder. This tool, designed to harness internal knowledge within the client company organization and drive consensus regarding the relative importance of certain variables, using a multi-voting technique, is currently modeled in Microsoft Excel and is to be rebuilt as an integrated, native part of Application software. As noted in Section 2.2, the Consensus Builder is only used on an alternative path that occurs when proxy coefficients are required. Since a Strategic Harmony™ implementation can be completed without Consensus Builder when proxy coefficients are not required, this document does not include Consensus Builder specifications. A Consensus Builder use case will be prepared to append to this document and, based on software developer feedback, decisions will be made on how to handle inclusion of Consensus Builder in the prototype system and/or whether to link to the standalone Excel version in some way. Proof Points Inventory Tool. Integral to assessment of a client company's existing product portfolio—which in turn serves as a baseline for assessing the competitive impact of product development initiatives—is a tool called the Proof Points Inventory. This is a templated matrix that is used to capture reasons for customers to believe that the client company's brand excels on certain characteristics of the "ideal brand." Its input is simply text bullet points, but Application software will be required to count the number of bulleted text entries per matrix cell, subtotal and total them, and search for certain specified words and count their incidence of occurrence. The template currently exists only in Microsoft Excel. Facilitator Support Toolset. Consultants administering Application will, in most cases, be required to facilitate in-person work sessions with teams from the client company to gather inputs for analysis. The information that must be gathered is very specific; the process for gathering it is highly structured in both sequence and format, based on field-tested facilitation experience. A Facilitator Support Center in the software will provide various templates for formatting easel pads and/or whiteboards to capture the required inputs in each client company work session. Once printed to hardcopy, these can then be enlarged or manually copied by a graphic artist for use in the actual session. Or, the templates can be used on a laptop computer by a keyboard recordist to make a digital record of the session in real time. The tool also provides a timings worksheet for planning out a detailed schedule of events, and their pacing, in each client company work session. Interactive Methodology Flowchart Tool. The Strategic Harmony methodology is graphically represented by a process flowchart that is conducive to interactivity—whereby a consultant could click on any box on the flowchart and see the steps involved, prescribed sequence, and any best practices templates or information available for those steps.

1.3 General Requirements—In lieu of building a commercial-grade Application software application that is fully functional, secure, collaborative, interoperable with multiple operating systems, and supported with built-in online help, requirements for this initial project are limited to building a working prototype that serves two purposes: (1) enabling a live demo of all key features and functions, with high-quality graphical display of information and automated mathematic calculations, and (2) providing an architectural foundation that a larger development team can ultimately build upon to complete and further evolve the application.

Figure 1B:
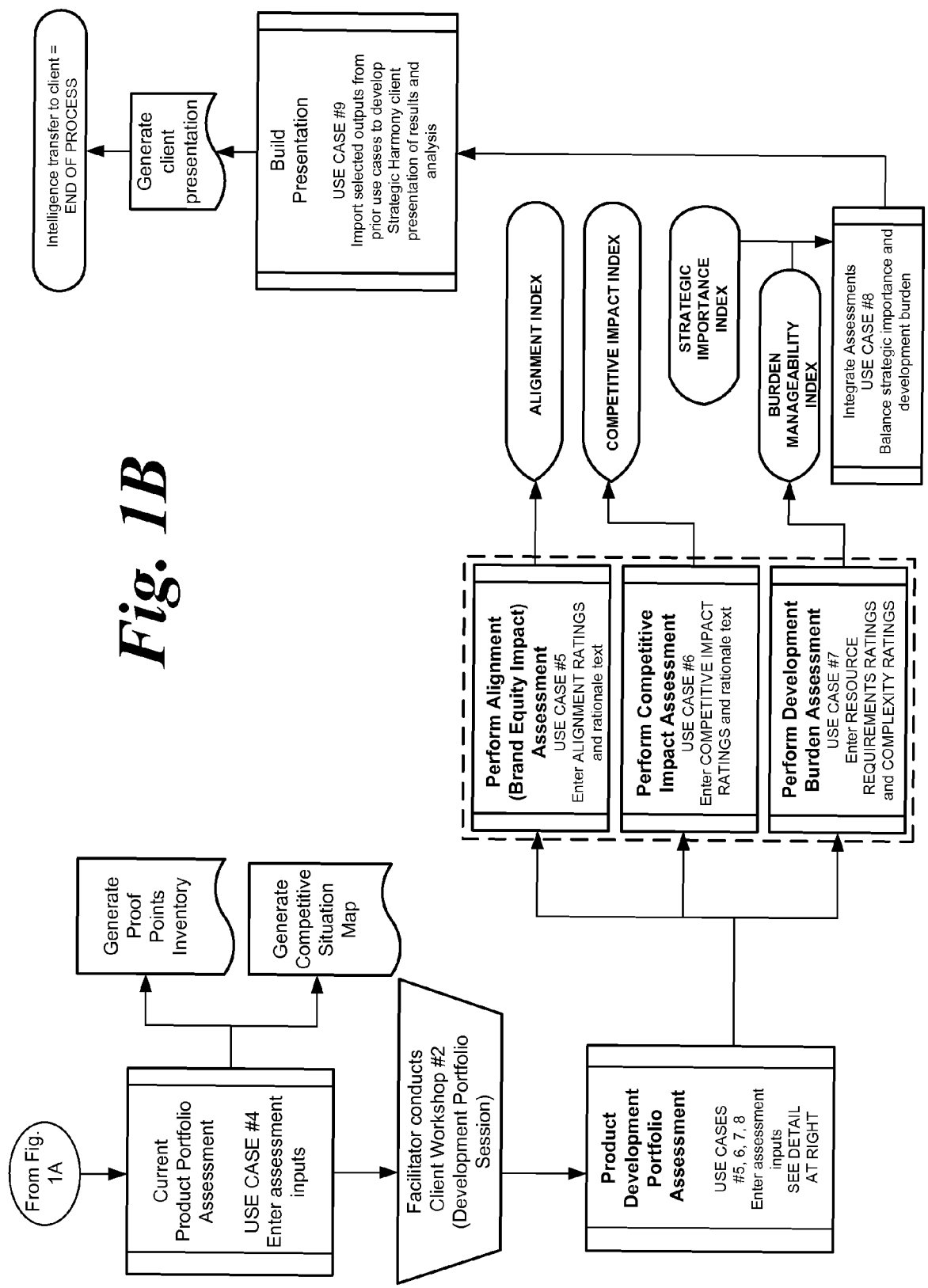

The accompanying FIGS. 1A-B provides the software developer with an overview of Application process flow and provides visual context for the first nine use cases contained in this document. Technology Requirements—Basic assumptions for prototype software are: (1) that the software is intended for use by the consultant on a client running Windows XP, with the application engine and business logic residing on a server, and (2) that a Web browser will be used on the client to navigate the application. Server platform will be left to the software developer, based on considerations of developer preferences, efficiency, and effectiveness, and what can likely be built upon in the future by a larger consulting firm. User Interface Requirements—As depicted in the accompanying drawings, most information to be graphically displayed is quite straightforward and represented simply in bar graphs, 2-D matrices (that could perhaps be more dimensional), text, and listings of rankings—but it will be important that all graphics are very professional looking, attractively dimensional, aesthetically colored, but highly readable. Specific interface requirements are best implied by the features, uses and actors described in the remainder of this document. Cristol & Associates will defer to the software developer on interface issues, contributing suggestions where appropriate (based on having worked extensively with the Application methodology and the Excel-based and PowerPoint-based forerunners of the interface).

1.4 Overview of Features—Below is a high-level overview of Application feature sets, including: 1. Home page; 2. Process overview and monitoring; 3. Inputs administration; 4. Assessments administration; 5. Analysis administration; 6. Presentation administration; For this initial prototype—since no ROI module, Customer Research RFP module, reference library, or Help module is required—all four can be depicted in the prototype with a placeholder page accessible from a navigation tab/link on the home page.

Figure 2:
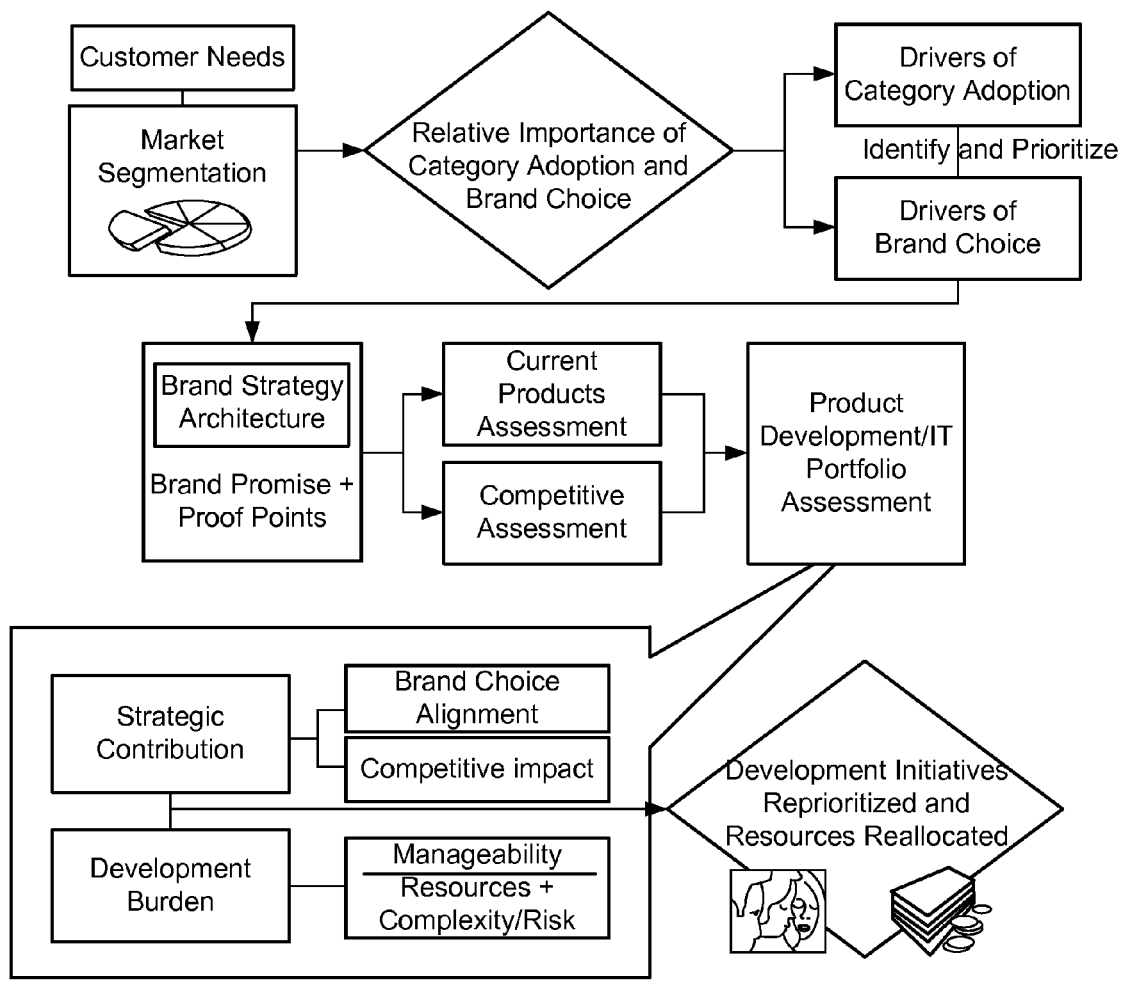
FIG. 2 introduces the full method in first embodiment.
Figure 3:
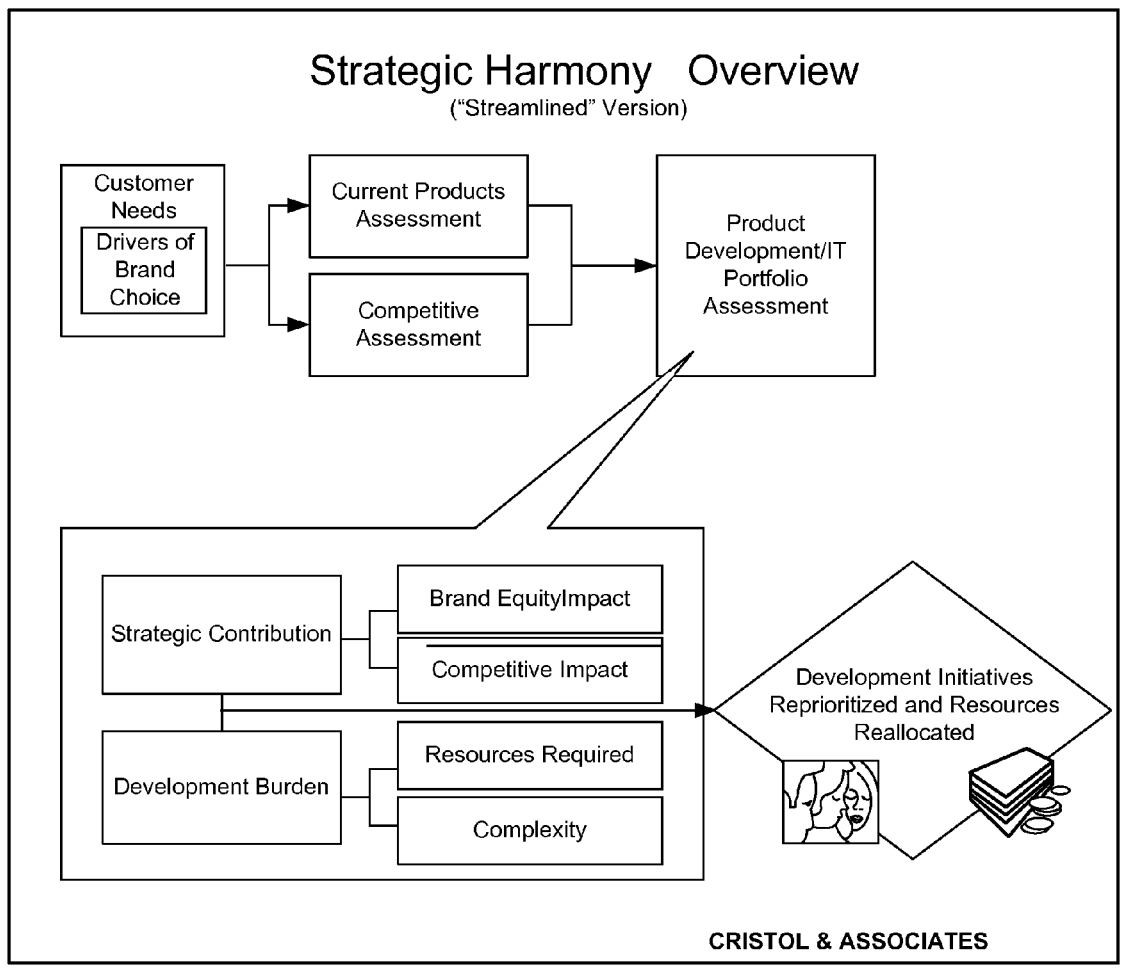
FIG. 3 introduces the streamlined method of the first embodiment.

Home Page—This section describes the required functionality of the Application home page. This is the first page that will be presented to the user upon navigation to www.strategicharmony.net (a Cristol & Associates registered domain name) or a designated substitute URL. It allows users to log on to the system, and then presents navigation links to all features—along with text that welcomes authenticated users and provides a brief overview paragraph describing Application and a paragraph describing the software site and available tools. Process Overview and Monitoring—This page (see FIG. 2) orients the user to the Application model and methodology and provides a visual interactive map of the process for implementation. It can also serve as a tracking visual that can be used to monitor the progress of a particular implementation. Clicking on any text box will link to an explanation of that part of the process, as well as any associated inputs, outputs, and examples. (FIG. 3 represents the "streamlined" version of the Application model, which is used for client companies that may not need a Brand Strategy Architecture and prefer to proceed directly to product portfolio assessment after identifying and prioritizing drivers of brand choice. This screen will be used in the same ways as FIG. 2, as an alternative version that may be selected by the user in Use Case #1.)

Inputs Administration—This feature set enables users to collect, archive, and access all the client company inputs required for a Application implementation as detailed in Section 2 use cases. It allows users to: (1) enter the consulting client's specific market segment names and profile characteristics, where applicable; (2) administer the Consensus Builder tool; (3) import a client-specific Brand Strategy Architecture from Microsoft PowerPoint; (4) import or manually enter drivers of brand choice and/or category adoption and, if available, their correlation coefficients, as well as linking to any customer research studies or excerpts approved as input to a particular implementation; (5) administer the Facilitation Support tool to select and populate pre-formatted templates for use in facilitating the in-person team work sessions designed to capture client company inputs; (6) administer the Proof Points Inventory tool; (7) enter the client company's product development portfolio, including each development initiative being assessed; (8) enter the client company R&D experts' estimate of resource requirements and task complexity. This feature set also defines the means by which the parameters for every input can be added, modified or deleted. Where specific display formats are important to the functions listed above, Excel- or PowerPoint-protyped screen shots are shown in Section 3.

Assessments Administration—This feature set allows the user to manipulate the inputs above to conduct Application assessments. It enables administration of the four different assessments referenced previously, known to users by the following "shorthand" labels and based on inputs as noted below:

Baseline Assessment—Current Products' Alignment. (Based on drivers of brand choice entered in Inputs Administration.) Assessment 1—Development Portfolio Alignment.—Based on drivers of brand choice entered in Inputs Administration.) Assessment 2—Development Portfolio Competitive Impact. (Based on competitive assessment derived from Proof Points Inventory data entered in Inputs Administration). Assessment 3—Development Burden. (Based on the client company's R&D experts' estimate of resource requirements and task complexity as entered in Inputs Administration.) Excel-prototyped screen shots for each assessment are shown in the accompanying drawings as specifically cross-referenced in Use Cases #4, 5, 6 and 7. Calculations and underlying mathematics required for each assessment are specified in the relevant use cases in Section 2.

Analysis Administration—This feature set assists the user in integrating the assessments completed in Assessments Administration to produce a consolidated set of outputs and insights that will ultimately be used in presentation building. Analysis Administration will provide users with a best-practices Q&A format for deriving conclusions and recommendations, and for optimal use of the matrix display formats shown in the accompanying drawings. Presentation Administration—This feature set enables the user to build a Web-based or standalone PowerPoint presentation to the client company containing results and recommendations from the Application implementation. It also provides access to a sample presentation prepared by Cristol & Associates, which may serve as an editable template for the user. 1.5 Identification of Actors—For the prototype, focus is only on users and not on those responsible for installation and maintenance. Primary user is the Administering Consultant; secondary users are Consulting Team Members (who collectively function as one actor because of similar needs relative to the system) and the Consultant Facilitator, as explained below. The only users external to the consulting firm will be limited to interaction with the Consensus Builder tool. Five types of users are identified and described below. Administering Consultant—This is the principal consultant responsible for managing a Application implementation. Though s/he may, on a large-scale implementation, designate certain consulting team members as responsible for managing different portions of the implementation and different subordinate use cases for the software, the prototype system presumes that the Administering Consultant will provide all inputs to the system, conduct all manipulations of outputs and analysis, and build the presentation of results and recommendations without delegating specific software uses. Team members will simply be able to access the system from inside the consulting firm's firewall to observe implementation status and retrieve information. Consulting Team Members—Team Members are those consulting firm employees authorized by the Administering Consultant to log on to the system to observe implementation status, inputs and outputs. Prototype software is not required to make team access functional nor to meet the eventual access needs of authorized external contractors such as marketing research firms. Consultant Facilitators— These actors are members of the consulting team—and in some cases may be the same person as the Administering Consultant—who serve as facilitators of in-person Application work sessions with client company personnel. Facilitators will need to access the templates for the easel pad and whiteboard formatting required to capture specific client company inputs to the system during these work sessions. Recordists—In the finished Application application, keyboard recordists may need to access the Consultant Facilitator templates in Section 2's Use Case #3 via the Internet, to make a real-time digital record of the client company work sessions if the Facilitator chooses not to use physical easel pads or whiteboards in the session conference room. Recordist access is not required in the prototype software. Client Company Managers—Selected client company managers in geographies around the world may be asked to provide inputs to the system via the Consensus Builder tool. Until such time as this tool can be integrated into Application software, client company managers will be asked to enter inputs into an Excel version of Consensus Builder that will be distributed via e-mail as an Excel file attachment. More desirably, however, these actors could enter inputs by accessing Consensus Builder forms via the Internet—connecting to a password-protected Web page on the Application server. (The Consensus Builder tool is currently prototyped in Excel and has been field tested by Cristol & Associates with client company managers on four continents using Microsoft Outlook for distribution, but only some of the formulae for underlying mathematics have been programmed into Excel as of this writing. Other calculations have been performed manually.)

Section 2: Use Cases—This Section contains the ten basic use cases to be demonstrated via prototype software. Use cases reference certain accompanying drawings in which prescribed use of color is of material significance in communicating selected information, and such use of color is described in the text herein; the accompanying drawings are printed in black and white, but are available electronically in color. Ultimately, fully developed software will enable several variations and multiple subordinate use cases, depending on client company circumstances and project complexity. When implementing a Application project, the first nine of the following ten use cases will generally occur in the same sequence—except for Use Case #10, which may occur at any time (and therefore does not appear on the FIGS. 1A-B process flow, since Use Case #10 provides random access to a variety of tools that may be used at any point in the process flow rather than at a prescribed point or in a prescribed sequence.) Use cases are identified and described below:

Use Case #1—Input Brand Drivers Identification. Enter/change identification, description, and categorization of drivers of brand choice (or, alternatively, drivers of category adoption) In practice, except when the client company's product/service competes in a category that is mature, many customers' behavior may be driven by some combination of category adoption drivers and brand choice drivers rather than by brand drivers exclusively. For clarity and simplicity throughout this document, however, primary focus is on drivers of brand choice. Since drivers of either kind will be handled in nearly identical ways by the software, separate use cases are not presented here for category adoption drivers. Rather, where small differences may exist, these are covered in the "Alternative Paths" section of each relevant Section 2 use case. Use Case #2—Input Brand Drivers Prioritization. Enter/change data allowing system to establish the relative priority of each driver. Use Case #3—Prepare for Client Workshops. Access facilitator support tools, such as templates for easel pads/whiteboards to capture required assessment inputs, to assist Consultant Facilitator in preparing for client workshops. Use Case #4—Perform Current Product Portfolio Assessment. Access and populate template for Proof Points Inventory and generate current Competitive Situation Dashboard. Use Case #5—Perform Strategic Alignment Assessment. Assess each product development initiative's alignment with drivers of brand choice. Use Case #6—Perform Competitive Impact Assessment. Assess each product development initiative's likely competitive impact. Use Case #7—Perform Development Burden Assessment. Assess the relative burden of each product development initiative. Use Case #8—Integrate Individual Assessments. Merge the three prior assessments to generate blended view of overall strategic importance weighed against development burden. Use Case #9—Build Presentation. Input conclusions and recommendations based on all prior use cases, select outputs from prior use cases for inclusion in presentation to client company, and draft/complete the presentation. Use Case #10—Access Management Tools. Monitor project status and access ROI tool, Request For Proposal (RFP) tool, Consensus Builder tool, Reference Library (including best practices and Application tutorials), and archived projects. (Management Tools is a limited "placeholder" in prototype software.)

The principal actor for all basic uses cases is the Administering Consultant, except as noted in Use Case #3 situations when the Consultant Facilitator is not the same person as the Administering Consultant. Finally, note that while robust online help is envisioned for the finished application, it will only be a placeholder in the prototype software. However, the prototype user interface should indicate Online Help accessibility at all times in all uses cases, even though Help will not yet be functional.

Drivers of brand choice (or, alternatively, drivers of category adoption) provide the user with the fundamental building blocks for most of the subsequent Application use cases. These drivers are perceived brand attributes (see definition on page 14 under "Brand Choice Drivers Importance Index") that constitute the user's first and most critical set of inputs to the system after each new project is set up. These drivers will come from one of three sources outside the system: customer research studies, driver lists supplied by the client company or consulting firm, or directly from the Application Consensus Builder tool (as it currently exists in Excel, though this tool ultimately will be integrated into the software system as a Web-based set of data entry forms and analytics). Accordingly, for purposes of prototype software, these drivers will be manually entered into the system by the Administering Consultant regardless of which data source is used.

Use Case #1 Pre-Conditions—1. A valid user has logged on to the system. 2. User has been authenticated as Administering Consultant (authorized to enter data, make changes, perform analyses, etc.—vs. other users who are limited to "read-only" browsing access except as specifically indicated in selected use cases). 3. A consulting project has been previously set up and assigned a name and Project ID code. 4. Outside the system, the consulting firm and/or client company has identified, defined, and categorized relevant drivers of brand choice (or, alternatively, drivers of category adoption) to be used in this particular Application implementation. 5. If the client company has a Brand Strategy Architecture (see FIGS. 4, 5 and 6), it has been input to the system and is accessible to users in an appropriate graphics compression format.

Use Case #1 Flow of Events—1. User (Administering Consultant) enters Project ID code. Code is alphanumeric, eight characters, and formatted as XXX-1111—where the three letters are the client company's name abbreviation or stock symbol, the first two digits signify the year, and the last two digits signify project sequence (example: HPQ-0501, which signifies the first Application implementation conducted for Hewlett-Packard in 2005). 2. User navigates to project home page—the page from which all other basic use cases for this project are accessible via individual links. 3. From a list of use case events (regardless of whether designed as navigation bar, drop-down menu, etc.), user selects "Drivers of Brand Choice." 4. User must [mandatory] enter Driver Name for each driver. Maximum number of drivers allowable for one project is 40; each driver name is a maximum of 40 characters. Examples of drivers names are: "Interoperable," "Delivers on commitments," "Easily accessible service and support," "Demonstrable ROI," etc. 5. For each Driver Name entered, user may [optional] enter a Driver Description. The Driver Description elaborates on Driver Name, providing contextual meaning when the name alone is not confidently self-explanatory. Using an example from a client company in the enterprise software business, for the driver "Interoperable," Driver Description might be "Works with existing infrastructure and other vendors' applications." Though Driver Description will usually be just a phrase, occasionally a couple of sentences (maximum 400 characters, including spaces) may be required if driver dynamics are unusually complex. User should be able to hold the cursor over or, alternatively, click on "Driver Description" and see a help balloon or pop-up window that contains the text of the first three sentences in this paragraph (beginning with "For each Driver Name entered, . . . "). 6. For each Driver Name entered, user must enter [mandatory] the driver's Factor-Level Association. This refers to a higher-level theme that typically comes from a multivariate statistical technique known as "factor analysis" that is used in customer research studies—showing how a driver like "Interoperable" belongs to (i.e., has a strong relationship with) a higher-level concept like "Simplicity." As in that example, each driver belongs to, or is a dimension of, some higher-level "factor." Typically, a total of 20-35 drivers of brand choice will sort into four to eight factors. So, in this example, the user, after entering "Interoperable" as Driver Name and entering the Driver Description, would categorize the driver by assigning it to a factor (in this instance, "Simplicity") in the Factor-Level Association field. Factor-Level Association will usually be only one word (e.g., "Reliability," "Performance," "Simplicity," "Value," etc.), though may occasionally require up to 30 characters. In selecting the appropriate Factor-Level Association for each driver, it would be helpful to users if the four to eight factors were readily available in a drop-down menu, which would necessitate giving users the opportunity to manually enter the factors earlier in this use case. 7. After data entry is complete for all drivers, user may need to sort drivers in three possible ways: (1) in the original order as entered into the system, (2) alphabetically by driver name, or (3) grouped by Factor-Level Association. The second sort simply displays the drivers alphabetically by Driver Name as entered; the third sort displays, for example, all drivers associated with the "Simplicity" factor, followed by all drivers associated with each of the other factors. For the consultant's shorthand identification of drivers when communicating with the client company, it is helpful if each driver has a letter ID that stays with that driver regardless of how the list is sorted. Accordingly, as drivers are entered into the system, the software should sequentially assign a lower-case Driver ID that displays preceding the first character of the Driver Name (whether or not it appears as a separate column or field). For example, if "Interoperable" was the first driver entered into the system and "Easy to use" was second, they would always appear in any sort as "a. Interoperable" and "b. Easy to use" unless the user requests "Switch off driver ID's." (Letters must be used for ID's since numbering them would imply relative importance—and relative importance will be described numerically in Use Case #2, separate and distinct from driver identification. If there are more than 26 drivers, exhausting the alphabet, Driver ID can go to double letters (aa., bb., etc.) So the user does need to be able to switch ID's on and off for different purposes, but not for selected individual drivers; rather, all ID's are either turned on or all are turned off. 8. User will need ability to easily print a 3-column hard copy that fits to one page showing all input entered (or a selected subset)—displaying for all drivers the Driver ID, Driver Name, Driver Description (where applicable), and Factor-Level Association. (This could be four columns depending on whether Driver ID for each driver displays as a separate column or is integrated into the Driver Name field as in the example shown below.) FIG. 7 illustrates how an "as entered" sort currently appears in Excel. 9. User may need to add, change, or delete drivers, descriptions, or factor associations at any time after initial completion of Use Case #1 data entry. User may need to save different iterations or sorts. And, finally, user may need to consolidate driver list by combining certain drivers—sometimes creating a new driver name and/or description in the process. 10. For return visits to this page, user may now choose a default display from the three types of sorts (Driver ID, Driver Name, Factor Association). If the next visit, if the user has skipped this step, data will display in the same sort last used.

Alternative Paths: After Step 2, user may wish to click on "Brand Strategy Architecture" to view the architecture if there is one (see #5 in Pre-Conditions above, and sample architecture in FIGS. 5 and 6). If so, the architecture displays as in the FIG. 5 example. Also after Step 2, user may wish to enter, edit, or view market segment profiles. If user chooses to enter, system presents three fields for each segment (maximum eight segments): a "Segment Name" field (maximum 25 characters), a "Segment Profile" field (maximum 400 characters), and a "Source Research" field, in which the user enters the name of the source segmentation study (maximum 100 characters) where more information can be found. System should also allow user to enter a link to the segmentation study, which may be external to the system or, in the finished software application, may be stored within it. (Research storage not required in prototype software.)

At Step 3, user selects "Drivers of Category Adoption" in lieu of "Drivers of Brand Choice." All subsequent data entry is the same from a software standpoint. Only the display heading changes ("Drivers of Brand Choice" becomes "Drivers of Category Adoption"). The finished application will allow the user to enter both sets of drivers separately and then combine them in different ways (as discussed in Footnote 6, page 24), but this is not required in prototype software.

At Step 5, if user chooses not to enter Driver Descriptions (or if they are entered but later deemed inconsequential for certain purposes), user will want the flexibility to hide the Driver Description column when displaying and/or printing the data.

After Step 6, user may wish to use the Brand Strategy Architecture interactively—to the extent that the user could click on any of the factor-level drivers of brand choice that appear in the architecture's center box ("Promise Components") and see a balloon or pop-up that lists the dimensions of that driver. For example, a user could click on (or hold the cursor over) "Performance" in the example in FIG. 5 and see that "Performance" consists of several specific driver dimensions (FIG. 6) such as speed, memory, and smooth running of software applications. When relevant, the system will already have this factor association data stored after Step 6 is completed, since Factor-Level Associations will have been entered then (e.g., in Step 6 Performance would have been entered by the user in the Factor-Level Association field for each driver).

Use Case #1 Post-Conditions—All use case data entry is saved in the system, available for Administering Consultant to access, add to, modify, sort, or delete, and is accessible to other valid users on a read-only basis. When this use case ends, user may either log off or proceed to other use cases.

eCase#2—Input Brand Drivers Prioritization—With brand drivers now in the system—coded, named, described (where applicable), and linked to factors, they now must be prioritized in terms of strategic importance to the client company's brand. Use Case #2 enters inputs from sources external to the system and then calculates the Brand Choice Drivers Importance Index (as defined in "Terms and Definitions"). Ultimately, Application software will be able to import the correlation coefficients described below directly from Excel (see FIG. 9) or other data file formats commonly used by marketing research firms in generating these coefficients, but for prototype software all data in Use Case #2 will be manually entered.

Use Case #2 Pre-Conditions—The first three pre-conditions of Use Case #1 are also applicable here. Alternatively, the Administering Consultant user may be coming to Use Case #2 directly from other use cases (especially Use Case #1) without logging off and back on. Additional pre-conditions: 1. All relevant data from Use Case #1 have been previously entered and stored in the system. 2. Outside the system, the consulting firm and/or client company has prioritized the brand choice drivers (or, alternatively, drivers of category adoption) either by: (1) calculating brand choice correlation coefficients for each driver in a brand choice modeling research study, or (2) driving consensus internally among client company managers, with proxy correlation coefficients derived from use of the Application Consensus Builder tool. Specifications for Consensus Builder are not included in this document; prototype Strategic Harmony™ software may initially only show a non-functional Consensus Builder as a placeholder in navigation, and as a fixed sample template for display purposes as described in this use case. Future versions of the Master Use Case will provide feature specifications for all uses of the Consensus Builder tool, with appropriate subordinate use cases. Consensus Builder is currently prototyped in Excel as shown in FIGS. 8, 10, and 11. Either in lieu of, or in addition to, coefficients, the consulting firm or client company may also have assigned each driver a simple importance ranking and/or an "importance tier"—e.g., sorting the drivers into four quartiles that are simply called "Tier I," "Tier II," etc.

Use Case #2 Flow of Events—1. User (Administering Consultant) enters Project ID code. 2. User navigates to project home page and selects "Drivers of Brand Choice." The data entered in Use Case #1 displays. 3. User is presented with option to either "Configure relative importance of drivers" or "Skip relative importance." Upon selecting option to configure, user is presented with three choices: (1) "Enter correlation coefficients," (2) "Enter proxy correlation coefficients from Consensus Builder," or (3) "Skip coefficients to enter importance rankings or assign importance tiers." 4. If user selects either "Enter correlation coefficients" or "Enter proxy correlation coefficients," s/he will enter for each driver a numeric value greater than zero and less than 1, to two decimal places—i.e., between 0.01 and 0.99. (Ultimately, the software will automatically import proxy coefficients from the Consensus Builder tool when proxy coefficients are selected, but this not a requirement for prototype software.) Alternatively, if user elects to skip coefficients altogether, s/he will proceed directly to the next event. 5. User will now elect to enter, for each driver, either an "Importance Ranking" or an "Importance Tier," or both. An importance ranking will simply be an integer greater than or equal to 1 and less than 100. Importance tiers will be expressed in Roman numerals, from "Tier I" through "Tier IV." (User should be able to specify using fewer than four tiers when the list of drivers is relatively short, but four tiers will be the maximum.) When the user enters rankings and also requests the option to enter tiers, the software should automatically assign the appropriate tier to each driver by dividing the total number of rankings by four. For example, if there are 32 drivers in total, ranked 1 through 32 in importance, the software should automatically assign drivers ranked 1-8 to Tier I, drivers ranked 9-16 to Tier II, etc. However, user should be able to override automated tier assignments after they occur, as occasionally circumstances will suggest that tiers should not be evenly divided—requiring a manual adjustment. 6. User will need ability to easily print a 4-column hard copy that fits to one page showing Driver Name in Column A. Although MS Excel column headers do not literally appear in any of the screen shots in this document, occasionally the use case text may use the Excel convention of lettered columns (e.g., "Column A"=the first column, B=the second, etc.) to identify specific columns in the graphics display being described. Correlation Coefficient (or proxy coefficient) in Column B, Importance Ranking in Column C, and Importance Tier in Column D. User should have the flexibility to hide columns B, C, or D. 7. Ideally, user can now append Columns B, C, and/or D to the three columns in Use Case #1, producing a matrix of up to six columns in which any column other than Driver Name can be hidden or dragged and dropped to change the order of column display. Default display at this point in this use case should hide Driver Description (from Use Case #1) and display the remaining five columns in the following sequence, left to right: Driver Name>>Importance Ranking (displays ranking integer) >>Correlation Coefficient (displays coefficient or proxy coefficient)>>Importance Tier>>Factor-Level Association. (This assumes that Driver ID displays in the same column with Driver Name as discussed in Use Case #1 but, if ID is better handled by the software in a separate column, that solution should be carried through in this and subsequent use cases as well.) 8. If correlation coefficients or proxy coefficients were entered into the system in Step 4, user will now want the software to translate coefficients into a Brand Driver Importance Index for each driver—with the highest coefficient translating to an index of 100 and all other drivers' coefficients indexed against that. If no coefficients were entered, this Step 8 is skipped. 9. To see a high-level recap of results of this use case, user may select "Display Brand Driver Importance Indices." System then displays all Driver Names and the corresponding Brand Driver Importance Index, sorted by the index in descending order, and with the option to display Factor-Level Association as a third column if user desires.

Alternative Paths: At Step 2, user navigates to "Drivers of Category Adoption" in lieu of "Drivers of Brand Choice." All subsequent data entry is the same from a software standpoint. Only the display headings change ("Drivers of Brand Choice" becomes "Drivers of Category Adoption") in subsequent steps, and "Brand Driver Importance Index" in Step 9 becomes "Category Driver Importance Index.") Finished software will allow the user to enter both sets of drivers separately and then combine them in different ways, but this is not required in prototype software. At Step 3, user selects "Skip relative importance" and this use case ends. (If user does not select "Configure . . . ," it is mandatory that user goes through the step of electing to skip before proceeding to Use Case #3.) At Step 5, user shouldn't have to enter importance rankings if correlation coefficients were already entered in Step 4—since correlation coefficients provide the best basis for rankings, the software should be able to automate Step 5 by supplying rankings based on the coefficients. The higher the coefficient value, the higher the ranking. (In case of a tie between two or more coefficients, their corresponding Driver Names should show the same ranking integer; for example, if the top five coefficients are 0.82, 0.75, 0.75, 0.66, and 0.58, the rankings for corresponding Driver Names should appear, respectively, as 1, 2, 2, 4, 5.) With automation of rankings, user should be able to simply request that the system populate the Importance Ranking fields based on the coefficients.

Use Case #2 Post-Conditions All use case data entry is saved in the system, available for Administering Consultant to access, add to, modify, sort, or delete, and is accessible to other valid users on a read-only basis. When this use case ends, user may either log off or proceed to other use cases.

2.3 Use Case #3—Prepare for Client Workshops—Each Application implementation requires a skilled facilitator (the "Consultant Facilitator" actor described on page 22, abbreviated as "Facilitator" in this Use Case #3) to work face to face with the client company team in a workshop setting. In some instances, the Facilitator will be the same person as the Administering Consultant; in others, s/he will be a different employee of the consulting firm. In this Use Case #3, the Facilitator will access various support tools in the software's "Facilitator Support Center" to prepare for and develop materials to use in these client company workshops. The Facilitator will typically conduct two workshops (the number depends on client company circumstances) to capture inputs that must be entered into the system prior to Uses Cases #4—#7, in which the core Application assessments will be generated. The first workshop is referred to by the consulting team as the "Proof Points Session," and the second as the "Portfolio Session" (shorthand for "Development Portfolio Assessment Session"). This Use Case #3 describes the flow of events required when the Facilitator accesses the system to prepare workshop agendas, work out precise timing and pacing targets (for what is typically a very time-constrained session in which a lot of material is covered), and prepare the easel pads and/or whiteboards that will be used in the workshop conference room. In preparing layouts/content for the easel pads and whiteboards, the Facilitator accesses pre-formatted templates as well as content already entered into the system in Use Cases #1 and #2. In prototype software, the Facilitator will only access sample materials and the templates for the easel pads/whiteboards, along with instructions for their use. Ultimately, finished software will largely automate the process of populating those templates with selected content from the first two use cases (and, alternatively, will offer the option of manual entry), and will perform timing and pacing calculations based on the workshop agenda and on the number of brand drivers and product development initiatives to be assessed. But these functions are not required in the prototype software.

Use Case #3 Pre-Conditions—The first three pre-conditions of Use Case #1 are also applicable here; however, Facilitator may have been authenticated as either: (1) Administering Consultant, if the same person, or (2) "Facilitator," in which case s/he has read-only access to all other use cases but has full access to this Use Case #3. In either instance, the Facilitator may be coming to Use Case #3 directly from other use cases (especially #1 or #2) without logging off and back on. But the flow of events below presumes that the Facilitator is logging on to engage directly in Use Case #3, which is more likely. Additional pre-conditions: 1. All relevant data from Use Cases #1 and 2 have been entered and stored in the system. 2. As specified in Steps 4, 5, 7 and 8 below, sample workshop agendas, timing guidelines and worksheet, sample briefing presentation, and easel pad/whiteboard templates have been entered in the system during software development. (Ultimately, templates will be augmented with online help and a Reference Library tutorial to insure successful use in actual workshop environments, but this will not be required in prototype software.)

Use Case #3 Flow of Events—1. User enters Project ID code; 2. User navigates to project home page and selects "Facilitator Support Center"—where sample workshop agendas, guidelines for timing and pacing, workshop team briefing presentations, and templates for workshop easel pads/whiteboards all reside. From here, user may also link to Facilitator Tutorials in the Reference Library (see "Alternative Paths" below). 3. User is presented with a facilitator support menu that offers four options: (1) Access workshop agenda builder (2) Access timing guidelines and pacing calculator (3) Access workshop briefing presentation builder. Workshop briefing presentations are not to be confused with the Strategic Harmony™ final presentation of results and recommendations, which is the focus of Use Case #9. Workshop briefing presentations, which are typically less elaborate, are used by the Consultant Facilitator in the workshop setting to orient the client company team for their effective participation in the workshop's activities. (4) Access easel pad/whiteboard templates. The remainder of Use Case #3 presumes that the user accesses each of the four options in numbered sequence, though in practice the user may access any of the four in any sequence. 4. User selects "Workshop Agenda Builder." System presents three options: (1) Half- Day Proof Points Session Agenda, (2) Half-Day Portfolio Session Agenda, (3) Full-Day Combined Session Agenda. When user selects any option, system presents a sample agenda (which currently exists as a one-page Microsoft Word document). User must be able to edit each agenda, save edits to the system, e-mail agenda to client company for approval (though actual e-mail functionality is not required in prototype software), and print hard copies for distribution in the actual workshop. For each agenda type, user should also be able to access an "Agenda-Building Tutorial"—which will not be live in the prototype but will signify the eventual online accessibility of helpful text, including considerations in building an effective agenda for each session and tips on contingency planning. 5. User returns to facilitator support menu and selects "Timing Guidelines and Pacing Calculator." System presents three options: (1) Half-Day Proof Points Session, (2) Half-Day Portfolio Session, (3) Full-Day Combined Session. When user selects any option, system asks user if s/he has already stored a client-approved agenda for this workshop. If "No," system retrieves the default sample agenda (as in Step 4) of the type selected; if "Yes," system retrieves the most recently saved agenda for this Project ID. Along with the agenda presented, system also presents Session Timing Guidelines text for that session and a link/button for "Pacing Calculator"—a tool to calculate pacing targets (i.e., how many minutes should be allotted in the workshop for each brand driver and for each product development initiative to be covered), which are critical to keep the facilitator on track in an actual workshop. 6. After reading Session Timing Guidelines, which also instruct the user on what inputs s/he will need in using the Pacing Calculator to create "Pacing Guides," user clicks on Pacing Calculator button/link. Calculator tool asks for two inputs [mandatory] to create a Pacing Guide for each type of session: the Proof Points Session Pacing Guide requires entry of (1) Number of Drivers (numeric field, maximum two digits) and (2) Driver Name for each driver (maximum 40 characters) System should be able to supply Driver Names automatically from Driver Names entered in Use Case #1, Step 4, and drivers should display here in order of Importance Rankings (i.e., driver ranked #1 in importance displays first) entered in Use Case #2, Step 5; the Portfolio Session Pacing Guide requires (3) Number of Development Initiatives (numeric field, maximum two digits) and Initiative Name (maximum 40 characters) for each initiative. Since the optimum total number of "cells" in a single Application implementation is about 60 to 70 (e.g., 10 Drivers×7 Initiatives), system should ask user "Are you sure?" if the product of multiplying Number of Drivers times Number of Development Initiatives entered by user is greater than 72. User will either respond "No" and re-enter one or both inputs, or will respond "Yes." User will then have the option to select "Generate Pacing Guide" for any of the three types of workshop sessions, as shown in the examples below. (Pacing calculations will be made based on total agenda time allotted for drivers and initiatives, divided by the number of drivers and number of initiatives that were entered by user, but prototype software need not perform these calculations and can instead simply display a sample Pacing Guide for each type of session like the samples shown below.) User can select "Proof Points Pacing Guide only," "Portfolio Pacing Guide only," or "Pacing Guide for both sessions." Depending on which session is selected, each of the half-day session guides below will display separately, or will display together if user selected "Pacing Guide for both sessions." An example of the Proof Points Pacing Guide is shown in FIG. 12; an example of a Portfolio Pacing Guide is shown in FIG. 13. (In FIG. 13, note that Development Initiative names must each display with a letter ID, sequentially—i.e., A, B, C, etc.). User must be able to edit pacing guides and save edits, since client company circumstances sometimes dictate spending a little more or a little less time on certain drivers and initiatives rather than spending equal time on each one (equal time being the default that the Pacing Calculator would automatically prescribe, since it divides a fixed amount of time by a fixed number of drivers/initiatives). 7. User returns to facilitator support menu and selects "Workshop Briefing Presentation Builder." Sample briefing presentation (referenced in Pre-Condition #2, which currently exists in MS PowerPoint) displays. Ultimately, user will be able to edit and save, but prototype software can just display presentation as read-only and indicate "Edit" and "Save changes" functionality without actually providing it. 8. User returns to facilitation support menu and selects "Easel Pad/Whiteboard Templates." System then presents three choices: (1) "Proof Points Session Templates only" (2) "Portfolio Session Templates only" (3) "Display all templates" If user selects option #3, "Display all templates," all facilitation templates as shown in FIGS. 14, 15 and 16 should graphically appear as described below (template ID #'s, like "Pad 1-A," correspond to the exhibits as labeled in FIGS. 14, 15 and 16):

Proof Points Session Easel Pads/Whiteboards—Capturing Proof Points and Current Competitive Assessment Inputs Pad 1-A and Pad 1-B display side by side (as that is how they are always used, in conjunction with each other) Whiteboard 1-C displays below the pad templates. Portfolio Session Easel Pads/Whiteboards—Capturing Product Development Portfolio Assessment Inputs Pads 2-A, 2-B, and 2-C display side by side (always used in conjunction with each other) Whiteboard 2-D displays below the pad templates. Templates may initially display as thumbnails if space constraints dictate. For each template, user may also wish to view detailed instructions for actual use of the completed template in a workshop situation (e.g., via a link to "Instructions for using this template in a workshop"). If the user selected an option other than #3 ("Display all templates") above, only the selected templates will display. Upon clicking on the Pad 1 set (A and B always together), Pad 2 set (A, B and C always together), Whiteboard 1, or Whiteboard 2, user is presented with two choices for that particular template: (1) use Facilitation Template Wizard to prepare template for workshop, or (2) prepare the templates manually, in which case the user should have the option to view the instructions for manual preparation (these instructions for preparing templates are separate and distinct from the instructions for actually using them in a workshop). Prototype software does not require a fully functional wizard, manual preparation instructions, or data entry for manual preparation by the user, but it should indicate the presence of all three. (Ultimately, finished software will ask the user a series of questions if wizard has been selected and will produce completed templates—by importing data stored from other use cases—that can be printed to hard copy for offline use by a graphics person who will then reproduce/recreate them on the actual easel pads and whiteboards prior to the workshops. Also, finished software will provide required data entry fields to users selecting manual preparation but, again, this is not required in prototype software.)

Alternative Paths: At Step 2, user may access a link to Facilitator tutorials in the Reference Library, which then presents a menu of four tutorials that correspond to the four subject areas in the Step 3 menu above: (1) Developing Workshop Agendas, (2) Timing and Pacing, (3) Workshop Briefing Presentations, and (4) Using Easel pad/whiteboard templates. These are placeholders only in prototype software; finished software includes the tutorials content. At Step 6, if user doesn't yet know the number of development initiatives, s/he may still need a pacing guide for the Proof Points Session. In this instance, after user clicks on "Pacing Calculator," Number of Drivers will be the only mandatory input (unless the Number of Initiatives field offers a "Don't know" option). Then user can proceed directly to "Generate Pacing Guide" to get a guide for the Proof Points Session only.

Use Case #3 Post-Conditions All use case data entry is saved in the system, available for Consultant Facilitator or Administering Consultant to access, modify, or delete, and is accessible to other valid users on a read-only basis. When this use case ends, user may either log off or proceed to other use cases.

2.4 Use Case #4—Perform Current Product Portfolio Assessment—Once the first Application workshop—the Proof Points Session—has been completed, the consulting firm has the necessary inputs for performing an assessment of the client company's current product portfolio. In Use Case #4, those inputs are entered into the system and the Administering Consultant uses the system to prepare a Proof Points Inventory, perform the current portfolio assessment, and generate outputs to be used later in building a presentation of findings and recommendations. Entering inputs for this assessment (through Step 7 below) may be performed by either the Facilitator or the Administering Consultant, but only the Administering Consultant is authorized to actually perform the assessment (Step 8).

Use Case #4 Pre-Conditions—The first three pre-conditions of Use Case #1 are also applicable here. Alternatively, the Administering Consultant may be coming to this Use Case #4 directly from other use cases without logging off and back on. Additional pre-conditions: 1. All relevant data from Use Cases #1 and #2 have been previously entered and stored in the system. 2. Outside the system, the consulting firm has completed the Proof Points Session with the client company. The user in this use case now has in his/her possession the completed physical Easel Pads 1-A and 1-B from the workshop, as well as a hard copy of Whiteboard 1-C.

Use Case #4 Flow of Events—1. User enters Project ID code. 2. User navigates to project home page and selects "Current Product Portfolio Assessment." 3. User is presented with four options: (1) Enter/modify assessment inputs (2) Perform/update assessment (3) View assessment (4) Print assessment In the user's initial visit to this module for this Project ID, or unless this assessment has already been performed in a previous visit, user must select option #1. Once those inputs have been entered and stored in the system, user may alternatively select any of the other options. (In subsequent user visits to this assessment module, if user selects option #3 or 4 without yet having performed the assessment in option #2, user can still view or print just the inputs without a performed assessment. If the assessment has been performed in a previous visit in Step 8 below, here the user may select any of the four options above in any sequence—option #1 to make changes in the inputs, option #2 to update the assessment based on those changes, or options #3 or 4 may be selected first to view or print the last assessment stored in a previous visit. Users other than Administering Consultant are only allowed to access options #3 and 4; if they attempt to access either of these options before assessment inputs have been entered by the Administering Consultant, the system should inform them that viewing/printing is unavailable because assessment inputs are not yet entered. If inputs have been entered but the assessment (Step 8) not yet performed, users may view or print inputs but the system should inform them that the completed assessment is not yet available.) 4. User has selected option #1, "Enter/modify assessment inputs," and is now prepared to enter the required inputs to build the Proof Points Inventory. An example Proof Points Inventory format and content is shown in FIGS. 19A-B as prototyped in Excel. (FIG. 17 shows the basic template structure before populating with content and design features.) The system will present a sequence of matrices as described below for the user to fill in, field by field. (Notice in FIGS. 19A-B how each high-level driver of brand choice—i.e., each "factor," such as "Control," "Simplicity," "Trust," etc.—has its own inventory matrix, formatted as a separate page for each factor in the Excel workbook example shown). However, for the system to know which matrix to present, it must first present to the user a menu that includes all "factors" (stored during Use Case #1, Step 6, as "Factor-Level Associations" assigned by the user); typically, four to seven factors will already be stored in the system. User may now select any of the factor matrices on the menu in any sequence.

5. For each factor matrix selected, user must [mandatory] enter the number of "driver dimensions" s/he wishes to display in Column A of the matrix. Entry will be a number from 1 to 10, or user can select "All." Then, the following occurs for each matrix. First, the template shown in FIG. 17 appears for the factor selected by the user, with the selected factor name automatically displaying in the template's various headings (see the four places circled in FIG. 18 where the example factor name is "Control"). All column headings of FIG. 17, and all Column A row headings, also display; however, in the Column A fields that say "CONTROL DIMENSION 1," "CONTROL DIMENSION 2," etc., the system automatically substitutes the actual names (and descriptions, when available) of the drivers of brand choice entered in Use Case #1 (Driver Name field from Use Case #1, Step 4, and Driver Description field from Use Case #1, Step 5) that are dimensions of "Control" (i.e., dimensions are the drivers that were assigned to "Control" in the "factor-level association" field in Use Case #1, Step 6). In each matrix template, these drivers should display in descending order of their Brand Driver Importance Index (if indices were calculated in Use Case #2; if not, use importance ranking). Importance ranking and tier assignments (e.g., Tier I, Tier II, etc.) from Use Case #2 should display as well. So, for example, if "Customizable" was the highest ranking driver assigned to the "Control" factor as entered in Use Case #1, it would display here in the first cell of Column A on the Control matrix as follows (in place of "CONTROL DIMENSION 1"): CUSTOMIZABLE [94/2/Tier I] This indicates that "Customizable" has a Brand Driver Importance Index of 94 as calculated in Use Case #1 Step 8, has an Importance Ranking of 2 out of all the drivers ranked in Use Case #1 Step 5, and was also assigned to Tier I in that step. If any of these three measures are unavailable in the system, its field within the brackets shown above should display "—" or "N/A." 6. In Column A (see FIG. 17 where, under each driver, the template says "Brand to beat" and "Why?"), user enters name of brand(s) to beat and, under that in a separate field, enters reason(s) why. User repeats these two actions for each factor matrix. "Brand to beat" field should accommodate up to four brand names, each up to 20 characters, since sometimes multiple brands are at parity with each other as best in class on a particular driver. ("Unknown" should also be offered as an option in the "Brand to beat" field, for situations when competitive intelligence is too weak to determine a leader.) The "Why?" field should accommodate text up to approximately 100 characters, though most entries will be much shorter. Entering "brand to beat" is mandatory; "Why?" is optional, but failure to enter a reason why should prompt a reminder (e.g., "Are you sure you want to skip 'Why?'") if user tries to proceed to another driver or activity directly from entering "Brand to beat."

7. User enters proof points text in matrix Columns B, C and D. Each cell needs flexible capacity, as some cells will be left empty (so all cells must be optional) and others may contain as many as 10 bullet points (though 2 to 5 is most common). User repeats this step for each factor matrix. Typical user motion will be to complete Columns B, C, and D cells moving across for each driver rather than doing all Column B cells first, but user should have flexibility to do cells in any sequence. If no proof points are entered anywhere on the currently displayed factor matrix, user should be prompted to enter proof points [optional] before skipping to a different factor matrix. When Proof Points Inventory is complete (FIG. 19 example), user must be able to create a PDF version to print or e-mail to client company. 8. The Administering Consultant user returns to the menu from Step 3 and chooses "Perform/update assessment." User is prompted to "Create Competitive Situation Dashboard" (FIG. 20) and chooses to proceed. (User should have the option to skip but, if skipping, should be prompted "Are you sure?" since this step will eventually have to be completed before the full assessment can be finished.) The system derives the Dashboard content from a combination of data already used in Step 5 above plus data entered by the user in Step 6, and should automatically populate the Dashboard template. Specifically, note in FIG. 20 that the Dashboard consists of three content elements: (1) a list of brand drivers on the left; (2) a color-coded bar labeled "Superior," "Parity," or "Inferior" on the right, where green color bars are used for "Superior," amber color bars for "Parity," and red color bars for "Inferior;" (3) the factor-level association for each group of drivers (just to the left of the driver list). The driver names already reside in Column A of each factor matrix in the Proof Points Inventory in Step 5 above (originating from the Driver Name field in Use Case #1). The factor names also already reside in the heading of each factor matrix in Step 5. And the data required to determine "Superior"/"Parity"/"Inferior" reside in the "Brand to beat" field from Step 6. For any particular driver, if user entered only the client company's brand in the "Brand to beat" field in Step 6, that translates to "Superior" since the client's brand has been determined to be best in class on that driver. If user entered the client company's brand along with one or more competitor brands in the "Brand to beat" field for that driver, this translates to "Parity." Finally, if user did not enter the client company brand in the "Brand to beat" field, this translates to "Inferior"—unless "Unknown" was entered as brand to beat. In the case of "Unknown," the Dashboard should show a gray color-coded bar with the text "UNKNOWN" (in lieu of the green SUPERIOR/amber PARITY/red INFERIOR bars otherwise used).

Completed/updated Dashboard now displays as in FIG. 20. Any subsequent changes made to "Brand to beat" fields in future user visits should automatically update the Superior/Parity/Inferior/Unknown color-coded bars on the Dashboard.

9. User now returns to the Step 3 menu and chooses "View assessment," and is given the option to view Proof Points Inventory, Competitive Situation Dashboard, or both. User's choice triggers appropriate display. When the completed Proof Points Inventory displays, the system also provides an opportunity (e.g., a button) for users to "Collect proof points diagnostics." If user clicks on that button [optional], system counts and displays: (1) the total number of bullet-text proof points (again, see FIGS. 19A-B) in the "Features," "Service(s)," and "Other" columns combined. Note that the "Solutions/Products" column is omitted from the tally since its primary use is to identify which products the proof points in the next three columns belong to across all factors (i.e., all matrices, or "pages," in the compete inventory); (2) the total number of bullet-text proof points for each factor (each individual matrix, or "page"), listed in descending order; (3) the total number of bullet-text proof points for each driver, listed in descending order. So results in this example might appear as follows (content, not design): PROOF POINT TALLIES TOTAL INVENTORY 215 By Factor:—CONTROL 73-SIMPLICITY 62-TRUST 48-VALUE 32 By Driver:— Easy To Use 29-Strong Track Record 27-Interoperable 23-Demonstrable ROI 18—Integrated Solution 17 etc.

Results display includes a button to "Calculate pre-emptive language incidence." In the competitive context of the Proof Points Inventory, "pre-emptive language" refers to any of the following superlative words used in the entered text of the listed proof points (reasons for customers to believe that the client company excels on a particular brand driver): "best," "most," "first," "fastest," etc., plus other superlative words that the user may add to the list as described above. Consultants are trained to urge the client company to strive for pre-emptive words in proof points language whenever they can be legitimately claimed; this incidence of superlatives is another data point for how strong or weak the client company's current story is on any specific driver of brand choice as well as across all drivers. This function asks the system to search for specified superlative words in the text of the Proof Points Inventory User chooses to do so, and system presents a list of the following default superlatives—to which user may add custom words—that the system will search for in the bullet points text in the "Features," "Service(s)," and "Other" columns (see FIG. 9) within all drivers and across all factors: Best First Most Only Fastest Easiest Least #1 Other (please specify): _____ _____ _____ The system counts the incidence of these words and reports them only in the aggregate (the incidence of each individual word is irrelevant; it's the incidence of all superlatives, taken together, that matters), then calculates the percentage incidence by driver based on the totals reported in "Proof Point Tallies" above, and displays the results alongside the tallies as follows (content, not design): PROOF POINT TALLIES PRE-EMPTIVE LANGUAGE INCIDENCE Occurrences % of Proof Points TOTAL INVENTORY 215 84 39% By Factor:—CONTROL 73 34 47%—SIMPLICITY 62 21 34%

TRUST 48 25 52%

VALUE 32 4 13% By Driver:—Easy to use 29 9 31%—Strong track record 27 13 44%—Interoperable 23 7 30%—Demonstrable ROI 18 2 11%—Integrated solution 17 8 47%—etc. . . .

Finally, user may choose to audit these results by asking the system to "Show me superlatives found." Since words like "most" may occasionally occur in proof points in a context other than superlative (e.g., "most of the time," rather than "rated the most effective product by customers"), user should be able to locate right on the inventory each superlative that was found and be able to manually exclude it from the incidence totals. After this is done, system can re-calculate and re-display results.

10. User may now elect to print or create PDF of the Proof Points Inventory and/or Competitive Situation Dashboard. Alternatively, user may use the Step 3 menu's option #4 to do the same in future visits. (Finished software should provide ability to e-mail PDFs to client company or consulting colleagues, via Microsoft Outlook, without having to manually open Outlook and attach file, but this is not necessary in the prototype.)

Use Case #4 Post-Conditions All use case data entry is saved in the system, available for Administering Consultant to access, modify, or delete, and is accessible to other valid users on a read-only basis—with the exception that the Consultant Facilitator may also modify or delete data through Step 7 (the Proof Points Inventory, but not the Dashboard). When this use case ends, user may either log off or proceed to other use cases. In future visits, any user should be able to access any of the different factor matrices in the Proof Points Inventory in any sequence.

2.5 Use Case #5—Perform Strategic Alignment Assessment—Use Case #5 performs the first of three Application assessments of the client company's product development portfolio, in which each development initiative—products, features, and/or services—is evaluated in terms of how much or how little it will likely improve customer perceptions of the company's brand on the most important drivers of brand choice. Just as Use Case #4 brought into the system the output of the offline "Proof Points Session" workshop conducted by the Facilitator, Use Case #5 will bring in certain outputs of the "Portfolio Session" (Development Portfolio Assessment Session) workshop conducted by the Facilitator and described in Use Case #3. The Administering Consultant will perform this strategic alignment assessment, which produces an Alignment Matrix (FIGS. 21A-B) and, for each product development initiative, an Alignment Index as defined in "Terms and Definitions."

Use Case #5 Pre-Conditions—The first three pre-conditions of Use Case #1 are also applicable here. Alternatively, the Administering Consultant may be coming to this Use Case #5 directly from other use cases without logging off and back on. Additional pre-conditions: 1. All relevant data from Use Cases #1 and #2 have been previously entered and stored in the system. 2. Outside the system, the consulting firm has completed the Portfolio Session with the client company. The user in this use case now has in his/her possession the completed physical Easel Pads 2-A, 2-B and 2-C from the workshop, as well as a hard copy of Whiteboard 2-D.

Use Case #5 Flow of Events—1. User enters Project ID code. 2. User navigates to project home page and selects "Product Development Portfolio Assessment." 3. User is presented with three options: (1) Assessment 1: Strategic Alignment (2) Assessment 2: Competitive Impact (3) Assessment 3: Development Burden User selects option #1 and proceeds to Assessment 1. (As specified later in this document, options 2 and 3 would take user to Use Cases #6 and #7, respectively.) 4. User is presented with four options: (1) Enter/modify assessment inputs (2) Perform/update assessment (3) View assessment (4) Print assessment In the user's initial visit to this module for this Project ID, or unless this assessment has already been performed in a previous visit, user must select option #1. Only after option #1 inputs have been completed (Step 5 below) may the user alternatively select options #2, 3 or 4. (Any attempt to select the latter three options before Step 5 has been completed should elicit a message such as, "Assessment inputs not yet complete." In subsequent user visits to this assessment module, if user selects option #3 or 4 without yet having performed the assessment (option #2), user can still view or print just the inputs without a performed assessment. If the assessment has already been performed in a previous visit (completion through Step 8 below), the user may select any of the four options above in any sequence—option #1 to make changes in the inputs, option #2 to update the assessment based on those changes, or options #3 or 4 may be selected first (to view or print the last assessment stored in a previous visit). Users other than Administering Consultant are only allowed to access options #3 and 4; if they attempt to access either of these options before assessment inputs have been entered by the Administering Consultant, the system should inform them that viewing/printing is unavailable because assessment inputs are not yet complete. If inputs are complete but the assessment has not yet been completed, users may view or print inputs but the system should inform them that the completed assessment is not yet available.) 5. User has selected option #1, "Enter/modify assessment inputs," and is now prepared to enter the remaining inputs required to perform the assessment in Step 6 below. Using information stored from Use Case #3, Step 6, the system should now be able to display the product development Initiative Names and letter ID's as they appeared in the Portfolio Session Pacing Guide (FIG. 13). (If Use Case #3 was not completed, see "Alternative Paths" below.) When the list of initiatives displays, user must be prompted to enter: (1) Initiative Description [optional] and (2) Alignment Rating [mandatory], explained previously in "Terms and Definitions." Though Initiative Description is optional, it is strongly encouraged in training—so skipping it should elicit a prompt such as "Skip description of Initiative A?" The Initiative Description field should accommodate text entry up to 700 characters, to insure that the scope of the initiative is sufficiently communicated to all users who may need to reference portfolio content. User is then prompted to enter Alignment Rating for each initiative on each driver of brand choice included in the assessment (as entered and stored in Use Case #1, Step 4, and presented here in order of Importance Ranking as stored in Use Case #2, Step 5). For each initiative, user is presented with five possible ratings on each brand driver:—HIGH IMPACT—strong alignment; likely yielding high positive impact on how brand is perceived by customers on this driver—MODERATE IMPACT—moderate alignment; likely yielding significant positive impact on this driver, but not as much as those initiatives rated "High"—LOW IMPACT—low alignment, likely yielding minor impact on this driver—NO IMPACT—no, or negligible, impact on this driver—NEGATIVE IMPACT—inverse alignment; likely to hurt brand perceptions on this driver.

For the first initiative in the portfolio, the user cycles through entering these ratings for each driver and then moves to the next initiative and repeats until ratings have been entered for every initiative on every driver included in the assessment.

6. User is ready to build the matrix called "Development Portfolio Alignment with Drivers of Brand Choice" as shown in FIGS. 21A-B. From the menu at the beginning of Step 4 above, user selects "Perform/update assessment." Since FIGS. 21A-B is designed to display the drivers of brand choice grouped according to Factor-Level Association (as entered in to the system in Use Case #1, Step 6), the system must now present those Factor-Level Associations (e.g., Control, Simplicity, Trust, Value) and ask the user to choose the order in which s/he would like the drivers displayed. User stipulates the order, and system then presents the FIGS. 21A-B template—automatically providing the following: a. Column headings automatically populated with the Driver Names (from Use Case #1, Step 4), grouped by Factor-Level Association; factor names also automatically appear as column footers as shown in FIG. 21. Within each group of drivers belonging to the same factor (e.g., in FIGS. 21A-B, the drivers "Timeliness," "Effectively Prioritizes," and "Customizable" all belong to the "CONTROL" factor), drivers should display in adjacent columns in order (from left to right) of their Importance Ranking (from Use Case #2, Step 5)—so that each group of drivers is visually prioritized from left to right. System can abridge Driver Names in the column headings if necessary to have all drivers fit in uniform column widths on the matrix, but for each heading the column width should accommodate at least two lines of up to 14 characters each. b. Row headings automatically populated with the Initiative Names and their letter ID's, as retrieved from the system in Step 5 above, and a blank text box between each initiative that extends across all driver columns (as shown in FIGS. 21A-B after these text boxes have subsequently been selectively filled in with ratings rationales). c. For each initiative in the first column, looking across the row at the top of each blank text box in each Driver column, system automatically supplies the appropriate Alignment Rating color bar as shown in FIGS. 21A-B —using the Alignment Ratings that were just input by the user in Step 5 above. System will translate these ratings from Step 5 as follows: each "High Impact" rating becomes a green bar containing the word "HIGH"; a "Moderate Impact" rating becomes an amber bar containing the word "MODERATE"; a "Low Impact" rating becomes a white bar containing the word "LOW" in black text; a "No Impact" rating becomes a light gray bar with no text; a "Negative Impact" rating becomes a white bar containing the word "NEGATIVE" in red text. 7. When system displays the completed template as described above, user will likely study it and may need the option to manually override or edit Driver Name column headings and/or Initiative Name row headings. Whether user edits or not, user is then presented with three choices: (1) Enter ratings rationales (2) Skip ratings rationales (3) Print Strategic Alignment Matrix as is If user selects option #1, s/he is ready to use the blank text box below the color bar in each Initiative/Driver cell on the matrix to type in the rationale for the Alignment Rating. (These rationales were captured by the Facilitator on the easel pads in the Portfolio Session, and subsequently given to the Administering Consultant.) Each rationale field should accommodate up to 120 characters in the prototype software; finished software should ultimately allow each text box to produce a pop-up window in which a more detailed rationale can also be entered and later retrieved. Entering rating rationales is an optional step, but rationales for all High, Moderate, and Negative ratings are strongly encouraged in consultant training. If user selects option #2 or attempts to leave this use case before entering rationales, system should show user how many High, Moderate, and Negative rationale cells remain blank and ask if user is sure s/he wants to skip entering ratings rationales for these cells. 8. To complete this assessment, user now wishes to calculate an Alignment Index (alternatively known as a Brand Equity Impact Index) for each product development initiative as described in "Terms and Definitions". Whether user entered or skipped ratings rationale in Step 6, user is now presented with the opportunity to "Calculate Alignment Index for each initiative." (This step is optional now, but will be mandatory before Use Cases #8 or #9 can be completed.) User elects to do that now, and the system will use the following underlying mathematics to produce a separate Alignment Index for each Initiative Name—reflecting how strongly aligned the initiative is with each of the drivers of brand choice on which it was rated. a. System first assigns to each HIGH rating a quantitative value of 3 points, to each MODERATE rating a value of 2 points, to each LOW rating a value of 1 point, to each NO rating a value of zero points, and to each NEGATIVE rating a value of −1 point. (Finished software must allow user to manually override these value assignments to be able to change values by increments of +/−0.25 for those initiatives with alignment gauged in Portfolio Session as "in between" High and Moderate, for example, or in between any two ratings, or where negative impact may be sufficiently significant to justify a negative rating greater than −1 point. This manual override capability is not required in prototype software.) b. For each rating, system multiplies the rating's quantitative value by that particular driver's Brand Driver Importance Index (from Use Case #2, Step 8), thereby weighting each rating and producing "weighted alignment points" for each driver as it pertains to each initiative. (Example: Initiative A was rated HIGH on the driver "Scalable," which has a Brand Driver Importance Index of 80 and therefore assigns a total of 3×80, or 240 weighted alignment points, to Initiative A for "Scalable.") c. System produces an Alignment Index equal to 100 for the Initiative Name that has the highest number of total weighted alignment points. For each of the other Initiative Names, system calculates its Alignment Index based on that initiative's total weighted points as a percentage of the total weighted points for the initiative that was indexed at 100. All Alignment Indices are expressed as whole numbers.

Figure 22:
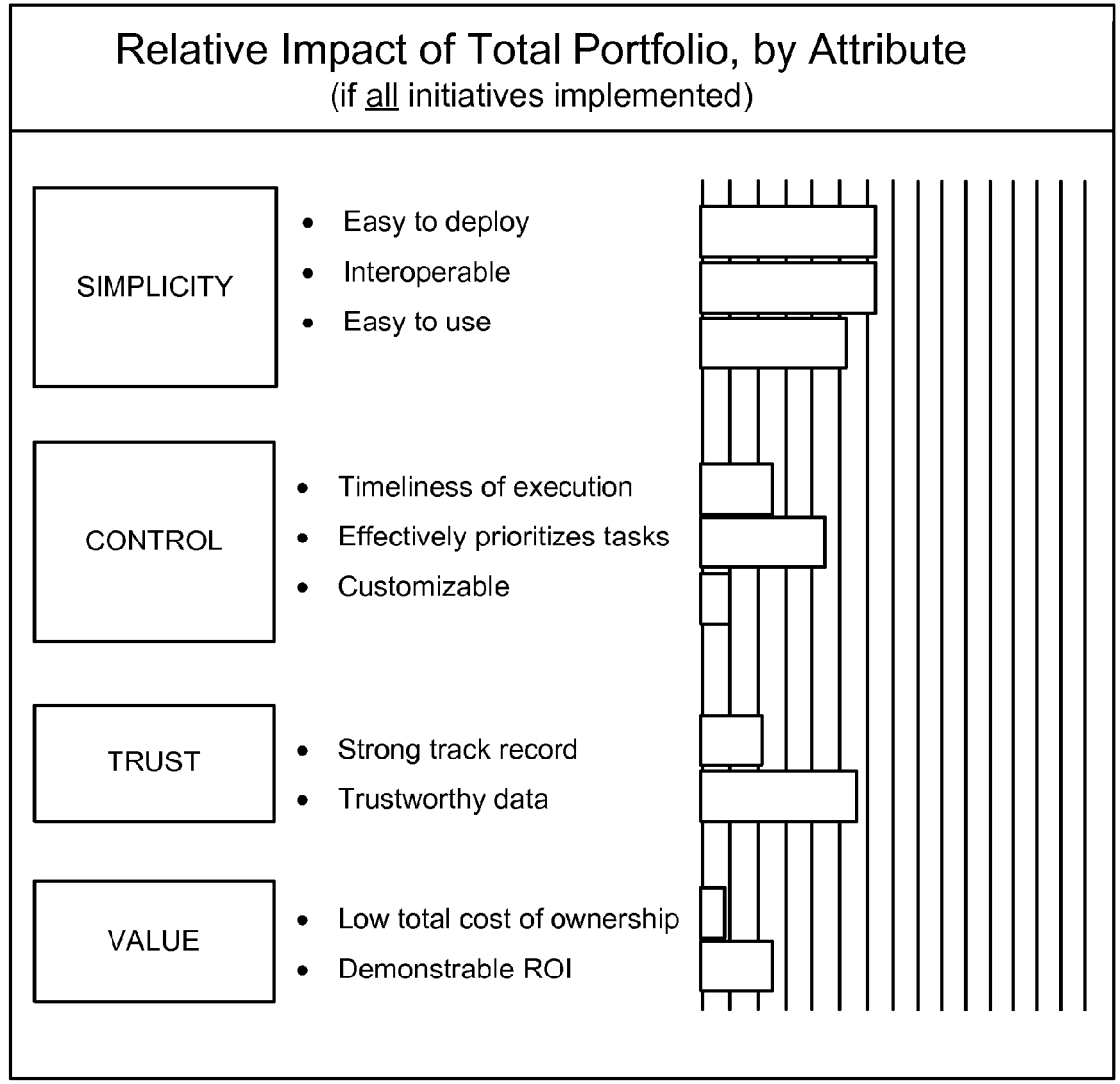
FIG. 22 is an example from the first embodiment of how results display from calculating the attribute-specific impact of the collective initiatives in a product development portfolio.

System now displays the results, showing a prioritized list displaying Initiative Name and ID, rank, and index. For example: RANK INITIATIVE ALIGNMENT INDEX 1. D. Full internationalization 100 2. B. Executive dashboard 94 3. F. Real-time access to BMG database 87 4. A. Auto-configuration 77 5. E. Live chat tech support 58 6. c. Integration with customer console 42 9. After examining results for individual initiatives, user may wish to examine collective results for the entire product development portfolio—that is, if all initiatives are brought to market, what is the likely relative degree of impact on each driver of brand choice. User is presented with option to "Create total portfolio impact summary by attribute." If option is selected, the system produces a bar-graph representation of the collective impact of all initiatives on each attribute that is a driver of brand choice, grouped by factor-level association as shown in FIG. 22.

10. Upon viewing results from Steps 8 and/or 9, user may now elect to print or create PDF of the Alignment Matrix and the display of index results (which can be combined in a single PDF), and/or the Total Portfolio Impact Summary By Attribute (FIG. 22). Alternatively, user may use the Step 4 menu's option #4 to do the same in future visits. (Finished software should provide ability to e-mail PDFs to client company or consulting colleagues, via Microsoft Outlook, without having to manually open Outlook and attach file, but this is not necessary in the prototype.)

Alternative Paths: In Step 5, if the development portfolio was not already entered in Use Case #3, it is not yet in the system. User is prompted to "Define development portfolio" before s/he can enter initiative descriptions. First, user must [mandatory] specify the number of initiatives in the portfolio; entry in this field will be an integer ≧3 and ≦12. Next, based on the number of initiatives, the system should provide an Initiative Name field for each—and each initiative should be coded with a letter of the alphabet to serve as an Initiative ID that follows that initiative through the remainder of the assessments. So, for example, if the user entered 6 as the number of initiatives, the system will automatically provide the IDs and display them along with blank name fields and description fields for data entry:

ID INITIATIVE NAME INITIATIVE DESCRIPTION A. B. C. D. E. F. User will now enter Initiative Names [mandatory] and Initiative Descriptions [optional, with prompt if skipped as described in Step 5 above]. (For example, for Initiative A above the user would type in "Auto-configuration" as the name and then enter the description, "Enabling Release 6.0 to configure itself through a simple auto-configuration wizard that requires the customer to answer only four questions." Then user would proceed to enter the Initiative B description, and so on.) User will then complete Step 5 above, starting at the point where user is prompted to enter Alignment Ratings, and continuing through to use case completion from there.

At Step 8b, user may elect to perform the assessment on an unweighted basis. If user does so, then for each initiative the system simply adds together the initiative's total unweighted rating points across all drivers and proceeds to Step 8c to produce the Alignment Index based on unweighted points. On this alternative path, the Alignment Index column displaying at Step 8c would display with the modified heading, "Alignment Index (Unweighted)."

Use Case #5 Post-Conditions—All use case data entry is saved in the system, available for Administering Consultant to access, modify, or delete, and is accessible to other valid users on a read-only basis—with the exception that the Consultant Facilitator may also add, modify or delete only the ratings rationales in the rationale text boxes in Step 7. (In some instances, Administering Consultant may ask the Facilitator to log on to the system and check/correct the rationale entries, or may have skipped entering the rationales and instead asked the Facilitator to make those entries.) When this use case ends, user may either log off or proceed to other use cases.

2.6 Use Case #6—Perform Competitive Impact Assessment—Use Case #6 performs the second of three Application assessments of the client company's product development portfolio, in which each development initiative—products, features, and/or services—is evaluated in terms of how much or how impact it will likely have on the client company's competitive situation (as expressed in the Competitive Situation Dashboard generated in Use Case #4, Step 8). Just as Use Case #5 brought into the system certain outputs of the "Portfolio Session" (Development Portfolio Assessment Session) workshop conducted offline by the Facilitator, Use Case #6 brings in and uses other outputs from that same session. The Administering Consultant will perform this competitive impact assessment, which produces a Competitive Impact Matrix (FIGS. 23A-B) and, for each product development initiative, a Competitive Impact Index as defined in "Terms and Definitions."

Use Case #6 Pre-Conditions—The first three pre-conditions of Use Case #1 are also applicable here. Alternatively, the Administering Consultant may be coming to this Use Case #6 directly from other use cases without logging off and back on. Additional pre-conditions: 1. Use Cases #1 through #6 have all been completed and their data stored in the system. 2. Outside the system, the consulting firm has completed both the Proof Points Session and the Portfolio Session with the client company.

Figure 24:
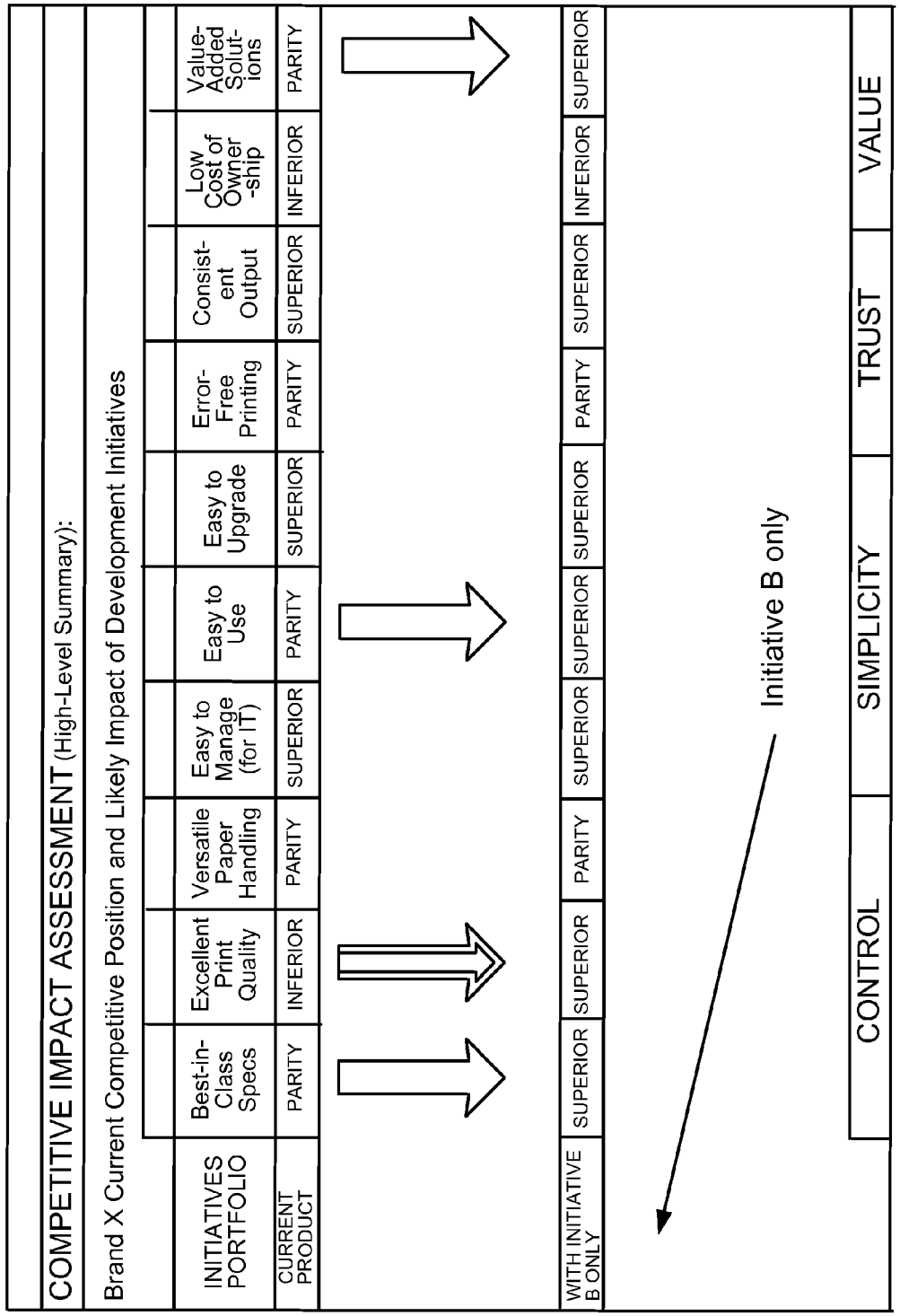
FIG. 24 is an example from the first embodiment of a single-initiative view of the Competitive Impact Assessment results that shows the competitive impact of one selected initiative from a product development portfolio.

Use Case #6 Flow of Events—1. User enters Project ID code. 2. User navigates to project home page and selects "Product Development Portfolio Assessment." 3. User is presented with three options: (1) Assessment 1: Strategic Alignment (2) Assessment 2: Competitive Impact (3) Assessment 3: Development Burden User selects option #2 and proceeds to Assessment 2. 4. User is presented with four options: (1) Enter/modify assessment inputs (2) Perform/update assessment (3) View assessment (4) Print assessment In the user's initial visit to this module for this Project ID, or unless this assessment has already been performed in a previous visit, user must select option #1. Only after option #1 inputs have been completed (Step 5 below) may the user alternatively select options #2, 3 or 4. (Any attempt to select the latter three options before Step 5 has been completed should elicit a message such as, "Assessment inputs not yet complete." In subsequent user visits to this assessment module, if user selects option #3 or 4 without yet having performed the assessment (option #2), user can still view or print just the inputs without a performed assessment. If the assessment has already been performed in a previous visit (completion through Step 7 below), the user may select any of the four options above in any sequence—option #1 to make changes in the inputs, option #2 to update the assessment based on those changes, or options #3 or 4 may be selected first (to view or print the last assessment stored in a previous visit). Users other than Administering Consultant are only allowed to access options #3 and 4; if they attempt to access either of these options before assessment inputs have been entered by the Administering Consultant, the system should inform them that viewing/printing is unavailable because assessment inputs are not yet complete. If inputs are complete but the assessment has not yet been completed, users may view or print inputs but the system should inform them that the completed assessment is not yet available.) 5. User has selected option #1, "Enter/modify assessment inputs," and is now prepared to enter the remaining inputs required to perform the competitive impact assessment in Step 6 below. Using information stored in the system in Use Cases #4 and 5, the system should now be able to display the product development Initiative Names and letter ID's in ID alphabetical order. Upon display, user selects each initiative in turn and, upon doing so, will enter three pieces of information for each driver of brand choice as it pertains to the initiative currently selected: (1) Type of impact [mandatory], (2) Competitive outcome [mandatory], and (3) Explanation [optional]. For the initiative selected, the system presents each Driver Name in the same sequence in which driver names appeared on the Proof Points Session Pacing Guide (FIG. 12). For the Driver Name presented (while the selected Initiative Name is still displayed), system prompts user to "Enter impact type" and presents a menu of eight types from which to select Leapfrogs competitors (moves from Inferior to Superior)—Moves from Parity to Superior—unconditional—Moves from Parity to Superior—conditional—Moves from Inferiority to Parity—Lengthens lead where impending threat—Strengthens parity (moves closer to superior)—Mitigates inferiority (but still not parity)—Lengthens lead where no impending threat Users should be able to access more complete definitions of each impact type (whether via pop-up window, cursor balloon, link, etc.) as a refresher to their training. (These definitions are: Leapfrogs competitors=The selected initiative, successfully executed, will likely move the client company's brand from being worst-in-class (or inferior to at least one brand) to best-in-class on this driver of brand choice. Moves from Parity to Superior—unconditional=The selected initiative, successfully executed, will likely move the client company's brand from parity with one or more competitors to category superiority on this driver. Moves from Parity to Superior—conditional=Like "unconditional" above, except that: (1) the initiative breaks parity with at least one competitor but not with all competitors, so client company brand still can't claim category superiority on this driver, and/or (2) the move to superiority will only be among some, but not all, key customer segments. Moves from Inferior to Parity=The selected initiative, successfully executed, will likely move the client company's brand from being inferior to at least one competitor to being at parity (i.e., no longer inferior to any competitor) on this driver. Lengthens lead where impending threat =The selected initiative, successfully executed, will likely increase the degree of superiority and/or protect the superiority already enjoyed by the client company's brand on a driver for which the brand's lead is judged to be in jeopardy. Strengthens parity (moves closer to superior)=The selected initiative, successfully executed, will move the brand closer to superior on this driver, but not far enough to claim superiority. Mitigates inferiority=The selected initiative, successfully executed, will help close the gap vs. competitors on this driver, but not enough to claim parity with "brand(s) to beat" (as occurred in "Inferior to Parity" above). Lengthens lead where no impending threat=The selected initiative, successfully executed, will likely increase the degree of superiority already enjoyed by the client company's brand on a driver for which the brand's lead is not judged to be in jeopardy, but still further insulating it from competitive attack.) After selecting the Impact Type for this particular initiative on this particular driver, user is prompted to select/enter Competitive Outcome on this same driver. This predicts the competitive position of the client company's brand after this initiative is successfully brought to market, and represents the team consensus reached in the Portfolio Session conducted offline. One of these four Competitive Outcome choices must now be [mandatory] selected/entered:—Superior-Parity-Inferior-Unknown After the Competitive Outcome has been selected for this driver, user is prompted to enter Explanation in a text box—summarizing why the client company's competitive position is predicted to change if this initiative is successfully brought to market. (Explanation is optional; each explanation field should accommodate up to 120 characters in the prototype software; finished software should ultimately allow each text box to produce a pop-up window in which a more detailed explanation can also be entered and later retrieved.) After user enters Impact Type, Competitive Outcome, and Explanation, system presents the next driver; user cycles through every driver and enters these three pieces of information for this initiative. Upon completion of all drivers, system presents the next initiative from the development portfolio and cycles through all the drivers again as user enters Impact Type, Competitive Outcome, and Explanation for each driver—repeating the cycle until inputs for all drivers on all initiatives have been entered in the system. 6. User is now ready to build the competitive impact assessment matrix as shown in FIGS. 23A-B. From the menu at the beginning of Step 4 above, user selects "Perform/update assessment." Since the template for FIGS. 23A-B is very similar to FIGS. 21A-B (the Alignment Matrix that was built in Use Case #5) and the column headings and footers are identical, the system can use the same instructions from Use Case #5 to build FIGS. 23A-B with only the following changes vs. FIGS. 21A-B (besides the title change at the top of the matrix): (1) note that FIGS. 23A-B has two extra rows and row headings—one at the top, just below the column headings (see the "Current Product" row heading), and one at the bottom (see the "With ALL Initiatives" row heading); (2) when the product development initiative names display in Column A, each name and letter ID is preceded by the word "With" and followed by the word "only"; (3) the color bars in all the driver columns contain different words than in FIG. 21 (differences explained in the next paragraph). With these changes/additions, system now presents the FIGS. 23A-B template—and automatically provides the following: a. Column headings automatically populated with the Driver Names; Factor-Level Association also automatically appears as column footers as shown. (FIG. 21 rules from Use Case #5 apply here as well.) b. Row headings automatically populated with the words "With <Letter ID><Initiative Name> only" and a blank text box between each initiative that extends across all driver columns as shown. (Headings for the additional row above and below are described above and shown in FIGS. 23A-B; these two row headings are fixed for all competitive impact assessments and never change regardless of project or portfolio.) c. For each initiative in the first column, looking across the row at the top of each blank text box in each Driver column, system automatically displays the appropriate Competitive Outcome color bar as shown in the color version of FIGS. 23A-B —using the Competitive Outcome choices entered by the user in Step 5 above. Color bars displayed should correspond to the following color key as shown: "Superior" becomes a green bar containing the word "SUPERIOR"; "Parity" becomes an amber bar containing the word "PARITY"; "Inferior" becomes a red bar containing the word "INFERIOR," and "Unknown" becomes a gray or transparent bar containing the word "UNKNOWN" (signifying inadequate competitive intelligence). Note that, since client company's current product was absent from Step 5 above when the competitive outcomes were entered, the color bars for the first row of FIGS. 23A-B, "Current Product," must come from Use Case #4, Step 8—where these specific color bars for the current product were already created to build the Competitive Situation Dashboard (FIG. 20) for the current product. d. In each text box in each driver column, system automatically displays the Explanation text entered (if entered) by the user in Step 5 above. 7. When system displays the completed template as described above, user is ready to complete the competitive impact assessment by generating a Competitive Impact Index (as defined in "Terms and Definitions") for each product development initiative and to see the initiatives ranked accordingly. User is now presented with the opportunity to "Calculate Competitive Impact Index for each initiative." (This step is optional now, but will be mandatory before Use Cases #8 or #9 can be completed.) User elects to do that now, and the system uses the following underlying mathematics to produce a separate Competitive Impact Index for each Initiative Name—reflecting the relative degree to which each initiative will likely improve the client company's competitive situation where improvement is most needed: a. System first assigns quantitative values to each of the subjective Competitive Outcomes entered in Step 5 above, as follows:—Leapfrogs competitors=5 points—Parity to Superior—unconditional=3 points—Parity to Superior—conditional=2 points—Moves from Inferior to Parity=3 points This is not a typo; competitive outcomes are listed here in the same order as on the menu in Step 5 because that is the most logical progression for the user, but the default point value of "Parity to Superior—conditional" is actually less than the value of "Moves from Inferior to Parity" despite being positioned higher on the menu list.—Lengthens lead where impending threat=2 points—Strengthens parity (moves closer to Superior)=1 point—Mitigates inferiority=1 point—Lengthens lead where no impending threat=0.5 point (Finished software must allow user to manually override these value assignments for exceptional occurrences, entering a value to two decimal places in increments of +/−0.25 points. Examples of such occurrences requiring manual override are situations in which lengthening a lead is especially critical because of anticipated imminent innovation by a strong competitor, or situations in which leapfrogging is so extreme that it vaults the client company's brand from being the worst in the industry on a particular driver to being far superior to all competitors. Manual override is not required in prototype software.) b. For each competitive outcome, system multiplies the outcome's quantitative value by that particular driver's Brand Driver Importance Index (from Use Case #2, Step 8), thereby weighting each outcome and producing "weighted competitive outcome points" for each driver as it pertains to each initiative. (Example: if Initiative A was assessed as "Parity to Superior—unconditional" (a value of 3 in the table above in Step 7) on the driver "Scalable," which has a Brand Driver Importance Index of 80, the system would multiply 3×80 to assign 240 weighted competitive outcome points to Initiative A for "Scalable.") c. System produces a Competitive Impact Index equal to 100 for the Initiative Name that has the highest total number of weighted competitive outcome points. For each of the other Initiative Names, system calculates the Competitive Impact Index based on that initiative's total weighted points as a percentage of the total weighted points for the initiative that was indexed at 100. All Competitive Impact Indices are expressed as whole numbers. System now displays the results, showing a prioritized list displaying Initiative Name and ID, rank, and index. For example:

RANK INITIATIVE COMPETITIVE IMPACT INDEX 1. B. Executive dashboard 100 2. A. Auto-configuration 91 3. D. Full internationalization 84 4. C. Integration with customer console 80 5. F. Real-time access to BMG database 62 6. E. Live chat tech support 52 8. User may now wish to selectively examine the competitive impact of individual initiatives in the portfolio, one at a time, without all the clutter of the full matrix produced in Step 6. User is presented with option to "Display selected initiative only." If option is selected, a drop-down menu presents with the ID and name of each initiative. User selects the initiative s/he wants displayed. The system then produces the view shown in the FIG. 24 example (in which only Initiative B appears, along with the client company's current competitive status for comparison) and vertical arrows indicate where the client company's competitive status will likely change (vs. current competitive status) as a result of bringing only this initiative to market. Note in FIG. 24 that any instance of "leapfrogging" (as defined in footnote 13) is indicated by a vertical arrow that has a bold-highlighted border.

Figure 25:
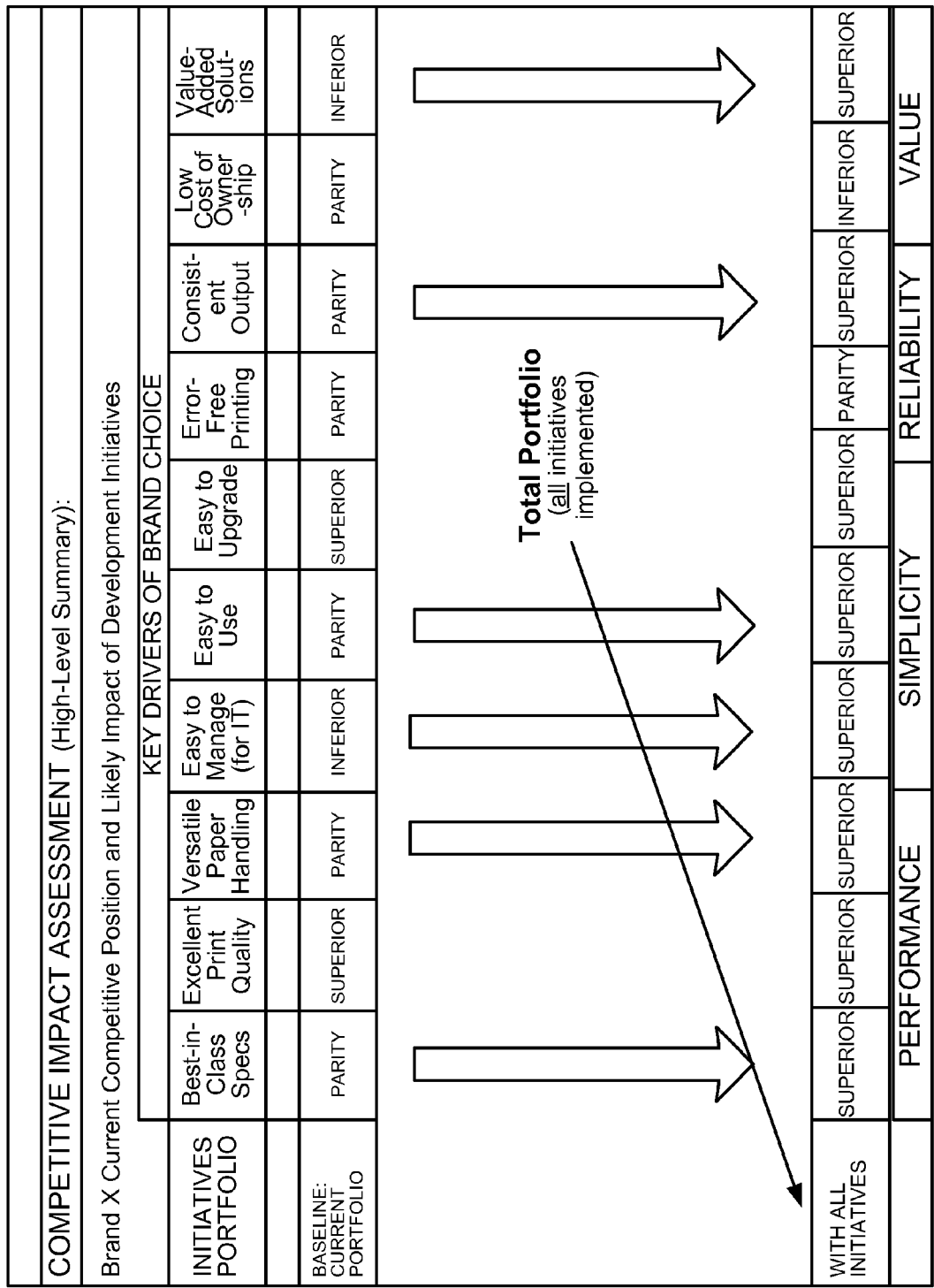
FIG. 25 is an example from the first embodiment of a total portfolio view of Competitive Impact Assessment results that shows the collective competitive impact of all product initiatives in a product development portfolio.

9. After examining results for individual initiatives, user may wish to examine collective results for the entire product development portfolio—that is, if all initiatives are brought to market, what is the likely collective impact on the client company's competitive status (superior/parity/inferior) for each driver of brand choice. User is presented with option to "Display total portfolio impact only." If option is selected, the system produces the view shown in the FIG. 25 example in which individual initiatives are masked out and vertical arrows indicate where the client company's competitive status will likely change (vs. current competitive status) as a result of bringing the entire portfolio to market. Note in FIG. 25 that any instance of "leapfrogging" (as defined in footnote 13) is indicated by a vertical arrow that has a bold-highlighted border. 10. Upon viewing results of Step 7, 8 and/or 9, user may now elect to print or create PDF of the competitive impact matrix and the index results display (which can be combined in a single PDF) and/or any view of an individual intiative's impact (as in FIG. 24 example) or total portfolio impact (FIG. 25). Alternatively, user may use the Step 4 menu's option #4 to do the same in future visits. (Finished software should provide ability to e-mail PDFs to client company or consulting colleagues, via Microsoft Outlook, without having to manually open Outlook and attach file, but this is not necessary in the prototype.) Alternative Paths: At Step 6d, when the Competitive Impact matrix (FIGS. 23A-B) displays, system gives user the option to view a visually compressed dashboard version of the display in which all text boxes between color bars are hidden and most of the vertical space between the color bar rows are eliminated (example shown in FIG. 26). This view may be printed or converted to PDF. At Step 7b, user may elect to perform the assessment on an unweighted basis. If user does so, then for each initiative the system simply adds together the initiative's total unweighted competitive outcome points across all drivers and proceeds to Step 7c to produce the Competitive Impact Index based on unweighted points. On this alternative path, the Competitive Impact Index column displaying at Step 7c would display with the modified heading, "Competitive Impact Index (Unweighted)."

Use Case #6 Post-Conditions—All use case data entry is saved in the system, available for Administering Consultant to access, modify, or delete, and is accessible to other valid users on a read-only basis—with the exception that the Consultant Facilitator may also add, modify or delete only the "Explanations" entered (or not yet entered) in Step 5. (In some instances, Administering Consultant may ask the Facilitator to log on to the system and check/correct the Explanation entries, or may have skipped entering the explanations and instead asked the Facilitator to make those entries.) When this use case ends, user may either log off or proceed to other use cases. 2.7 Use Case #7—Perform Development Burden Assessment—Use Case #7 performs the last of the three Application assessments of the client company's product development portfolio, in which each development initiative—products, features, and/or services—is evaluated in terms of its development burden (i.e., human and financial resources required in, and the complexity of, bringing the initiative to market). Just as Use Cases #5 and #6 brought into the system certain outputs of the "Portfolio Session" (Development Portfolio Assessment Session) workshop conducted offline by the Facilitator, Use Case #7 brings in and uses other outputs from that same session. The Administering Consultant will perform this burden assessment, which produces a Development Burden Recap matrix (FIG. 27) and, for each product development initiative, a Burden Manageability Index (as defined in "Terms and Definitions"). Use Case #7 Pre-Conditions—The first three pre-conditions of Use Case #1 are also applicable here. Alternatively, the Administering Consultant may be coming to this Use Case #7 directly from other use cases without logging off and back on. Additional pre-conditions: 1. Use Case #3 or #5 has been completed and its data stored in the system. 2. Outside the system, the consulting firm has completed the Portfolio Session with the client company.

Use Case #7 Flow of Events—1. User enters Project ID code. 2. User navigates to project home page and selects "Product Development Portfolio Assessment." 3. User is presented with three options: (1) Assessment 1: Strategic Alignment (2) Assessment 2: Competitive Impact (3) Assessment 3: Development Burden User selects option #3 and proceeds to Assessment 3. 4. User is presented with four options: (1) Enter/modify assessment inputs (2) Perform/update assessment (3) View assessment (4) Print assessment In the user's initial visit to this module for this Project ID, or unless this assessment has already been performed in a previous visit, user must select option #1. Only after option #1 inputs have been completed (Step 5 below) may the user alternatively select options #2, 3 or 4. (Any attempt to select the latter three options before Step 5 has been completed should elicit a message such as, "Assessment inputs not yet complete." In subsequent user visits to this assessment module, if user selects option #3 or 4 without yet having performed the assessment (option #2), user can still view or print just the inputs without a performed assessment. If the assessment has already been performed in a previous visit (completion through Step 7 below), the user may select any of the four options above in any sequence—option #1 to make changes in the inputs, option #2 to update the assessment based on those changes, or options #3 or 4 may be selected first (to view or print the last assessment stored in a previous visit). Users other than Administering Consultant are only allowed to access options #3 and 4; if they attempt to access either of these options before assessment inputs have been entered by the Administering Consultant, the system should inform them that viewing/printing is unavailable because assessment inputs are not yet complete. If inputs are complete but the assessment has not yet been completed, users may view or print inputs but the system should inform them that the completed assessment is not yet available.) 5. User has selected option #1, "Enter/modify assessment inputs," and is now prepared to enter the remaining inputs required to perform the burden assessment in Step 6 below. Using information stored from Use Case #3- or, if Use Case #3 was not completed—Use Case #5, the system should now be able to display the product development Initiative Names and letter ID's in ID alphabetical order. Upon display, user selects each initiative in turn and, upon doing so, user is prompted to enter four pieces of information for each initiative: (1) Resource Level [mandatory], (2) Resource Explanation [optional], (3) Complexity Level [mandatory], and (4) Complexity Explanation [optional]. (In finished software, Online Help and a tutorial in the Reference Library will provide more detail and examples of how to distinguish complexity issues from resource issues, since they often overlap significantly.) For the initiative currently selected, upon seeing the "Enter resource level" prompt, user will select from the following menu of four possible resource levels:—VERY HIGH-HIGH-MODERATE-LOW Then, upon seeing the "Enter complexity level" prompt for the same initiative, user will select from the exact same menu (i.e., the same four levels are used to describe both resource requirements and complexity in this assessment). User is then given the option to enter explanation of rationale for selecting that level. Upon completing this cycle, user will select each of the remaining initiatives in turn and enter the appropriate level for resources and complexity and, if desired, explanations, for each initiative. 6. User is now ready to build the burden assessment matrix as shown in FIG. 27. From the menu at the beginning of Step 4 above, user selects "Perform/update assessment." System now presents the FIG. 27 template with column headings as shown, and automatically provides the following: a. System automatically populates row headings with the Initiative Names and their letter ID's, displaying alphabetically by letter ID. b. For each initiative in the first column, looking across the row at the top of each blank text box in the Resource Requirements and Task Complexity columns, system automatically supplies the appropriate burden level color bar as shown in the color version of FIG. 27—using the Resource Requirement Level and Task Complexity Level inputs entered by the user in Step 5 above. System will translate these inputs as follows for FIG. 27 display: each "Very high" level becomes a red bar containing the words, "VERY HIGH"; each "High" level becomes an amber bar containing the word "HIGH"; each "Moderate" level becomes a grey bar containing the word "MODERATE"; each "Low" level becomes a green bar containing the word "LOW." c. In each text box in the Resources Required and Task Complexity columns, system automatically displays the appropriate Resource Explanation text and Complexity Explanation text that was entered (if entered) by the user in Step 5. 7. When system displays the completed template as described above, user is ready to complete the burden assessment by generating a Burden Manageability Index (as defined in "Terms and Definitions") for each product development initiative and to see the initiatives ranked accordingly. User is now presented with the opportunity to "Calculate Burden Manageability Index for each initiative." (This step is mandatory before Use Cases #8 or #9 can be completed.) User elects to do that now, and the system uses the following underlying mathematics to produce a separate Burden Manageability Index for each Initiative Name—reflecting the relative development burden of each initiative as compared to the other initiatives: a. System first assigns quantitative values to each of the subjective Resource Levels and Complexity Levels entered in Step 5 above, as follows:—VERY HIGH=1 point—HIGH=2 points—MODERATE=3 points—LOW=4 points (Finished software must allow user to manually override these value assignments for exceptional occurrences, entering a value to two decimal places in increments of +/−0.25 points. Manual override is not required in prototype software.) b. System now offers user the choice of a default formula or custom formula in computing Burden Manageability Indices. User chooses "Default" (see "Alternative Paths" below if user chooses "Custom"), and the system uses the following default formula. In Application pilot implementations to date, client companies have agreed that resources should be weighted at roughly twice the importance of complexity, in part because resources are more finite and controllable—so this is the default weighting, but manual override should be available as client company circumstances dictate.—which weights Resources:Complexity at a ratio of 2:1—to produce a Burden Manageability Index for each initiative: multiply the initiative's Resource Level quantitative value by 2, add the product to that initiative's Complexity Level quantitative value, and divide the sum by 2. This represents a weighted burden manageability total score for each initiative. After calculating this for each initiative, the system looks for the highest-scoring initiative and indexes every other initiative's score to the highest score. This produces the Burden Manageability Indices. An example: let's say Initiative E has a Resource Level of Moderate (3 points) and a Complexity Level of Low (4 points), yielding the highest weighted burden manageability score among all initiatives in the portfolio at 5.0—derived from ((3×2)+(4×1))/2=5.0; let's day Initiative D, however, has a Resource Level of High (2 points) and a Complexity Level of Moderate (3 points), yielding a burden manageability score of ((2×2)+(3×1))/2=3.5. If Initiative C is indexed at 100 as the highest-scoring on burden manageability, Initiative D will index at 70 (=3.5/5.0). Remember, the lower the burden, the more manageable it is, so the initiative with the lowest burden will have the highest Burden Manageability Index.

System now displays the results, showing a prioritized list displaying Initiative Name and ID, rank, and index. For example: RANK INITIATIVE BURDEN MANAGEABILITY INDEX 1. E. Live chat tech support 100 2. A. Auto-configuration 80 3. B. Executive dashboard 70 3. Note that, in all rankings produced by the system in all uses cases, any "ties" (identical indices) should assign the same rank number to the initiatives that are tied but then skip a number for the next initiative. D. Full internationalization 70 5. F. Real-time access to BMG database 60 6. C. Integration with customer console 50 8. Upon viewing the Step 7 results, user may now elect to print or create PDF of the competitive impact matrix and the index results display (which can be combined in a single PDF). Alternatively, user may use Step 4's menu option #4 to do the same in future visits. (Finished software should provide ability to e-mail PDFs to client company or consulting colleagues, via Microsoft Outlook, without having to manually open Outlook and attach file, but this is not necessary in the prototype.) Alternative Paths: At Step 7b, user chooses custom formula instead of default formula. User is prompted to enter weighting ratio [mandatory for custom formula] for Resources:Compexity (the numeric field on either side of the ratio colon should accommodate integers <10; e.g., 5:2). User is provided a text box to enter rationale [optional] for the custom formula. System then substitutes the numbers entered here as the multipliers in the formula described in Step 7b, and the remainder of the use case continues on the main path from there. (However, when the index results display at the end of Step 7, a footnote at the Index column heading should indicate that "Indices based on custom formula, weighting Resources:Complexity at _____:_____.")

Use Case #7 Post-Conditions—All use case data entry is saved in the system, available for Administering Consultant to access, modify, or delete, and is accessible to other valid users on a read-only basis—with the exception that the Consultant Facilitator may also add, modify or delete only the custom formula rationale text entered (or not yet entered) in Alternative Path Step 7b. (In some instances, Administering Consultant may ask the Facilitator to log on to the system and check/correct the rationale entry, or may have skipped entering the rationale and instead asked the Facilitator to make that entry.) When this use case ends, user may either log off or proceed to other use cases.

2.8 Use Case #8—Integrate Individual Assessments—In Use Case #8, the user brings together the inputs and analyses from Uses Cases #5, 6 and 7 to integrate these three standalone assessments into a more holistic picture of strategic priorities. This Use Case #8 will: produce an at-a-glance visual recap of the three individual product development portfolio assessments, side by side; combine the Alignment Rankings from Use Case #5 with the Competitive Impact Rankings from Use Case #6 to produce a blended ranking of Overall Strategic Importance; balance Overall Strategic Importance against Burden Manageability (from Use Case #7) to produce a recommended list of strategic priorities; allow user to enter rationales for these recommendations that will be carried forward into presentation building in Use Case #9.

Use Case #8 Pre-Conditions—The first three pre-conditions of Use Case #1 are also applicable here. Alternatively, the Administering Consultant may be coming to this Use Case #8 directly from other use cases without logging off and back on. Additional pre-conditions: 1. Use Cases #1, 2, 4, 5, 6 and 7 have all been completed and their data stored in the system. 2. Outside the system, the consulting firm has completed both the Proof Points Session and Portfolio Session with the client company.

Use Case #8 Flow of Events—1. User enters Project ID code. 2. User navigates to project home page and selects "Integrate Assessments." If Use Case #8 has already been completed in a previous visit, user may elect to view or print integrated assessment results and is presented with a menu of output displays from the previously completed Steps 3 through 7 below. If Use Case #8 was not completed previously, the Administering Consultant user is now taken to a page describing the six tasks that s/he will be asked to perform in Steps 3 through 7 below for assessment integration. These six tasks will most always be performed in the following sequence (though users should have flexibility to skip the first task and perform it at any point before task #5, as tasks #2-4 are not dependent on it): (1) Generate a single-page Assessments Recap (2) Generate Overall Strategic Importance Rankings (3) Create Application Priority Guide (4) Display Strategic Importance and Burden Manageability side by side (5) Enter indicated action for each initiative In future visits, this page should indicate which of the steps have already been completed in previous visits. 3. User is prompted to request "Generate Assessments Recap" [mandatory, though can be deferred until any point in this Use Case #8 as long as it is completed before advancing to Use Case #9]. Using the template in FIG. 28, the system will create the recap's five columns using data from previous use cases as follows: a. The first column, "Product Development Initiatives," displays the client company's initiative names and letter ID's exactly as they appeared in Step 6b of Use Case #5, so that the complete set of portfolio initiatives displays. b. The second column, "Alignment with Brand Drivers," converts data from Use Case #5 to horizontal bar graph representation (the longer the bar, the better the alignment between the development initiative and that particular driver). Specifically, the value underlying each bar graph in this column is determined by the total "weighted alignment points" for each initiative—as calculated in Use Case #5, Step 8b—as a percentage of total possible points. The system now calculates total possible points by first adding together the Brand Driver Importance Indices for all drivers included in Assessment 1 (Use Case #5, in which each driver is a separate column in the Alignment Matrix), and multiplying that sum by 2 (2 points being the maximum total points for each rating, since HIGH rating equaled 2 as stipulated in Use Case #5). For example, if ten drivers were included in the Alignment Matrix, and their respective 10 indices (each index, in this example, being between 50 and 100) added up to 800, total possible weighted alignment points would be 800×2, or 1,600. Next, each initiative's total weighed alignment points, as already calculated in Use Case #5, Step 8b, is divided by the 1,600 total points possible. So, for example, let's say that Initiative B's total weighted alignment points from Use Case #5 was 1,200, the horizontal bar graph for Initiative B in FIG. 28 would cover 75% of the total horizontal bar graphing area (visually representing 1,200 out of a possible 1,600 points, or 75%). The system completes this same process for each initiative in the portfolio until all initiatives have been graphed. When complete, Column B shows an alignment bar representing this percentage value for each initiative in Column A of the Assessments Recap and may also, at the user's option, display the percentage number on, or adjacent to, each bar. c. The third column in FIG. 28, "Competitive Impact," converts data from Use Case #6 to horizontal bar graph representation. Specifically, the value underlying each bar graph in this column is determined by the total "weighted competitive outcome points" for each initiative—as calculated in Use Case #6, Step 7b—as a percentage of total possible points. Since each initiative's total weighted competitive outcome points has already been calculated, now the total possible weighted competitive outcome points must be calculated. Total possible points will vary from one Application project to the next, depending on the client company's current competitive situation as stored in the Competitive Situation Dashboard from Use Case #4, Step 8. The bigger the gap between the client company's current situation and attainment of superiority on a particular driver, the greater the number of possible competitive outcome points (i.e., the more room for improvement of competitive position on that driver). Accordingly, total possible competitive outcome points are calculated as follows:—System assigns "gap" values to the current competitive situation. Each "SUPERIOR" on the Competitive Situation Dashboard, indicating the client company is already superior on that driver, is assigned 1 point. Each "PARITY" is assigned 3 points. Each "INFERIOR" is assigned 5 points.—Each gap value assigned above is now multiplied by the corresponding brand driver's Brand Driver Importance Index (from Use Case #2, Step 8). The products of this multiplication for all the brand drivers are then added together, and the sum produces the total possible weighted competitive outcome points. For example, if ten drivers were included in the assessment and they had Brand Driver Importance Indices as shown below, total competitive outcome points would be derived as follows if the competitive situation and corresponding gap values are also as shown below (note: this is not a display of data for the user, but an example to demonstrate for the software developer how total possible weighted competitive outcome points are calculated): COMPETITIVE GAP BRAND DRIVER TOTAL POSSIBLE DRIVER SITUATION VALUE IMPORTANCE INDEX WEIGHTED POINTS Timeliness PARITY 3 100 300 Easy to deploy SUPERIOR 1 96 96 Customizable SUPERIOR 1 91 91 Effectively prioritizes SUPERIOR 1 84 84 Scalable INFERIOR 5 80 400 Trustworthy data SUPERIOR 1 65 65 Interoperable INFERIOR 5 56 280 Easy to use PARITY 3 42 126 Demonstrable ROI PARITY 3 35 105 TOTAL POSSIBLE WEIGHTED COMPETITIVE OUTCOME POINTS 1,547.

The system now must divide each initiative's total weighted competitive outcome points by the total possible points. To derive each initiative's total, the system must first add together that initiative's total weighted competitive outcome points on each driver (as already calculated in Step 7b of Use Case #6). For example, let's say that in Use Case #6, Initiative D's total weighted competitive outcome points on the "Scalable" driver was calculated to be 200. The system adds this 200 to the same initiative's corresponding total points for each of the other nine drivers, bringing Initiative D's total weighted competitive outcome points for all ten drivers to 1,000. The system then divides this 1,000 by the total number of possible points as derived above (1,547), producing 65% as an expression of the percentage of total possible weighted competitive impact points likely achievable by Initiative D if successfully brought to market. This calculation for each initiative provides the basis for the horizontal bar graphs in Column 3 ("Competitive Impact") of the FIG. 28 Assessment Recap; in this example, then, the horizontal bar for Initiative D would visually cover approximately two thirds of the total horizontal graphing area in that column. The system completes this same process for each initiative in the portfolio until all initiatives have been graphed. When complete, Column C shows an alignment bar representing this percentage value for each initiative in Column A of the Assessments Recap and may also, at the user's option, display the percentage number on, or adjacent to, each bar. d. The fourth and fifth columns (or Columns D and E in the Excel-modeled FIG. 28), under the combined heading, "Development Burden," simply reprise the two columns of color bars already created in Use Case #7, Step 6b, for FIG. 27—one Resource Requirements color bar for each initiative and one Task Complexity color bar for each initiative—and displays them in the appropriate column. With these color bars displaying for each initiative in the portfolio, the Assessment Recap is now complete. 4. User is prompted to request "Generate Overall Strategic Importance Rankings" [mandatory]—a combination of alignment and competitive impact, as defined in "Terms and Definitions." In this step, the system generates FIG. 29 by essentially combining the results of product development portfolio Assessments 1 and 2 with equal weighting. To derive the Overall Strategic Importance Ranking for each initiative relative to the others, the system first derives an Overall Strategic Importance Index (alternatively known as the "Aggregate Importance Index") for each initiative by adding together the initiative's Alignment Index from Use Case #5, Step 8c, and its Competitive Impact Index from Use Case #6, Step 7c, and then dividing the sum by 2. For example, in the prior use cases, the initiative "Full internationalization" had an Alignment Index of 100 and a Competitive Impact Index of 84, so its Overall Strategic Importance Index would be 92. When the system has calculated this index for each initiative, it ranks them in descending order and displays the results as in FIG. 29, showing—from left to right—the rank number, initiative letter ID and name, Overall Strategic Importance Index, Alignment Index, and Competitive Impact Index (the latter two columns are included so that the user can readily see the component parts of the Overall Strategic Importance Index and, therefore, the source numbers for the overall ranking). 5. User is prompted to "Create Application Priority Guide (importance rationale summary")" [mandatory] as shown in FIG. 30. This is simply a list of the Overall Strategic Importance rankings from Step 4, with text fields for the user to summarize the rationale for each ranking and, if appropriate, to manually override the rankings produced in Step 4 if there are justifiable subjective reasons to do so. Upon displaying the product development initiatives in descending order of Overall Strategic Importance (as in Step 4), and a text field to the right of each initiative (see FIG. 30), user is presented with the option of leaving the rankings as is or manually overriding them. (If override is selected, system allows user to change the order; system then refreshes the descending order display.) After selecting either option and seeing the final ranking of initiatives, user is prompted to "Enter strategic importance rationales" and may select "Now" or "Later." (If "Later," however, rationales are still mandatory before proceeding to Use Case #9.) To complete this step, user will cycle through the initiatives and, for each, will type in up to 400 characters of bullet-point text. (Finished software should link to larger text fields for more detailed rationale notes, but this is not required in prototype software.) 6. User is prompted to request "Display Strategic Importance and Burden side by side" [mandatory]. The system then generates FIG. 31, using the Overall Strategic Importance rankings and indices from Step 4 above for the left side and the Burden Manageability rankings and indices from Use Case #7, Step 7b, for the right side. The user will study this display to consider the tradeoffs between which product development initiatives are most crucial strategically and whether the required development resources are disproportionately high or low. To visually assist the user in comparing each initiative's strategic importance to its burden, the system will automatically color code each initiative (so that, for example, Initiative A is yellow in both columns, regardless of its rank position, Initiative B is orange in both columns, etc.), or will display a color connecting line between Initiative A in the Importance column and Initiative A in the Burden column (or will display both—whatever will help the user most readily compare the position of any single initiative in one column to that same initiative's position in the other column). 7. Based on data from Steps 3 through 6 above (if Step 3 was deferred by the user, it must be competed now), user is ready to suggest indicated actions for the client company in deciding how to allocate/reallocate product development resources and how quickly or slowly to proceed on bringing each product development initiative to market. User will want to be able to simultaneously reference reduced-size versions (if readable) of the completed Assessment Recap from Step and the Importance/Burden comparison from Step 6 while entering data in this Step 7, so system should be able to display them simultaneously in frames if possible. (For use in this step, finished software should allow user to display reduced-size versions of multiple outputs of the user's choice from all prior use cases, but this is not required in prototype software.) With these displayed for reference, user is now prompted to "Enter indicated action for each initiative" [optional, as this may be deferred until Use Case #9 or may even be omitted if Administering Consultant decides to write an indicated actions recommendation offline]. For each initiative, the system presents the following menu of possible actions; user will select the one most appropriate action for each initiative:—Speed up development—Maintain development speed—Slow down development—Suspend/kill development immediately If user selects actions that are variable ("Speed up" or "Slow down"), system presents user with a corresponding numeric field in which the user can enter the suggested intensity of that action; number entered will be a percentage <1000%, with no decimal places. When user has completed entries for all initiatives, all fields display as a summary of suggested indicated actions, in descending order from most positive to most negative recommendation, as shown in this example:

INITIATIVE INDICATED ACTION INTENSITY B. Executive dashboard SPEED UP 300% D. Full internationalization SPEED UP 200% A. Auto-configuration MAINTAIN—C. Integration with customer console SLOW DOWN 75% F. Real-time access to BMG database SLOW DOWN 25% E. Live chat tech support SUSPEND/KILL—8. User may elect to print or create PDF of any displayed results from Steps 3 through 7. Alternatively, user may do this in Step 2 above, as indicated, in future visits. (Finished software should provide ability to e-mail PDFs to client company or consulting colleagues, via Microsoft Outlook, without having to manually open Outlook and attach file, but this is not necessary in the prototype.) Alternative Paths: At Step 3, if no driver correlation coefficients or proxy coefficients were stored in the system in Use Case 2's Step 4 (and, therefore, no weighted alignment points were calculated in Use Case #5 and no weighted competitive impact points were calculated in Use Case #6), Steps 3b and 3c will use unweighted alignment points and unweighted competitive impact points, respectively, for the bar graphing calculations prescribed. At Step 7, user may wish to arrive at recommendations for indicated action through a less subjective method, and is therefore presented the option to "Calculate Application Composite Priority Scores" (a composite score for each product development initiative based on a formula that weighs development burden against strategic importance, as described in "Terms and Definitions"). To derive the Composite Priority Score ("CPS") for each initiative, the system uses the Overall Strategic Importance Index (alternatively known as the "Aggregate Importance Index") from Step 4 above and the Burden Manageability Index generated in Use Case #7, Step 7. The default formula for calculating the Composite Priority Score for each initiative is $(3x+y)/4$, where x is the initiative's Overall Strategic Importance (Aggregate Importance) Index and y is the initiative's Burden Manageability Index. For example, in FIG. 31, Initiative A has an Overall Strategic Importance Index of 76 and a Burden Manageability Index of 42, so Initiative A's Composite Priority Score would be 67.5 (applying the default formula, or $((3*76)+42)/4$ in this case). Composite Priority Scores should display to one decimal place. System calculates Composite Priority Scores for all initiatives and displays the results in descending order as in the following example (which uses all the index values from the example in FIG. 31 in which there are seven initiatives in the product development portfolio):

STRATEGIC HARMONY™ RANK INITIATIVE COMPOSITE PRIORITY SCORE: 1. Initiative B 95.8; 2. Initiative D 79.5; 3. Initiative C 74.8 4. Initiative E 69.3; 5. Initiative A 67.5 6. Initiative G 60.3; 7. Initiative F 57.8

Alternatively, user may [optional] require the capability to override the default formula with a custom formula. To do this, user is prompted to enter weighting ratio [mandatory for custom formula] for Importance:Burden (the numeric field on either side of the ratio colon should accommodate integers <10; e.g., 5:2). (In the default formula, the Importance:Burden ratio was 3:1 as expressed in the formula $3x+y$, where x equaled Importance and y equaled Burden.) User is provided a text box to enter rationale [optional] for the custom formula. System then substitutes the numbers from the custom ratio for the multipliers in the default formula and substitutes the sum of those multipliers for the default divisor, which was 4. (For example, if user stipulates a custom Importance:Burden ratio of 2:1, the system will convert the default formula to the following custom formula: $(2x+y)/3$. For the Initiative A example above, this custom formula would yield a Composite Priority Score of 64.6, the result of $((2*76)+42)/3$, instead of the 67.5 yielded by the default formula.) If the user chooses to override the default with a custom formula, the score results should display with a footnote at the Composite Priority Score column heading indicating that "Scores are based on custom formula, weighting Importance:Burden at ____:____.") After Composite Priority Scores are calculated and displayed, user may [optional] wish to have the system automatically convert the scores to indicated actions for speeding up, maintaining, slowing down, or suspending work on selected product development initiatives (actions such as those described in Step 7 above). While the user and/or client company must ultimately still decide the degree to which any single initiative should be sped up or slowed down, the system can show, as guidance, the degree to which any single initiative is above or below average in its CPS relative to other initiatives in the portfolio. (A default algorithm that uses these variances to prescribe specific indicated actions is currently being developed, but will not be included in prototype software.) To calculate and display the CPS variances, the system performs the following steps: (1) system calculates the mean of all Composite Priority Scores in the portfolio, producing a "Portfolio Mean CPS"; (2) for each initiative, system calculates the variance vs. the Portfolio Mean CPS (e.g., Initiative A's CPS minus Portfolio Mean CPS); (3) system displays variances from highest-above-mean to lowest-below-mean (using the CPS's from the example above, which yield a mean of 72.1) and displays the Portfolio Mean CPS at bottom of table for reference a follows (this example uses the same CPS's calculated and displayed above): INITIATIVE CPS VARIANCE vs. Mean; Initiative B 95.8+23.7; Initiative D 79.5+7.4; Initiative C 74.8+2.7; Initiative E 69.3-2.8; Initiative A 67.5-4.6; Initiative G 60.3-11.8; Initiative F 57.8-14.3 Portfolio Mean CPS=72.1

Using these variances as guidance, user may now complete Step 7 above by selecting appropriate actions (e.g., speed up, maintain, slow down, or suspend) and action intensity for each initiative. The implication is that, all other things being equal and total product development resources being fixed, the client company will want to speed up (assign more resources to) any initiative with a CPS significantly above the Portfolio Mean CPS and to slow down (assign less resources to) any initiative with a CPS significantly below mean, and suspend work on any initiatives with a CPS far below mean. Future versions of software will include the algorithm that will convert these variances to specific actions and intensities (e.g., "Speed up Initiative D at 40% resource increase") that will balance the total product development resource pool by moving resources to initiatives with higher CPS's and away from initiatives with lower CPS's—resulting in a more strategically effective reallocation of a fixed development budget. Alternatively, the client company may elect to set targets for generating product development cost savings at specifiable levels. For example, a client company asks to run the model so that a total resource reduction/cost savings of 10% is achieved and the remaining resources are reallocated across all initiatives that are not suspended. (Note that practical considerations may override the output of the model, since the model cannot account for exceptional considerations that are beyond the scope of the software such as when a particular initiative has already been promised to important customers and must therefore be delivered even if the initiative has a very low CPS, or when a new product with a low CPS may still be essential to complete a product line so that the client company can be a "one-stop shop" or "full-service vendor.")

Use Case #8 Post-Conditions—All use case data entry is saved in the system, available for Administering Consultant to access, modify, or delete, and is accessible to other valid users on a read-only basis. When this use case ends, user may either log off or proceed to other use cases.

2.9 Use Case #9—Build Presentation—In Use Case #9, the Administering Consultant uses the system to assist in building a PowerPoint-style presentation of assessment results and recommendations that can either be presented from the Application server, via an Internet connection, or exported to PowerPoint for offline use as a standalone .ppt file or conversion to PDF. (Since it is currently possible, though more tedious than ultimately envisioned, to completely develop a final client presentation in PowerPoint outside the system, several of the steps below describe functionality that may not be required in the prototype software unless its development is manageable. The Flow of Events below attempts to distinguish between what is essential in the prototype vs. what is essential in a finished application, but developer feedback will determine what actually gets built in the prototype.)

Use Case #9 Pre-Conditions—The first three pre-conditions of Use Case #1 are also applicable here. Alternatively, the Administering Consultant may be coming to this Use Case #8 directly from other use cases without logging off and back on. Additional pre-conditions: 1. Use Cases #1, 2, 4, 5, 6, 7, and 8 have all been completed and their data stored in the system. This is the only additional pre-condition for Use Case #9. Note: Administering Consultant may wish to begin presentation development before Use Case #8 has been completed. The system should allow this, although presentation cannot be completed in Use Case #9 without the prior completion of Use Case #8.

Use Case #9 Flow of Events—1. User enters Project ID code. 2. User navigates to project home page and selects "Build Presentation." To eliminate any user confusion (especially when Administering Consultant and Consultant Facilitator are not the same person) between the workshop briefing presentation discussed in Use Case #3 and the final results and recommendations presentation that is the focus of Use Case #9, system asks user to choose between "Workshop briefing presentation" and "Results and recommendations presentation." If user chooses "Workshop briefing presentation," s/he is routed directly to Use Case #3, Step 7. If user chooses "Results and recommendations presentation," s/he continues with this Use Case #9 and proceeds to Step 3 below. 3. If Use Case #9 has been started or completed in a previous visit, user may elect to view or print the unfinished draft presentation or, if completed, the finished presentation. If Use Case #9 has not been started (as assumed here and in Step 4 below), user is presented with option to view sample client presentation (which currently exists as a Cristol & Associates MS PowerPoint file and will be provided to the software developer for storage in the system). 4. User is presented with two options: (1) "Customize sample presentation" or (2) "Build presentation from scratch." Regardless of the user's selection, in the finished Application software application the system will export to MS PowerPoint all the output displays from Uses Cases #4 through 8 as individual slides that can be edited and pasted into either the sample presentation or a from-scratch presentation. (This is not required in prototype software, as each system output display can be manually copied and pasted into PowerPoint. Then edits can be done offline within PowerPoint, and the final PowerPoint presentation can be brought back into the system when completed.) 5. Once the final presentation is stored in the system and can be run from the Application server, the user may wish to link certain content within the presentation to other related content that is stored in the system from previous use cases but has not been included in the actual presentation slides. (Depending on the complexity of developing this capability, it may be reserved for the finished application.) 6. User may elect to print or create PDF of a draft or completed presentation, or any portion of either. (Finished software should provide ability to e-mail PDFs to client company or consulting colleagues, via Microsoft Outlook, without having to open Outlook and manually attach file, but this is not necessary in the prototype.) 7. When Administering Consultant is ready to leave this Use Case #9, s/he is prompted to "Set presentation status for other users" [mandatory] and is presented with four options. "Presentation Status" options include: (1) "Draft in progress," (2) "First draft completed," (3) "Final draft completed," or (4) "As presented to client." User is then prompted to "Set access level for other users" [optional]. User may prohibit his/her colleagues' read-only access to a draft in progress or first draft completed, if desired. (Other users' access is always read-only at any stage of presentation completion; as specified in pre-conditions, only the Administering Consultant can manipulate the content in Use Case #9.) If user skips this step, any content resident in the presentation build will be accessible to other users on a read-only basis.

Alternative Paths: At Step 2, if user is not the Administering Consultant, s/he may choose to view client presentation. If Administering Consultant has not prohibited access in Step 7 above, the presentation in its most recently stored state displays as read-only and can, at the user's option be printed but not yet converted to PDF. If Administering Consultant has prohibited access to draft in progress or first draft, and either of those was selected in Step 7 above as the current status of the presentation, system presents message such as, "Draft presentation not yet complete or available for viewing."

Use Case #9 Post-Conditions—All use case data entry is saved in the system, available for Administering Consultant to access, modify, or delete, and is accessible to other valid users on a read-only basis. When this use case ends, user may either log off or proceed to other use cases.

2.10 Use Case #10—Access Management Tools—In Use Case #10, which may occur at any time relative to all other use cases, users may monitor project status for any/all Application projects currently in progress within the consulting firm, or access any completed project. Users can also access the Consensus Builder tool, ROI analysis tool, and Customer Research RFP Builder tool—as well as the Reference Library, including a Application overview, tutorials, and best practices information. Management and reference tools as described below will only be placeholders in the prototype software, but fully functional in the finished application. All aspects of Use Case #10 are optional for the user, as it is possible to successfully complete all prior use cases without engaging in any of the activities described below.

Use Case #10 Pre-Conditions—1. A valid user has logged on to the system. 2. User has been authenticated as Administering Consultant (authorized to enter data, make changes, perform analyses, etc.) Other users are limited to read-only browsing access except as noted below in "Alternative Paths." 3. A consulting project has been previously set up and assigned a name and Project ID code. 4. Completion of Use Cases #1, 2, 4, 5, 6, 7, 8, and 9 is required only for portions of Steps 2 and 3 below as noted.

Use Case #10 Flow of Events—1. User navigates to project home page and selects "Management Tools." User is presented with six options and, within the sixth, three sub-options as shown: (1) Check status of projects in progress (2) Access completed projects (3) ROI Analysis tool (4) Consensus Builder tool (5) Customer Research RFP Builder (6) Reference Library—including Application Overview, Tutorials. Tutorials are subject-specific training aids with content beyond that contained in Online Help. Online Help should always be readily accessible in any use case at any time without requiring the user to navigate through Management Tools. Online Help is only a placeholder in prototype software, but its easy accessibility should be indicated throughout in prototype navigation and Best Practices User may select any of the above options in any sequence. For the purposes of this written use case, user will proceed through the options sequentially. 2. User selects "Check status of projects in progress" from Step 1 menu above. A list or menu then displays all valid active projects with their respective Project ID codes. In case the user is someone other than the Administering Consultant and is not aware that a project has been recently completed, the displayed project list will also automatically include any project that has been completed (presented to client company) within the last 90 days, and the project name will display with "(COMPLETED)" parenthetically following the project name. (The system will know if and when a project has been completed based on user action in Use Case #9, Step 6; there, if user selected "As presented to client" as the Presentation Status, the system considers that project complete as of the date of that action.) User then selects the in-progress project of interest. (If user selects a completed project, see "Alternative Paths" below.) Upon project selection, system reports which among Use Cases #1-#9 have been completed and which is in progress. For example, if selected project has been completed through Use Case #6 and Use Case #7 has been started (e.g., inputs entered, but assessment not yet performed), system would display project status as: Completed through Competitive Impact Assessment.

Development Burden Assessment in progress. Administering Consultant should also be provided with a "Comments" text box here to add other status information of potential interest to read-only users, such as more detail about the recently completed use cases and/or next steps, and projected timelines for completion. Prototype software will simply display sample results and a fictitious project list. The finished application will not only include the functionality above, but also will display a monitoring map that plots the status of each active project on a Application process flowchart (described in Section 1.4 under "Process Overview and Monitoring"). 3. User selects "Access completed projects" from Step 1 menu above. A list or menu then displays showing all valid completed projects with their respective Project ID codes and date of completion (date that Administering Consultant selected "As presented to client" as the Presentation Status in Use Case #9, Step 6). Prototype software is only required to display a fictitious project list. When the user selects a specific completed project, the system regards that selection as entry of the Project ID (as if it had occurred as stipulated in Step 1 of all other use cases), and user may then proceed to any authorized use of any other use case connected with that project. 4. User selects "ROI Analysis tool" from Step 1 menu above. System presents three options: (1) explore ROI tool, (2) conduct ROI analysis, (3) view completed ROI analyses for specific project. This is all that is required as a placeholder in prototype software; additional future use case documentation will provide ROI feature specifications for the finished application, as well as providing a sample analysis to display. 5. User selects "Consensus Builder tool" from Step 1 menu above. System presents three options: (1) explore Consensus Builder, (2) configure Consensus Builder, (3) view Consensus Builder results for specific project. This is all that is required here as a placeholder in prototype software. However, active use of the Consensus Builder is critical to Use Case #2, Step 4, in those instances (referenced in Use Case #2) when client company internal consensus must be used in lieu of customer research to provide proxy coefficients that prioritize brand choice drivers. Complete Consensus Builder functionality will be required in the finished Application software application and will be specified in a future edition of this Master Use Case document. 5. User selects "Customer Research RFP Builder" from Step 1 menu above. System presents three options: (1) "View sample RFP," (2) "Build Request for Proposal," (3) "Retrieve saved RFP." Full RFP building functionality is not required in prototype software; the finished application, however, will provide a wizard that guides the user through questions enabling the system to generate a customized RFP in the format of the sample RFP, save it to the system, and e-mail it to selected marketing research firms. Meanwhile, prototype software can present the sample RFP (which currently exists as a Cristol & Associates MS Word file, which ultimately will serve as an editable template). 6. User selects "Reference Library" from Step 1 menu above. System presents three options: (1) Application overview, (2) Tutorials, (3) Best Practices. If user selects option #1, system presents the Application master flowchart (shown on page 12) and allows user to view the generic Application overview presentation used with prospective clients. If user selects option #2, a menu of pre-packaged tutorials will appear—but tutorial content is not required in prototype software. If user selects option #3, system will present a menu of Best Practices modules; as with tutorials, best practices content is not required in prototype software.

Alternative Paths: At Step 1, user is visiting Management Tools only for general reference information or training purposes rather than to manage or work with an actual client company project. (For this alternative path, Pre-Conditions #2 and 3 above are not required.) In the finished software, user is presented the same menu of options but information and functionality within these options will be limited; this is not a concern in the prototype software, where information and functionality are already limited as indicated above. For example, in the finished software, only the Administering Consultant will be allowed to use the ROI tool to conduct and analysis for an actual client company project stored in the system; other users may use the tool for training/general information only or to view a completed analysis. At Step 2, user sees that the project s/he wanted to check status of is now complete and, upon selecting that completed project from the project list, is taken directly to the point in Step 3 as if s/he had already chosen the "Access completed projects" option and selected the specific project of interest.

Use Case #10 Post-Conditions—In finished software, any data entry in using the Consensus Builder tool, ROI tool, or RFP tool is saved in the system, available for Administering Consultant to access, modify, or delete, and is accessible to other valid users on a read-only basis. (In prototype software, there will be no data entry with these tools as they are only placeholders.) When this use case ends, user may either log off or proceed to other use cases.

Section 3 User Interface and Screen Shots Guide—Among the accompanying drawings are previously prototyped screen shots and tabular templates referenced in the preceding use cases. Below is a guide to screen shot prototypes organized by the functions of gathering inputs, analyzing inputs, generating outputs, building presentations, and using miscellaneous tools. Note to developer: Screen shots not currently prototyped in Microsoft PowerPoint or Microsoft Visio were principally done in Microsoft Excel 2000 or 2002, as were tabular templates, so the graphic and color limitations of these as shown in this document are obvious when viewed on-screen or in color hardcopy. Where specifically noted in Section 2 use case details, however, particular colors used have specific strategic meaning, and the software application should retain those color families as specified (e.g., not necessarily the same shade of green, red, or amber, but colors that users would clearly recognize as green, red, or amber). Elsewhere, the developer is free to judiciously apply color wherever it enriches communication effectiveness/readability and aesthetics, weighed against loading time and ability to print legible hard copies from the client-side application.

3.1 Setting Up a Project—Marketing and management consulting firms with software infrastructure already have their own internal systems for valid users logging on to the system, user authentication, and setting up new project names and codes. Consequently, no drawings are submitted here for these functions.

Figure 4:
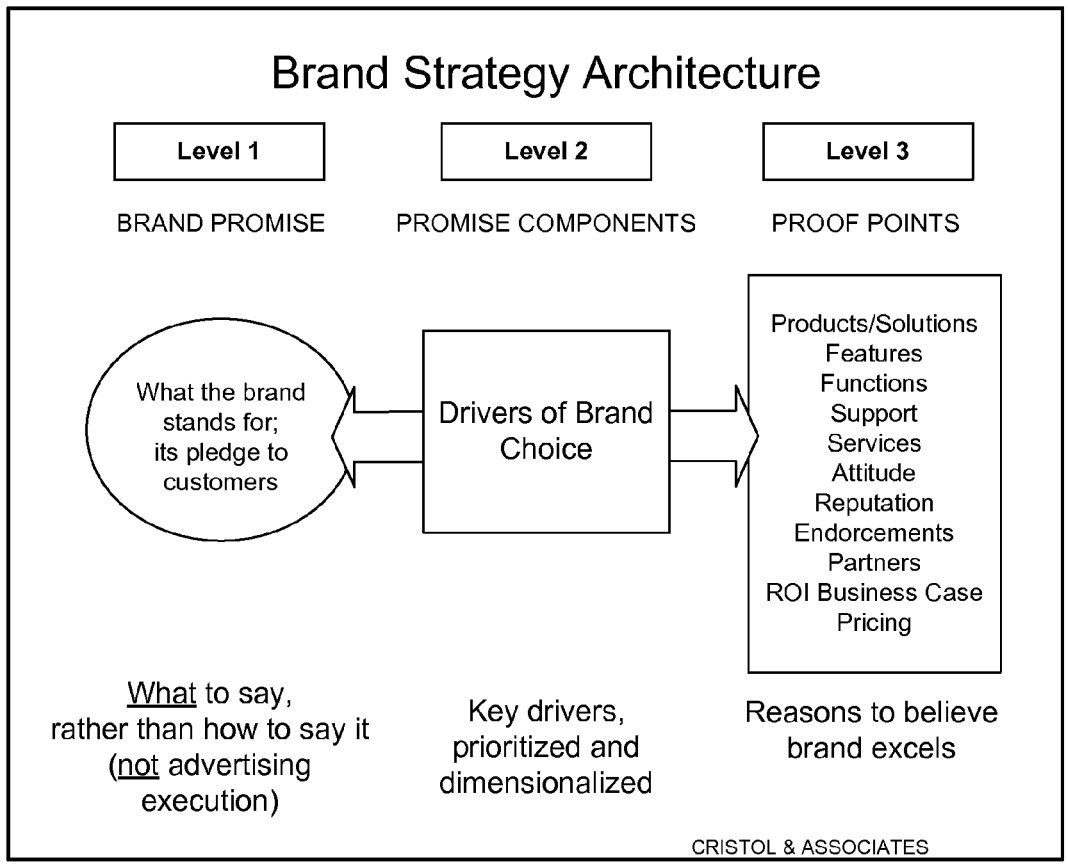
FIG. 4 introduces the Brand Strategy Architecture of the first embodiment.
Figure 5:
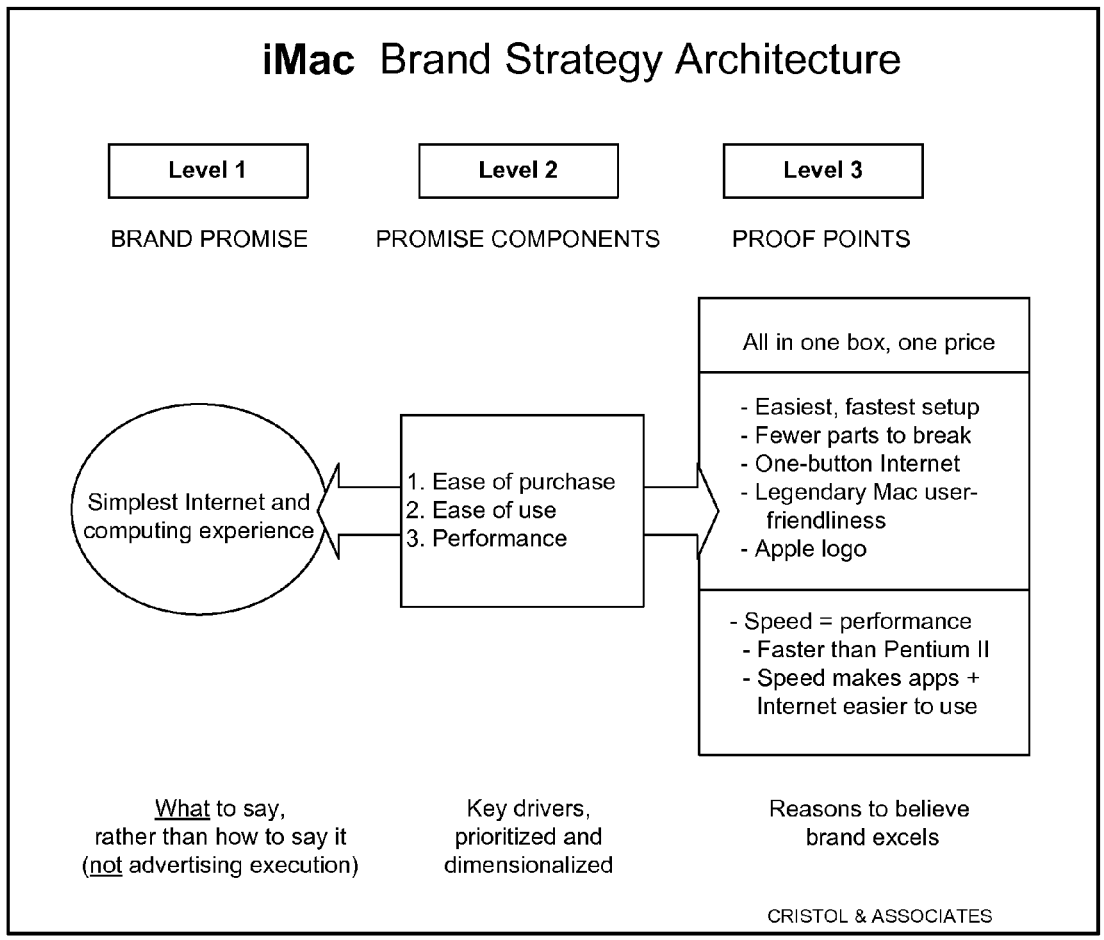
FIG. 5 illustrates an example of a Brand Strategy Architecture in the first embodiment.
Figure 6:
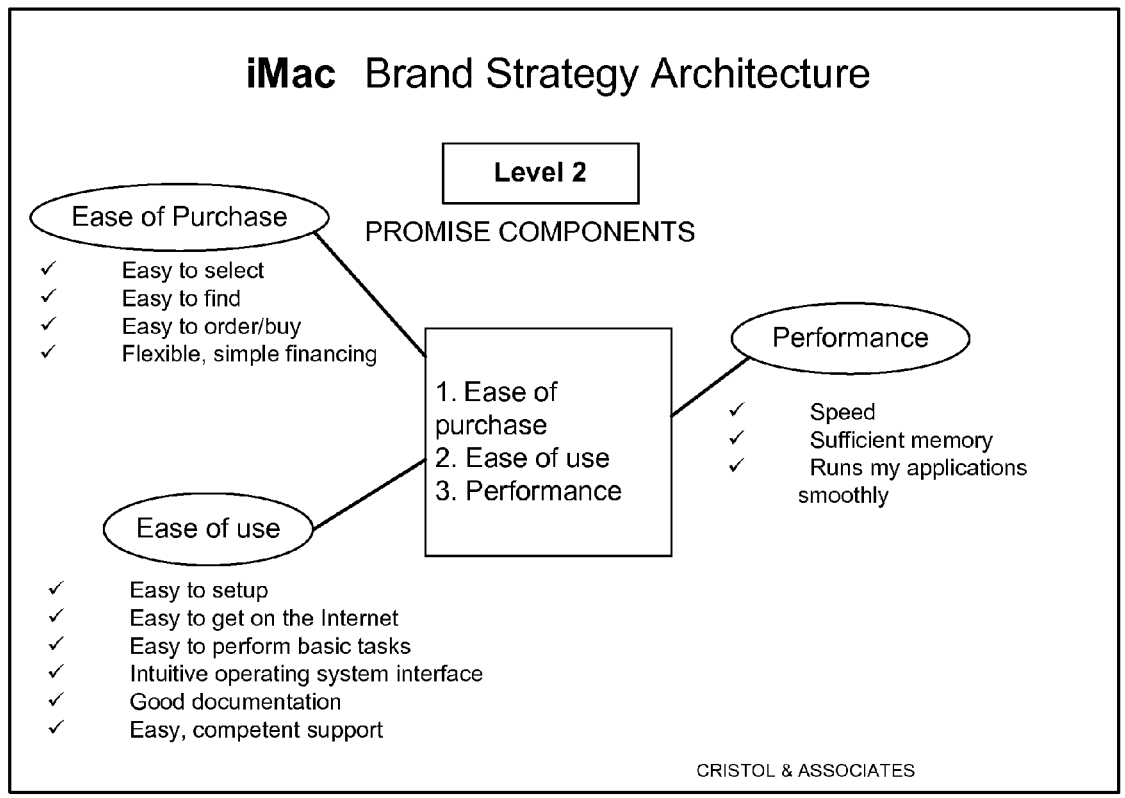
FIG. 6 is an example of the Application software display in the first embodiment.

3.2 Capturing Inputs—Screens for capturing inputs include: (1) Brand Strategy Architecture template (FIG. 4); (2) Brand Strategy Architecture completed example (FIGS. 5 and 6); (3) Drivers of Category Adoption rankings and correlation coefficients (not shown, but like FIG. 9, substituting "Category Adoption" for "Brand Choice"); (4) Drivers of Brand Choice rankings and correlation coefficients (FIG. 9); (5) Consensus Builder questionnaire (FIG. 8); (6) Facilitation Pacing Guides (FIGS. 12 and 13); (7) Facilitation templates (FIGS. 14, 15, 16); (8) Proof Points Inventory (FIGS. 17, 18, 19A-B).

3.3 Analyzing Inputs—Screens for analyzing inputs include: (1) Drivers of Brand Choice (various sorts, example in FIG. 7); (2) Consensus Builder Results Recaps (FIGS. 10A-F and 11A-F); (3) Competitive Situation Dashboard (FIG. 20); (4) Development Portfolio Alignment with Brand Drivers (FIGS. 21A-B); (5) Relative Impact of Total Portfolio By Attribute (FIG. 22); (6) Development Portfolio Competitive Impact (FIGS. 23A-B, 24, 25, 26A-B); (7) Development Burden Recap (FIG. 27).

Figure 28:
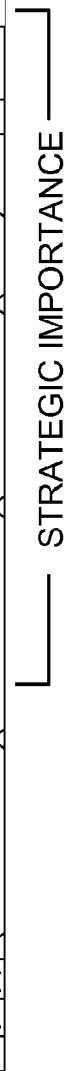
FIG. 28 is an example from the first embodiment of a Product Development Portfolio Assessments Recap.
Figure 31:
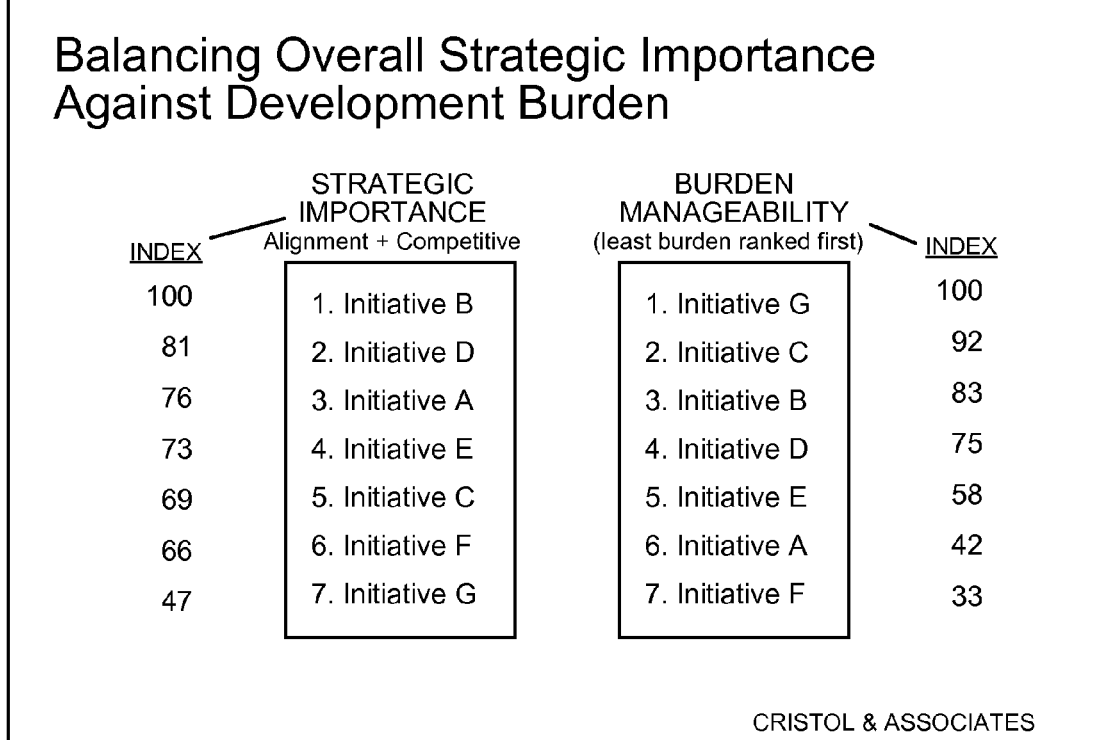
FIG. 31 depicts an illustration for Balancing Overall Strategic Importance.

3.4 Generating Outputs—Screens for generating outputs include:

(1) Assessments Recap (FIG. 28); (2) Development Priorities Based on Overall Strategic Importance (FIG. 29); (3) Priority Guide (FIG. 30); (4) Balancing Strategic Importance against Development Burden (FIG. 31).

3.5 Building Presentations—Use Case #9 described alternative scenarios for building and presenting Application results and recommendations to client companies. For content, however, a sample presentation is available upon request.

3.6 Monitoring Project Status—Not functional in prototype software. Specifications will be included in a future edition of this document. Screens for monitoring will include variations of FIGS. 2 and 3. 3.7 ROI Analysis Not functional in prototype software. Specifications will be included in a future edition of this document.

3.8. Generating Customer Research Request for Proposal—Not functional in prototype software. Specifications will be included in a future edition of this document.

3.9 Online Help—Not functional in prototype software. Specifications will be included in a future edition of this document.

HOW THE INVENTION DIFFERS FROM OTHER RELATED BUSINESS METHODS: The preferred embodiment involves certain disciplines that may intersect with those employed by other marketing-related and product development-related business methods for which patents have been sought and/or granted, such as Enterprise Marketing Automation and related strategic marketing processes, product lifecycle management processes, computer-implemented product control centers, and computer-based brand strategy decision processes. However, the preferred embodiment differs significantly from all of these; some key differences are summarized below. Enterprise Marketing Automation and related strategic marketing planning processes. Application, the preferred embodiment, focuses on optimizing product development priorities in the context of disciplined brand strategy; Enterprise Marketing Automation patents focus on software-centric approaches to developing brand strategy, executing marketing campaigns, and tracking results—with little to no focus on the specifics of product development optimization as it relates to brand strategy. The preferred embodiment takes some of the more common conceptual components of brand strategy and frames them in a "Brand Strategy Architecture" format, but even more significantly differentiates itself from Enterprise Marketing Automation inventions by linking that architecture to product development portfolio assessment as well as assessment of current product portfolios (portfolios of products already available in the market). There are other existing strategic marketing planning processes that are not necessarily automated or technical in nature, and there are automated product development management tools. But the former are not linked to product development as is Application, and the latter are typically project management software tools for execution of product development projects and do not yield the strategy which drives prioritization of those projects. Application produces that strategy through integration with brand strategy. Though there may be certain components of an Enterprise Marketing Automation solution—such as brand assessments, competitive assessments, and brand positioning statements—that are similar to selected components of Application, the import of these individual parts of the preferred embodiment is in uniquely linking all of this brand-related planning to product development portfolio management rather than just doing automation-assisted brand positioning and marketing communications in a vacuum. Product Lifecycle Management Processes. Such tools, if proprietary, are generally software-centric and software-dependent, and essentially pick up where Application leaves off—that is, once product development projects have been identified and prioritized by management decision-makers (whom the preferred embodiment is designed to influence and assist), other lifecycle management software helps optimize resource allocation and project management to get the development done more efficiently and effectively. As such, lifecycle management software would help execution of strategies that are in part the output of Application, with no overlap. In other words, while lifecycle management software assists in optimizing work on projects that are already included in a product development portfolio, Application helps determine what gets into that portfolio in the first place, and how to strategically prioritize the projects within the portfolio.

Product Control Centers. Patented computer-implemented "Product Control Centers" assist users through the process of developing a product. They do not, however, address brand strategy development or drivers of brand choice, whereas the preferred embodiment uniquely combines brand strategy with product development portfolio assessment and is strategic rather than technical. Further, Application provides value-added integration between product strategy and marketing strategy; a Product Control Center, which focuses on engineering rather than marketing, does not. The preferred embodiment is not dependent upon proprietary software (implementations of the invention have been successfully conducted for well-known companies using only off-the-shelf Microsoft Office with no proprietary software involved), nor is the preferred embodiment's value limited to improvements in product development logistical processes—as it reprioritizes the products and features to be developed by using specific aspects of marketing and brand strategy as guides. Computer-Based Brand Strategy Decision Processes. Such patented processes focus on allocating marketing resources multinationally to support a global brand. Unlike the preferred embodiment, they do not address product development/product strategies and the integration of those with brand strategy to provide decision intelligence on optimizing product development resource allocation by strategically reprioritizing development projects. Again, Application is strategically focused and not technically dependent on proprietary software (though its implementation may be supported by proprietary software over time).

Finally, one theme throughout all the above types of inventions underscores the uniqueness of Application: none of these other solutions are designed specifically to address a systemic separation of marketing and product development organizations common in large companies—e.g., where the chief marketing officer has purview over brand and product marketing, while product development resides in the technical center in the domain of senior engineering managers. This separation manifests in the fact that product development is not a more critical part of other inventions that purport to be comprehensive marketing planning solutions. More tightly integrating marketing and product development, to their mutual benefit and therefore toward the objective of building shareholder value and competitive advantage for a company, was a key motive for the preferred embodiment.

What is claimed is:

1. A computer-readable medium having instructions stored thereon that, when executed by a computer, enable the computer to perform a method comprising the steps of:

identifying at least one product development initiative for at least one of a product, a service, and a combined product and service;

prioritizing the at least one product development initiative based upon at least one of assessing alignment with drivers of brand choice and assessing the competitive impact of the at least one of a product, a service, and a combined product and service with regards to brand identity and brand equity in relation to a competitor's product or service, evaluating whether the product development initiative will maximize contributions to at least one of brand identity and brand equity based upon defining attributes having product characteristics that a customer utilizes to distinguish similar functioning products, the product characteristics including category adoption drivers importance index, brand choice drivers importance index, alignment of product development initiative with category adoption drivers, alignment of product development initiative with brand choice drivers, competitive impact of product development initiative, overall strategic importance of product development initiatives, resource requirements of product development initiative, complexity of product development initiative, overall priority based on integrated assessments, and application composite priority score;

presenting the prioritized at least one product initiative on a graphical display;

assessing at least one of a human burden, a financial burden, and a development complexity burden to initiate and complete the development of the at least one product development initiative based on color-coded indicia presented on the graphical display; and deciding resources to allocate to the at least one product development initiative evaluated to have maximized contributions to brand equity based upon the assessed alignment with the drivers of brand choice, the competitive impact, the human burden, the financial burden, and the development complexity burden.

2. The computer-readable medium of claim 1, wherein prioritizing includes integrating and aligning a product development strategy to increase impact of the product development initiative.

3. The computer-readable medium of claim 1, wherein the assessing based on color-coded indicia includes assessing based on a color key.

4. The computer-readable medium of claim 3, wherein the assessing based on the color key includes a first color to designate a superior competitive situation, a second color to designate a parity competitive situation, and a third color to designate an inferior competitive situation.

5. The computer-readable medium of claim 4, wherein the assessing based on the color key includes a green bar for the first color to designate the superior competitive situation, an amber bar for the second color to designate the parity competitive situation, and a red bar for the third color to designate the inferior competitive situation.

* * * * *